(12) United States Patent
Gulley et al.

(10) Patent No.: US 8,918,511 B2
(45) Date of Patent: Dec. 23, 2014

(54) SCALABLE ARCHITECTURE

(75) Inventors: Edward Whittington Gulley, Watertown, MA (US); Joseph F. Hicklin, Upton, MA (US); James N. Gonthier, Sutton, MA (US); John Richard Langley, Hollis, NH (US); Joseph Conti, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 260 days.

(21) Appl. No.: 13/485,836

(22) Filed: May 31, 2012

(65) Prior Publication Data

US 2012/0271939 A1 Oct. 25, 2012

Related U.S. Application Data

(60) Division of application No. 12/651,284, filed on Dec. 31, 2009, now Pat. No. 8,380,880, which is a continuation-in-part of application No. 12/021,856, filed on Jan. 29, 2008.

(60) Provisional application No. 60/899,228, filed on Feb. 2, 2007.

(51) Int. Cl.
| | | |
|---|---|---|
| *G06F 15/173* | (2006.01) | |
| *G06F 9/50* | (2006.01) | |
| *H04L 12/70* | (2013.01) | |
| *H04L 12/861* | (2013.01) | |
| *H04L 12/64* | (2006.01) | |

(52) U.S. Cl.
CPC ....... *G06F 9/5027* (2013.01); *H04L 2012/5681* (2013.01); *H04L 49/9005* (2013.01); *H04L 2012/6489* (2013.01); *H04L 2012/5678* (2013.01); *G06F 9/505* (2013.01); *G06F 9/5044* (2013.01); *G06F 9/5055* (2013.01); *H04L 49/9047* (2013.01)
USPC .......................................... 709/226; 709/224

(58) Field of Classification Search
CPC ... G06F 9/5027; G06F 9/5055; G06F 9/5044; G06F 9/505; H04L 49/9005; H04L 49/9047; H04L 2012/5678; H04L 2012/5681; H04L 2012/6489
USPC ........................................ 709/223, 224, 226
See application file for complete search history.

(56) References Cited

U.S. PATENT DOCUMENTS

| | | |
|---|---|---|
| 5,341,477 A | 8/1994 | Pitkin et al. |
| 6,014,700 A | 1/2000 | Bainbridge et al. |

(Continued)

FOREIGN PATENT DOCUMENTS

| | | |
|---|---|---|
| EP | 1 533 699 A1 | 5/2005 |
| EP | 1 564 638 A1 | 8/2005 |
| EP | 1 626 339 A1 | 2/2006 |

OTHER PUBLICATIONS

Co-Pending U.S. Appl. No. 13/485,830 entitled "Scalable Architecture", by Gulley et al., filed May 31, 2012, 150 pages.

(Continued)

*Primary Examiner* — Brian J Gillis
(74) *Attorney, Agent, or Firm* — Harrity & Harrity, LLP

(57) ABSTRACT

Exemplary embodiments may employ techniques for dynamically dispatching requests to resources operating in a distributed computing environment, such as a computing cloud, according to one or more policies. Embodiments may further dynamically adjust resources in the computing environment using predictive models that use current loads as an input. Embodiments may still further maintain a state for a processing environment independent of the type or configuration of a device used to access the environment on behalf of a user.

20 Claims, 42 Drawing Sheets

(56) References Cited

U.S. PATENT DOCUMENTS

| | | | |
|---|---|---|---|
| 7,039,911 | B2 | 5/2006 | Chase et al. |
| 7,069,192 | B1 | 6/2006 | Freitag |
| 7,225,223 | B1* | 5/2007 | McCarthy et al. ............ 709/204 |
| 8,104,039 | B2* | 1/2012 | Huizenga ...................... 718/104 |
| 2002/0042823 | A1* | 4/2002 | DeBettencourt et al. ..... 709/224 |
| 2002/0078125 | A1 | 6/2002 | Ichinose et al. |
| 2003/0056020 | A1* | 3/2003 | Chaudhry et al. ............ 709/313 |
| 2003/0115243 | A1 | 6/2003 | Smith |
| 2004/0199918 | A1 | 10/2004 | Skovira |
| 2005/0034023 | A1* | 2/2005 | Maturana et al. ................ 714/37 |
| 2005/0050198 | A1 | 3/2005 | Mizoguchi |
| 2005/0183087 | A1 | 8/2005 | Kubota |
| 2005/0246705 | A1* | 11/2005 | Etelson et al. ................. 718/100 |
| 2006/0116789 | A1* | 6/2006 | Subramanian et al. ........ 700/275 |
| 2006/0190947 | A1 | 8/2006 | Ghosh et al. |
| 2006/0235973 | A1 | 10/2006 | McBride et al. |
| 2007/0005777 | A1 | 1/2007 | Fremantle et al. |
| 2007/0226332 | A1* | 9/2007 | Becker-Szendy et al. .... 709/224 |
| 2007/0233837 | A1 | 10/2007 | Imai |
| 2007/0245414 | A1 | 10/2007 | Chan et al. |
| 2007/0264986 | A1* | 11/2007 | Warrillow et al. ......... 455/414.3 |
| 2008/0081662 | A1 | 4/2008 | Strandell et al. |
| 2008/0083040 | A1 | 4/2008 | Dani et al. |
| 2008/0120297 | A1 | 5/2008 | Kapoor et al. |
| 2008/0155100 | A1* | 6/2008 | Ahmed et al. ................. 709/226 |
| 2008/0189718 | A1 | 8/2008 | Gulley et al. |
| 2008/0320081 | A1 | 12/2008 | Shriver-Blake et al. |
| 2009/0037395 | A1 | 2/2009 | Ireland et al. |
| 2009/0046583 | A1* | 2/2009 | Towster et al. ................ 370/232 |
| 2009/0100368 | A1 | 4/2009 | Look et al. |
| 2010/0223385 | A1 | 9/2010 | Gulley et al. |
| 2010/0332682 | A1 | 12/2010 | Sharp et al. |

OTHER PUBLICATIONS

PCT Invitation to Pay Additional Fees for international application No. PCT/US2008/052781 mailed Oct. 7, 2008, 10 pages.

Muller, H. et al.: Multitasking and Multithreading on a Multiprocessor with Virtual Shared Memory; Proceedings of the 2nd IEEE Symposium on High-Performance Computer Architecture (HPCA-2), Feb. 1996, pp. 212-221.

Notification of transmittal of the International Search Report and the Written Opinion of the International Searching Authority, or the Declaration corresponding to PCT/US2010/058364, mailed Nov. 2, 2011, 15 pages.

* cited by examiner

SESSION SCHEDULER RESULTS WINDOW

| CODE NAME | RUNTIME | SUCCESSFUL | REPORT ID |
|---|---|---|---|
| ☐ FINANCE.m | 0600 | YES | AUG-18-07.TXT |
| ☐ TEST-1.m | 0200-0300 | PARTIAL | TEST-1.OUT |
| ☐ TEST-2.m | 0345-0350, 0500-0530 | YES | TEST-2.OUT |
| ☐ | | | |

FIG. 16B

SCALABLE ARCHITECTURE

RELATED APPLICATIONS

The instant patent application is a divisional application of U.S. patent application Ser. No. 12/651,284, filed Dec. 31, 2009 now U.S. Pat. No. 8,380,880, which is a continuation-in-part application of U.S. patent application Ser. No. 12/021,856, filed Jan. 29, 2008, which claims priority to U.S. Provisional Patent Application No. 60/899,228, filed on Feb. 2, 2007, the contents of which are incorporated herein by reference in their entirety.

BACKGROUND INFORMATION

Computing applications may be used in technical disciplines, such as mathematics, engineering, physical sciences, medicine, etc., to solve technical problems. For example, these applications may be used to find solutions to problems that describe a physical system (e.g., a control system) and may display results for the solutions. These computing applications can be operated in standalone environments, where the application is installed and run on a local computer, such as a desktop computer operated by a user.

Some users may find that standalone environments are unsatisfactory when attempting to solve complex problems. For example, standalone environments may be unsatisfactory because of memory limitations (e.g., inadequate memory), processing limitations (e.g., insufficient processing power and/or processing architectures that cannot be scaled to adequately handle complex processing tasks), display limitations (e.g., unsatisfactory display hardware), outdated software (e.g., processing software that is not up-to-date), etc. Attempting to work on complex processing tasks, such as processing tasks for solving technical problems, using standalone environments may produce system crashes, unacceptably long processing times, inferior display resolution, and/or erroneous results.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 16B illustrates an exemplary results window;

DETAILED DESCRIPTION

Figure 1:
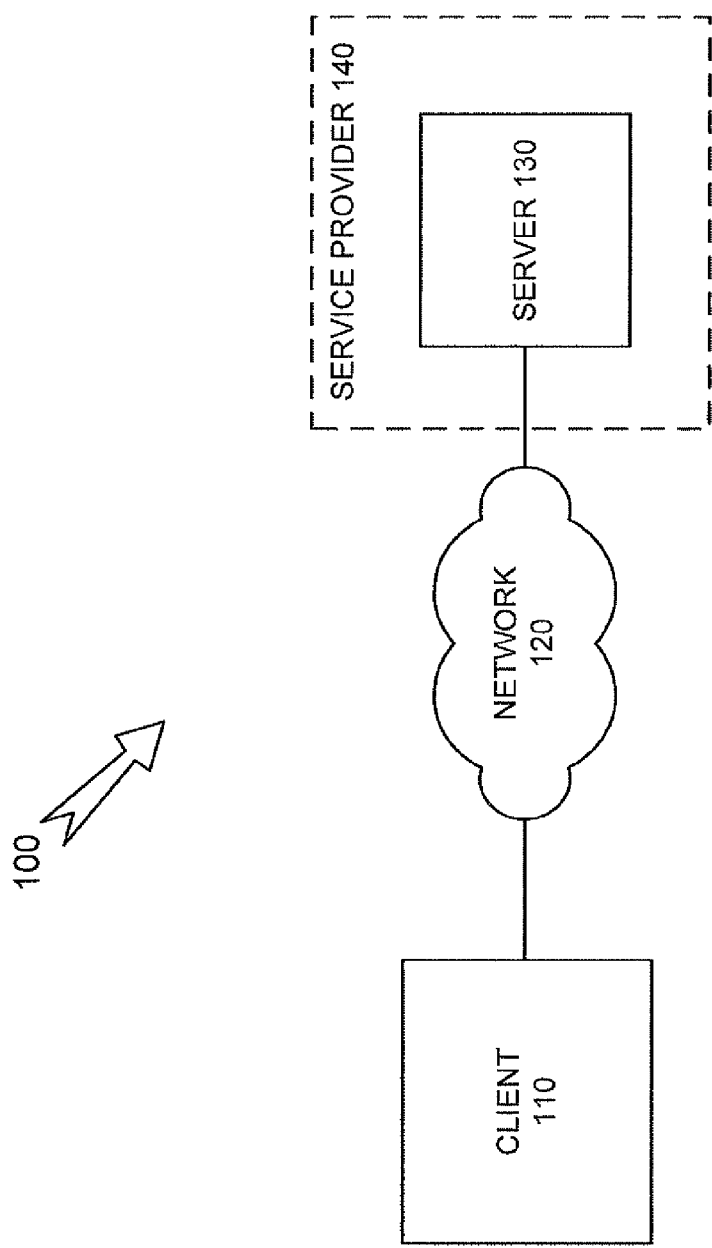
FIG. 1 illustrates an exemplary system that can be configured to practice an exemplary embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Previously known computing applications may be inadequate for solving certain types of problems, such as technical problems that can be encountered in the fields of science, engineering, medicine, economics, etc. For example, a conventional computing application may perform processing operations using a single device (e.g., a client device) operating in a standalone environment, where the single device may or may not support an environment that adequately solves certain technical problems (e.g., complex technical problems). Alternatively, the client device may attempt to remotely perform technical processing operations on a single server over a network. In certain situations, the single server may not support an environment that adequately solves technical problems on behalf of the client device. Inadequate processing resources may lead to unacceptably long processing times. Alternatively, inadequate processing resources may not allow certain types of processing tasks to be performed (e.g., tasks that include large and/or complex computations).

Exemplary embodiments may alleviate problems associated with conventional computing applications by providing a scalable remote processing architecture that can be adapted to efficiently solve substantially any type of problem (e.g., large and/or complex technical computing problems). For example, an embodiment may use remote processing code that allows a client device to make use of one or more remote processing resources provided over a network, such as the Internet. In one embodiment, the client may download the remote processing code from one or more servers, and in another embodiment the client may run the remote processing code remotely on one or more servers via a web service.

Remote processing, as used herein, refers to substantially any type of processing that is remote with respect to a requesting device. The requesting device may be a client device. For example, remote processing can include distributed processing where a number of devices perform processing on behalf of a requesting device. Remote processing can further be performed on one or more processing devices that can be embodied in hardware based logic and/or software based logic. For example, remote processing can be performed on microprocessors, clusters, labs, etc. Remote processing may further be performed over a network, a direct connection (e.g., a link, bus, cable, etc.), etc.

Remote processing code may adaptively select one or more remote processing resources based on client defined parameters or based on parameters defined by another device, such as a server operated by a service provider. For example, the remote processing code may select processing resources based on availability of the resources, based on a scaled pricing structure (e.g., where the client can use additional processors simultaneously for a larger fee), based on the type of problem being solved (e.g., a complex simulation application may use more processors as compared to the number of processors that a less complex simulation application uses), based on a priority associated with the client, based on a time of day (e.g., a client performing processing during non-peak hours may get more processing resources than a comparable client that performs processing during peak-hours), etc.

Remote processing resources (e.g., devices) operating on behalf of the client may operate in a number of configurations. For example, a processing resource may be embodied as a unit of execution, where a unit of execution can be a hardware-based or software-based entity that performs processing on behalf of a client. Units of execution can be implemented as single entities (e.g., a single processor) or as multiple entities (e.g. multiple processors). A client may use one or more units of execution to perform processing operations on its behalf. In another embodiment, two or more units of execution may be arranged in clusters on a network and a client may use one, two, or more clusters to perform processing operations on its behalf. Exemplary embodiments may switch units of execution and/or clusters into or out of processing operations for a client according to a schedule and/or based on other parameters (e.g. complexity of a problem, a priority assigned to the client, etc.).

Assume, for sake of example, that a user has a 100×100 array that needs to be processed. The user may send the array to a server for remote processing. The server may determine that each column or row should be processed on a separate unit of execution when at least 100 units of execution are available. The server may parse the array into columns or rows and may send one column/row to each of 100 units of execution. The 100 units of execution may process the columns/rows substantially simultaneously and may send results back to the server. Alternatively, the server may determine that only ten units of execution are available to operate on the array. The server may send one-tenth of the array to each unit of execution and the ten units of execution may operate on the array portions substantially simultaneously to produce ten results that are sent back to the server. In yet another embodiment, the server may split the array into unequal sections and distribute those sections to units of execution for processing. Still other implementations may process the array in other ways using a number of units of execution.

Exemplary embodiments may perform remote processing on behalf of one or more clients in serial or in parallel. Determinations about processing a particular problem (e.g., serial, parallel, etc.) may be made according to client determined parameters and/or according to other parameters. For example, a server may retrieve resource parameters (e.g., unit of execution availability information) and may use the retrieved parameters to determine how to process the problem.

As used herein, parallel processing can refer to task parallel processing, data parallel processing, and/or stream parallel processing. Task parallel processing may refer to parallel processing where a number of tasks are processed at substantially the same time on a number of processing resources. In task parallel processing each task may be processed independently of other tasks executing at the same time (e.g., a first processor executing a first task may not communicate with a second processor executing a second task).

In another embodiment, parallel processing may refer to data parallel processing, where data (e.g., a data set) is parsed into a number of portions that are executed in parallel using two or more processing resources. In data parallel processing, processing devices and/or data portions may communicate with each other as processing progresses.

In still another embodiment, parallel processing may refer to stream parallel processing (also referred to as pipeline parallel processing). Stream parallel processing may use a number of processing resources arranged in series (e.g., a line) where a first processor produces a first result that is fed to a second processor that produces a second result. Stream parallel processing may be prevalent in certain fields, such as signal processing, image processing, etc.

Other embodiments may combine two or more of task, data, or stream parallel processing techniques alone or with other types of processing techniques to form hybrid-processing techniques without departing from the spirit of the invention.

Exemplary embodiments may include a hardware infrastructure that allows a number of services to be offered to a client. For example, a remote processing hardware configuration may allow services to be modularly deployed to a client. In one embodiment, a client can be provided with one or more services that can include a collaborative service (e.g., collaborative coding service, etc.), a competition service (e.g., a coding competition service, etc.), a testing service (e.g., code testing service, real-time testing service, etc.), a remote processing service (e.g., distributed processing service, parallel processing service, serial processing service, etc.) a pre-computing service (e.g., a constant pre-computing service, an eigenvalue pre-computing service, etc.), an analysis service (e.g., a data analysis service, etc.), a game service (e.g., coding game service, video game service, text game service, etc.), a puzzle service (e.g., coding puzzles), etc. These services may be offered to the client on a subscription basis, a per use basis, free of charge, in exchange for information, products, services, etc., received from the client, etc.

Exemplary Systems

FIG. 1 illustrates an exemplary system 100 that can be configured to practice an exemplary embodiment. System 100 may include client 110, network 120, server 130 and service provider 140. The embodiment of FIG. 1 and/or embodiments shown in other figures included herein are exemplary and other embodiments may include more devices or acts (e.g., processing acts illustrated in flowcharts), fewer devices or acts, and/or devices/acts in arrangements other than the arrangements shown in the figures included herein.

Client 110 may include a device that sends data to or receives data from another device, such as server 130. "Data," as used herein, may refer to any type of machine-readable information having substantially any format that may be adapted for use in one or more networks, devices, applications, etc. Data may include digital information or analog information. Data may further be packetized and/or non-packetized.

In an embodiment, client 110 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

Network 120 may include a network that transfers data (e.g., packet data or non-packet data). Implementations of network 120 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, etc.

Network 120 may further include network devices, such as routers, switches, firewalls, and/or servers (not shown). Network 120 may be a hardwired network using wired conductors and/or optical fibers and/or may be a wireless network using free-space optical, radio frequency (RF), and/or acoustic transmission paths. In one implementation, network 120 may be a substantially open public network, such as the Internet. In another implementation, network 120 may be a more restricted network, such as a corporate virtual network. Implementations of networks and/or devices operating on networks described herein are not limited to any particular data type, protocol, architecture/configuration, etc. For example, in one embodiment, network 120 may be a quantum network that uses quantum-compatible networking protocols.

Server 130 may include a device that receives data from, and sends data to, another device and/or network. For example, server 130 may include one or more server devices/computers (e.g., a workstation, mainframe, desktop computer, laptop computer, PDA, web enabled cellular telephone, smart phone, Wi-Fi device, smart sensor/actuator, or another type of device).

Implementations of server 130, and/or other devices in system 100, can include substantially any type of computing architecture/components, such as silicon-based components and/or supporting architectures, quantum-based components and/or supporting architectures, optical-based components and/or supporting architectures, etc. Server 130 may be implemented as a standalone device, a distributed arrangement of devices (e.g., a cluster or pool of devices) arranged in substantially any type of configuration (e.g., star, ring, grid, etc.). Distributed implementations of server 130 may further include devices, such as load balancers, network devices, etc., to allow distributed implementations of server 130 to operate in a determined manner.

In one implementation, server 130 may provide a service to other devices in system 100, such as client 110. For example, server 130 may provide remote processing services to client 110 via network 120. In an embodiment, server 130 may send code to client 110, and client 110 may install and run the code to perform remote processing operations using server 130. In another embodiment, client 110 may perform remote processing operations using code that operates on server 130. In this embodiment, server 130 may send results, such as display data, to client 110. In another embodiment, client 110 may operate in a hybrid configuration. In a hybrid configuration, client 110 may download a portion of the remote processing code from server 130 and may also use code that remains on server 130 when performing remote processing operations.

Service provider 140 may include a device that makes a service available to another device. For example, service provider 140 may include an entity (e.g., an individual, a corporation, an educational institution, a government agency, etc.) that provides one or more services to a destination using server 130 and/or other devices. Services may include instructions that are executed by a destination to perform an operation. Alternatively, a service may include instructions that are executed to perform an operation on behalf of a destination.

Assume, for sake of example, that a telecommunications provider operates a web server that provides one or more web-based services to a destination, such as client 110. The web-based services may allow client 110 to perform remote processing using hardware that is operated by the telecommunications provider (e.g., server 130). For example, client 110 may use service provider hardware to perform remote processing when client 110 subscribes to the offered web service. In one implementation, a customer (e.g., client 110) may receive services on a subscription basis. A subscription may include substantially any type of arrangement, such as monthly subscription, a per-use fee, a fee based on an amount of information exchanged between service provider 140 and the customer, a fee based on a number of processor cycles used by the customer, a fee based on a number of processors used by the customer, etc.

Figure 2:
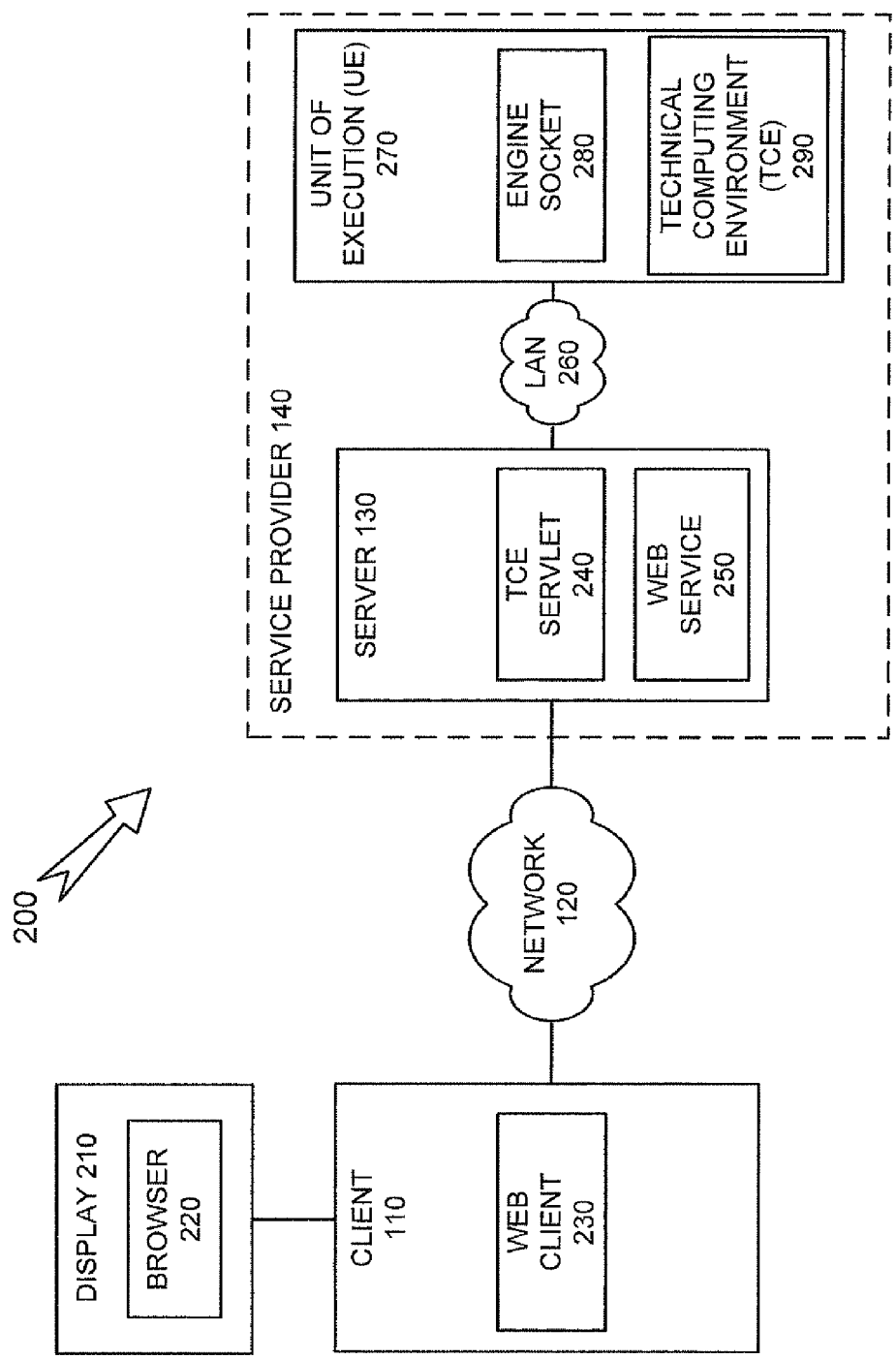
FIG. 2 illustrates an exemplary system that can be used to perform network-based technical computing.

FIG. 2 illustrates an exemplary system that can be used to perform network-based technical computing. System 200 may include client 110, network 120, server 130, service provider 140, display 210, browser 220, web client 230, servlet 240, web service 250, LAN 260, unit of execution (UE) 270, engine socket 280, and technical computing environment (TCE) 290.

Display 210 may include a device that renders information to a user, such as a user of client 110. Display 210 may include a cathode ray tube (CRT) device, a liquid crystal display (LCD) device, a plasma display device, a projection based display device (e.g., digital light projection (DLP)), a touch sensitive display device, etc. Display 210 may display text and/or graphics to a user based on instructions associated with client 110, server 130, or another device, such as another device on network 120 (not shown in FIG. 2). In one embodiment, display 210 may display a web browser 220 to a user. Browser 220 may include logic that displays text and/or graphics to a user and/or that may execute code (e.g., applets, plug-ins, etc.). Embodiments of browser 220 can include any type of application that allows a user to access information on a remote server, such as a Unix wget command, an file transfer protocol (ftp) client, an email client, etc.

Web client 230 may include logic operating on client 110 that makes use of a web service, such as web service 250. In one embodiment, web client 230 may display browser 220 on display 210. Web client 230 may also interact with web services that provide remote processing capabilities to client 110. Web client 230 may communicate with server 130 using secure connections (e.g., via using secure socket layer) and/or insecure connections.

In an embodiment, web client 230 may operate within a virtual machine, such as asynchronous JavaScript and extensible markup language (AJAX), Flash by Macromedia (now Adobe), Java virtual machine, etc. A virtual machine may refer to running multiple instances of code that run on a host computer but behave as if the code instances were running on separate host computers. For example, server 130 may run multiple instances of a virtual operating system where each instance of a virtual operating system operates independently of another instance of a virtual operation system on server 130. Virtual machines can operate in hierarchies (e.g., one virtual machine can operate within another virtual machine) or in parallel.

Server 130 may include servlet 240 and web service 250. Servlet 240 may include code that receives a request and returns a response. For example, servlet 240 may receive a request from web client 230 and may return a response that includes text, images, instructions, etc. In one embodiment, servlet 240 may receive multiple requests and may generate multiple responses that can be grouped in, for example, one or more sessions.

Web service 250 may include logic that supports machine-to-machine interactions over network 120. For example, web service 250 may include code that makes one or more remote processing services available to client 110. By way of example, a first web service may send code to client 110, and client 110 may execute the code to use distributed processors that perform remote processing operations. A second web service may display information on client 110 using a browser and may receive remote processing requests from client 110. The second web service may execute the requests on behalf of client 110 and may send remote processing results to client 110.

Web service 250 may include software, such as one or more application program interfaces (APIs), for sending information to and for receiving information from a destination, e.g., client 110. In one embodiment, web service 250 may communicate with client 110 using one or more standards, such as simple object access protocol (SOAP). Web service 250 may further use a type of message, such as hypertext markup language (HTML), extensible markup language (XML), etc., when communicating with client 110. Embodiments of web service 250 may expose TCE 290 to client 110 so that client 110 can perform remote processing or computing operations over network 120 and/or LAN 260.

LAN 260 may include a private network that allows server 130 to securely communicate with one or more UEs 270. Other embodiments of LAN 260 may be configured in other ways (e.g., as an open network).

UE 270 may include logic that performs processing activities on behalf of another device. Embodiments of UE 270 may be hardware based (e.g., a hardware unit of execution), software based (e.g., a software unit of execution), and/or based on a combination of hardware and software. For example, in one embodiment UE 270 may perform remote processing on behalf of client 110 using a single processing device. In another embodiment, UE 270 may perform remote processing (e.g., parallel processing) on behalf of client 110 using two or more processors, cores, etc. Implementations of UE 270 may perform remote processing in a number of ways, such as by performing remote processing activities related to task parallel processing, data parallel processing, stream parallel processing, etc. Implementations of UE 270 may be configured in substantially any manner. For example, a first UE may include a copy of TCE 290 and a second UE may not include a copy of TCE 290.

UE 270 may perform unidirectional communication with server 130 and/or client 110 and/or may perform bi-directional communication with server 130 and/or client 110. In unidirectional communication, UE 270 may receive a command and send a result to server 130 or client 110. In contrast, bidirectional communication may allow UE 270 to perform robust two way communication with server 130 and/or client 110. For example, UE 270 may send a request to server 130 for code, additional memory space, additional processing resources, etc. Alternatively, UE 270 may make remote display requests to client 110 to allow UE 270 to operate a display device on client 110. Bidirectional communication between a requesting device and a UE is described in co-pending application Ser. No. 11/706,805 entitled "Bi-directional Communication In A Parallel Processing Environment," filed: Feb. 14, 2007, the contents of which are incorporated herein by reference in their entirety. UE 270 may be identified using a parameter, such as a parameter that indicates that UE 270 is available to perform remote processing on behalf of server 130 and/or another device. In other embodiments, UE 270 may be identified using other techniques.

Engine socket 280 may include logic that operates as the endpoint of a communication link, such as a bi-directional communication link. In one embodiment, server 130 may include an engine socket (not shown in FIG. 2) that communicates with engine socket 280 on UE 270. Engine socket 280 may support encrypted or non-encrypted exchanges with server 130. Embodiments of engine socket 280 may be implemented in hardware based logic and/or software.

Technical computing environment (TCE) 290 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In an alternative embodiment, TCE 290 may be used to execute tasks not formally related to conventional technical disciplines, but still requiring execution of computations.

In one implementation, TCE 290 may include a dynamically typed language (e.g., a dynamically typed programming language) that can be used to express problems and/or solutions in mathematical notations familiar to those of skill in the relevant arts. For example, TCE 290 may use an array as a basic element, where the array may not require dimensioning. In addition, TCE 290 may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 290 may further provide mathematical functions and/or graphical tools (e.g., for creating plots, surfaces, images, volumetric representations, etc.). In one implementation, TCE 290 may provide these functions and/or tools using toolboxes (e.g., toolboxes for signal processing, image processing, data plotting, parallel processing, etc.). In another implementation, TCE 290 may provide these functions as block sets. In still another implementation, TCE 290 may provide these functions in another way, such as via a library, etc. TCE 290 may be implemented as a text based environment, a graphically based environment, or another type of environment, such as a hybrid environment that is both text and graphically based.

Figure 3A:
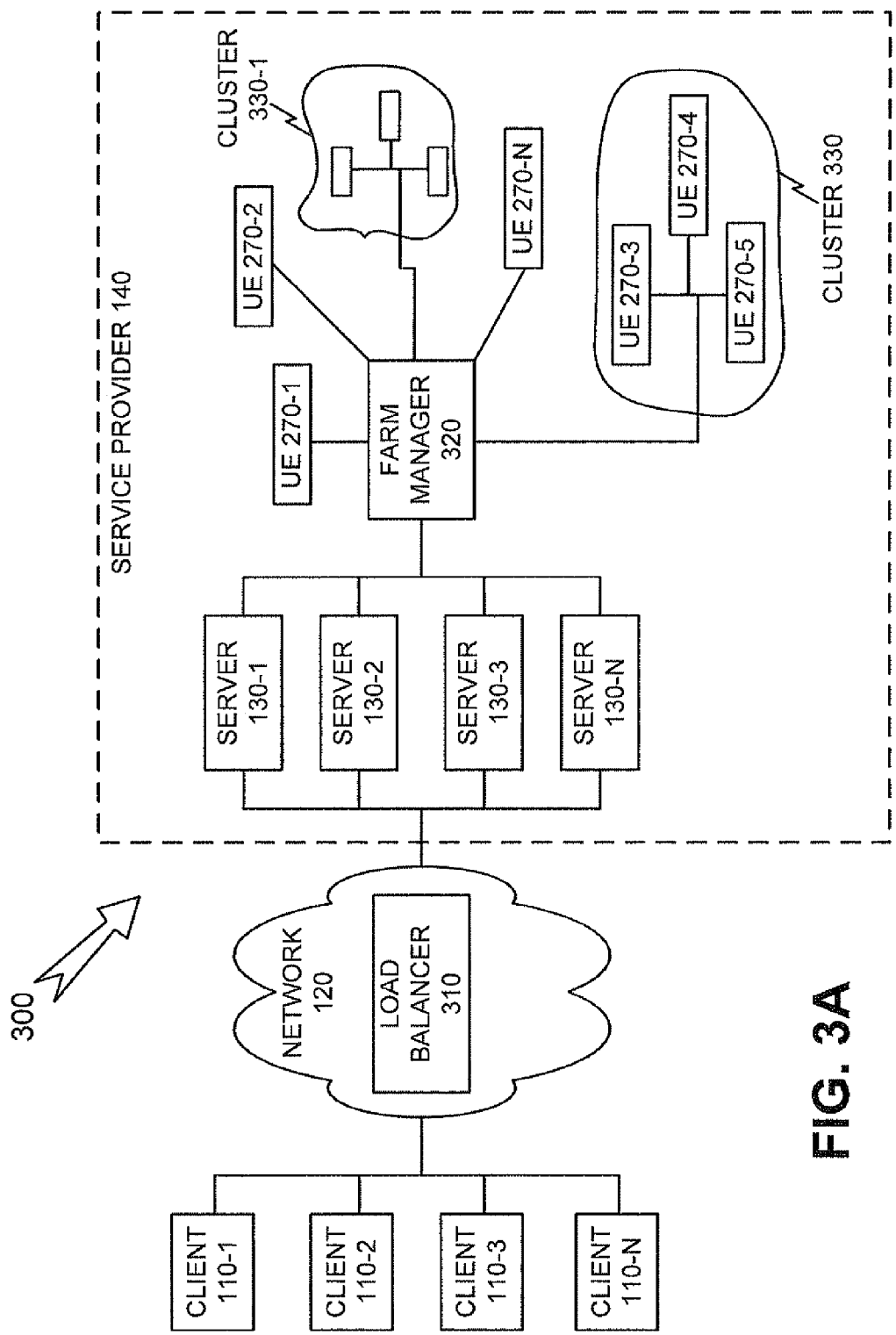
FIG. 3A illustrates an exemplary system that can include multiple clients and/or servers.

FIG. 3A illustrates an exemplary system that can include multiple clients and/or servers. System 300 may include a number of clients 110-1 to 110-N (collectively clients 110), network 120, a number of servers 130-1 to 130-N (collectively servers 130), service provider 140, a number of UEs 270-1 to 270-N (collectively UEs 270), load balancer 310, farm manager 320, cluster 330 and cluster 330-1 (collectively clusters 330).

Clients 110 can include a number of computers operated by a corresponding number of users or by a number of users that differs from a number of computers. Clients 110 may be related to each other, such as computers used by employees of a corporation, or may be unrelated to each other, such as residential computers operating in a number of households.

Network 120 may include one or more load balancers 310 to balance operational loads on network 120 and/or devices operating with network 120, such as servers 130. For example, a number of clients 110 may attempt to access TCEs 290 at substantially the same time using network 120. Logic in network 120, such as load balancer 310, may identify destinations being contacted, types of processing being sought by clients 110, etc., and may route certain clients to certain destination resources, such as servers 130. For example, load balancer 310 may route client 110-1 and client 110-3 to server 130-2 and may route client 110-2 to server 130-N. In alternative embodiments, load balancer 310 may be located elsewhere in system 300 and/or load balancing functionality may be incorporated into other devices, such as server 130, UE 270, farm manager 320, etc.

Servers 130 may operate with farm manager 320 when operating on requests from clients 110. For example, servers 130 may include web servers that interact with browsers 220 operating on clients 110. Servers 130 may, or may not, include actual processing hardware that is used to perform computations, such as technical computations, on behalf of clients 110. Servers 130 may use a device, such as farm manager 320, to select or deselect processing resources in a manner that provides at least a subset of clients 110 with desired levels of performance (e.g., with desired processing times, accuracies, pricing, etc.).

Farm manager 320 may include a device that maintains information about a number of processing resources and that uses the information to select processing resources on behalf of a requesting device. For example, farm manager 320 may include a server that maintains information about a number of UEs 270 that perform processing operations on behalf of a requesting device. Farm manager 320 may select one or more processing resources based on determined criteria, such as complexity of a problem, a type of processing problem, a determined processing interval, a processing cost, etc. Farm manager 320 may be configured to manage processing resources statically (e.g., according to fixed criteria) and/or dynamically (e.g., according to changing criteria, such as network loading, processing complexity, priorities, etc.).

UEs 270 and/or other devices can be arranged in groups, such as clusters 330, in one or more exemplary embodiments. Clusters 330 may allow resources to be managed in efficient ways as compared to resources managed without clusters 330. For example, it may be determined that grouping certain UEs 270 into clusters will enhance processing services provided to customers. In one embodiment, UEs 270-3, 270-4, and 270-5 may be grouped into cluster 330 because these UEs may include a specialized hardware/software configuration that allows a certain type of problem to be more efficiently processed in parallel among the UEs of cluster 330 than if the problem were processed by devices not arranged in a cluster. In this embodiment, it may further be determined that other UEs should operate individually, such as UE 270-1 and UE 270-2.

Clusters 330 may be formed according to substantially any type of criteria, such as a type of problem to solve, a fee charged to customers, an anticipated processing load or network load, a particular hardware or software configuration, a scalability parameter, an operational redundancy parameter, a processing latency value, a geographic configuration, etc.

Servers 130, UEs 270, farm manager 320, and/or clusters 330 may be operated by an entity, such as service provider 140 in an exemplary embodiment. In other embodiments, servers 130, UEs 270, farm manager 320, and/or clusters 330 may be operated by a number of separate entities.

Figure 3B:
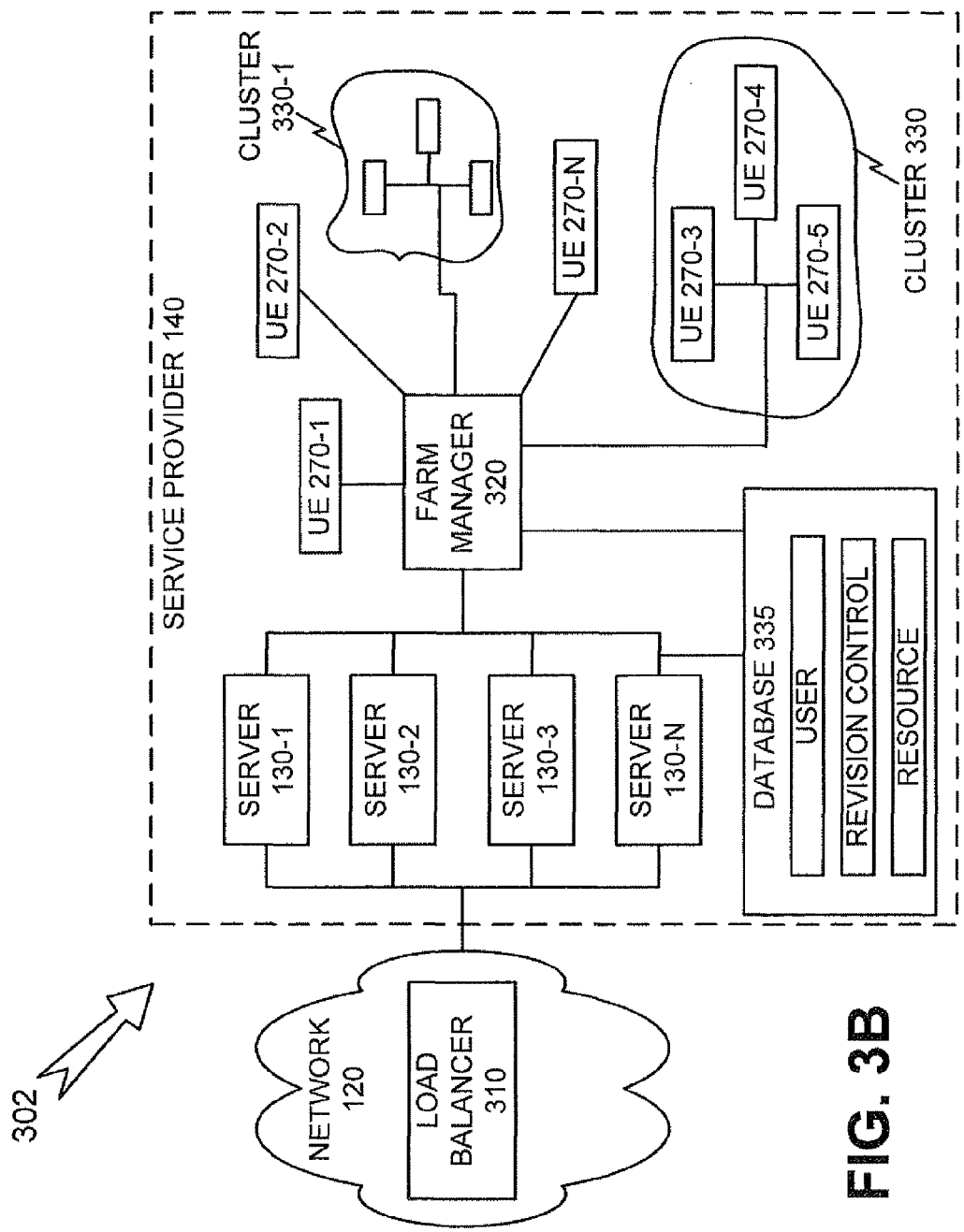
FIG. 3B illustrates an exemplary system that can include a database for storing information related to network-based technical computing.

FIG. 3B illustrates an exemplary system 302 that can include a database 335 for storing information related to network-based technical computing. System 302 may be configured similar to system 300 and may further include database 335. Database 335 may include logic that stores information on behalf of another device, such as servers 130 and/or farm manager 320. For example, database 335 may include an array of storage devices that store information used by devices operated by service provider 140.

An embodiment of database 335 may store user information, revision control information, and resource information. Other embodiments of database 335 may store other types of information. User information may include user identifiers, passwords, privileges, account information, code (e.g., simulation, modeling, analysis, etc., software), configuration information (e.g., hardware preferences), etc.

Revision control information may include revision identifiers, revision dates, size information, etc. For example, revision control information may include identifiers for particular versions of TCE 290 that operate on certain UEs 270. Revision control information may further include information that identifies differences between versions/releases of hardware or software operating in system 302, such as differences between versions/releases of TCEs 290, UEs 270, servers 130, etc.

Resource information may include identifiers for resources in system 302. For example, resource information may identify available UEs 270 that can be used to operate on a task submitted by client 110. Embodiments of database 335 may allow processing resources (e.g., UEs 270 and/or clusters 330) to be managed cost effectively as compared to managing resources without database 335. Resource information may be static or dynamic depending on configurations of system 302.

Information in database 335 may be used for many purposes, such as for generating reports. For example, service provider 140 can generate reports for users that identify types of processing performed, number of UE processing cycles used, remote processing costs, etc. Information in database 335 may be processed using, for example, an anonymizer to remove user identifiers so that information about system 302 can be made available to a destination without identifying a source from which the data was gathered. Information in database 335 may further be used to gather statistical information about devices in system 302. Statistical information can be used to identify development areas for service provider 140, to identify hardware purchases, to configure load balancing devices, etc.

Figure 3C:
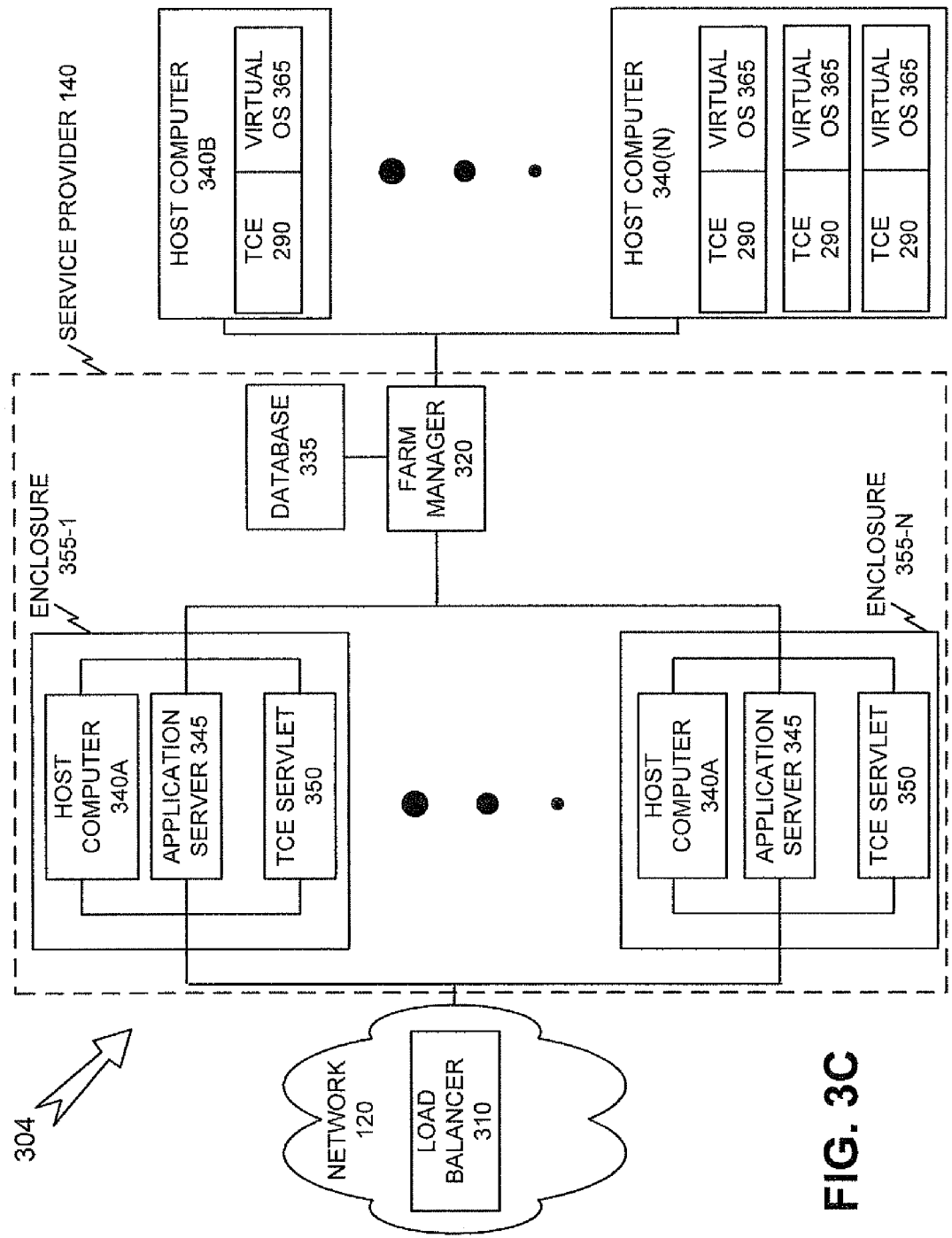
FIG. 3C illustrates an exemplary system that can include a farm manager to interact with multiple technical computing environments that perform technical computing operations.

FIG. 3C illustrates an exemplary system 304 that can include a farm manager that interacts with multiple technical computing environments that perform technical computing operations. System 304 may include a service provider 140 that includes one or more enclosures 355-1 to 355-N (collectively enclosures 355). Enclosures 355 may include hardware and/or software used to implement functionality associated with servers 130.

In one embodiment, enclosure 355 may include host computer 340A, application server 345 and TCE servlet 350. Host computer 340A may include logic that provides an operating system that supports server functionality, such as web serving, database read/write operations, user authentication, billing, etc. Host computer 340A may include logic based on open standards/specifications (e.g., UNIX) and/or proprietary standards/specifications.

Application server 345 may include logic that serves content, such as web pages, to one or more destinations, such as clients 110. Application server 345 may be based on open standards/specifications and/or proprietary standards/specifications. TCE servlet 350 may include logic that operates with application server 345 to provide TCE functionality to a destination. For example, TCE servlet 350 may receive a request from client 110 and may generate a response, where application server 345 makes the response available to client 110 via network 120.

Other implementations of host computers, such as host computer 340B to 340N, may include logic that differs from the logic included in host computer 340A. For example, host computer 340B may include TCE 290 and one or more virtual operating systems (OS) 365. Virtual OS 365 may include partitions within a device, such as a server, on which software is executed. For example, a server may include three partitions, such as is shown in host computer 340(N) where each partition includes a copy of virtual OS 365 running a copy of TCE 290. Virtualization allows a single device to run multiple copies of software as if each copy of software were operating by itself on the device. Virtualization is used to allow a device, such as a server, to support multiple users simultaneously without exposing one user's information (e.g., proprietary data) to information associated with another user.

Exemplary embodiments can launch or terminate copies of virtual OS 365 dynamically, such as based on user demands. In addition, exemplary embodiments can launch or terminate software applications operating within one or more copies of virtual OS 365 as needed to provide scalable processing for substantially any number of users (e.g., clients 110).

Exemplary Messaging Exchange

Figure 4:
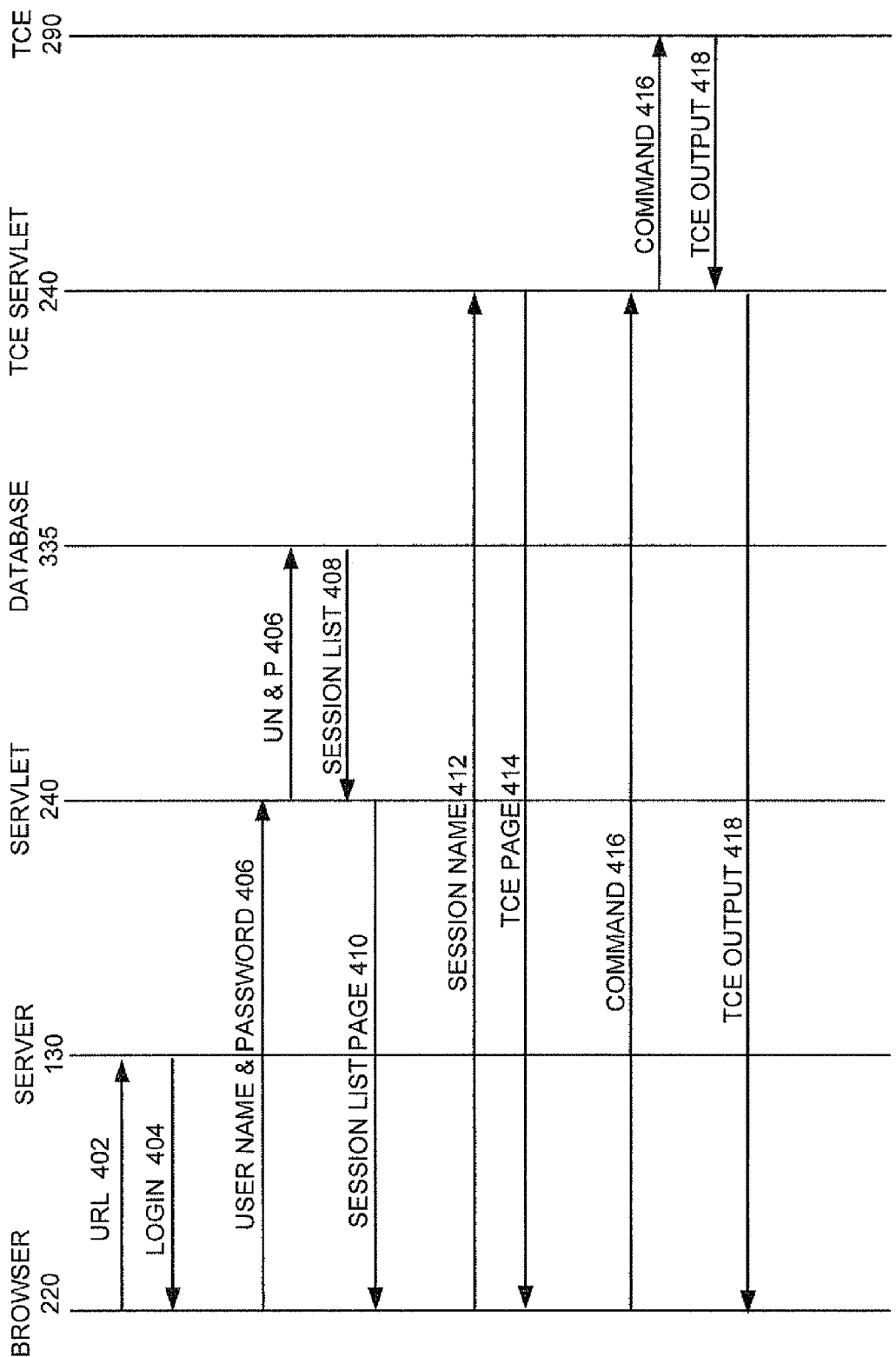
FIG. 4 illustrates exemplary messaging that can be used to support network-based technical computing.

FIG. 4 illustrates exemplary messaging that can be used with browser 220 to support network-based technical computing. Messages illustrated in FIG. 4 are illustrative and exemplary embodiments can include more messages, fewer messages, messages that differ from those illustrated in FIG. 4, and/or messages arranged in orderings that differ from the orderings of FIG. 4.

A user of client 110 may enter a universal resource locator (URL) into browser 220, where the URL is associated with a destination that provides remote processing resources. For example, the user may enter URL 402 into browser 220, and client 110 may send URL 402 to server 130 via network 120. Server 130 may return login information 404 to client 110, such as a login screen displayed in browser 220.

The user may enter a user identifier (e.g., a user name) and/or a password and client 110 may send username and password 406 to server 130. Server 130 may forward username and password 406 to database 335, where database 335 performs a lookup operation to determine whether the username and password are valid. Database 335 may send a session list 408 to server 130 when the username and password are valid. Database 335 may further maintain information about sessions in which the user and/or client 110 are engaged. Server 130 may provide information from session list 408 to client 110 via session list page 410. Session list page 410 may include a listing of sessions from which the user can choose.

The user may select one or more sessions from session list page 410. Client 110 may send session name 412 for a selected session to TCE servlet 240. TCE servlet 240 may process session name 412 and may return TCE page 414 to client 110, where TCE page 414 allows the user to enter information, such as a command that is compatible with TCE 290.

The user may enter an instruction, such as command 416, into browser 220 and client 110 may send command 416 to TCE servlet 240. TCE servlet 240 may process command 416 and may forward information in command 416 to TCE 290. TCE 290 may process information in command 416 and may generate an output, such as a result produced by executing an equation contained in command 416. TCE 290 may send TCE output 418 to TCE servlet 240, and TCE servlet 240 may forward TCE output 418 to client 110. The user may view information in TCE output 418, such as the result, in browser 220.

Exemplary System

Figure 5:
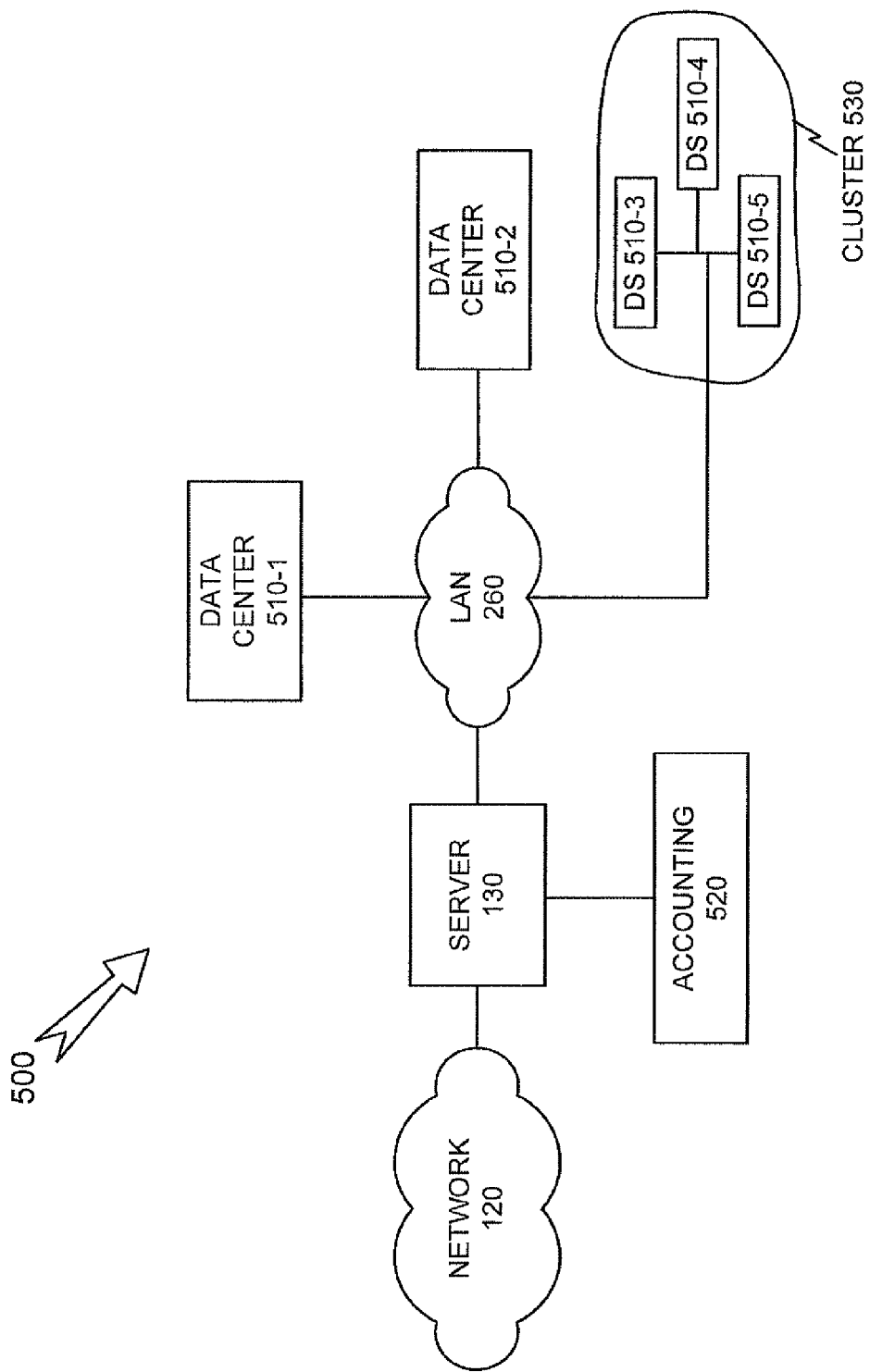
FIG. 5 illustrates an exemplary system that can include one or more data centers.

FIG. 5 illustrates an exemplary system 500 that can include one or more data centers. System 500 may include network 120, server 130, LAN 260, data center 510-1 to 510-5 (collectively data centers 510), accounting 520 and cluster 530. Data centers 510 may include a number of hardware or software based processing devices that can be used to perform remote processing. For example, data centers 510 may include a number of UEs 270 and management logic to administer UEs within a data center. For example data center 510-1 may include its own accounting logic that collects charges associated with processing resources within the data center. Data center accounting logic may forward its accounting information to another device, such as server 130 or accounting 520. Data centers 510 may operate alone (e.g., data center 510-1 and 510-2) or data centers may operate as a group (e.g., cluster 530).

Assume, for sake of example, that a university may include a number of computing centers that each include a number of processing devices, where each processing device is considered a UE. The university may further include management logic that allows the computing centers to collectively operate as a data center that can be accessed by a user wishing to perform remote processing. A data center may be capable of processing problems that are more complex than problems that can be solved by a UE or a group of UEs (e.g., cluster 330).

Accounting 520 may include logic that performs accounting operations on behalf of server 130. Accounting 520 may include a database that stores user information, expense information related to users, credits that users may obtain (e.g., when a user makes its processing devices available to other users wishing to perform remote processing), report generating logic (e.g., report generating components, report templates, etc.), audit logic, etc. In one embodiment, accounting 520 may maintain an electronic wallet for a user, where the user can deposit credits into the wallet and where debits incurred by the user are removed from the wallet. Electronic wallets may provide users with a convenient technique for managing costs associated with remote processing activities.

Figure 6:
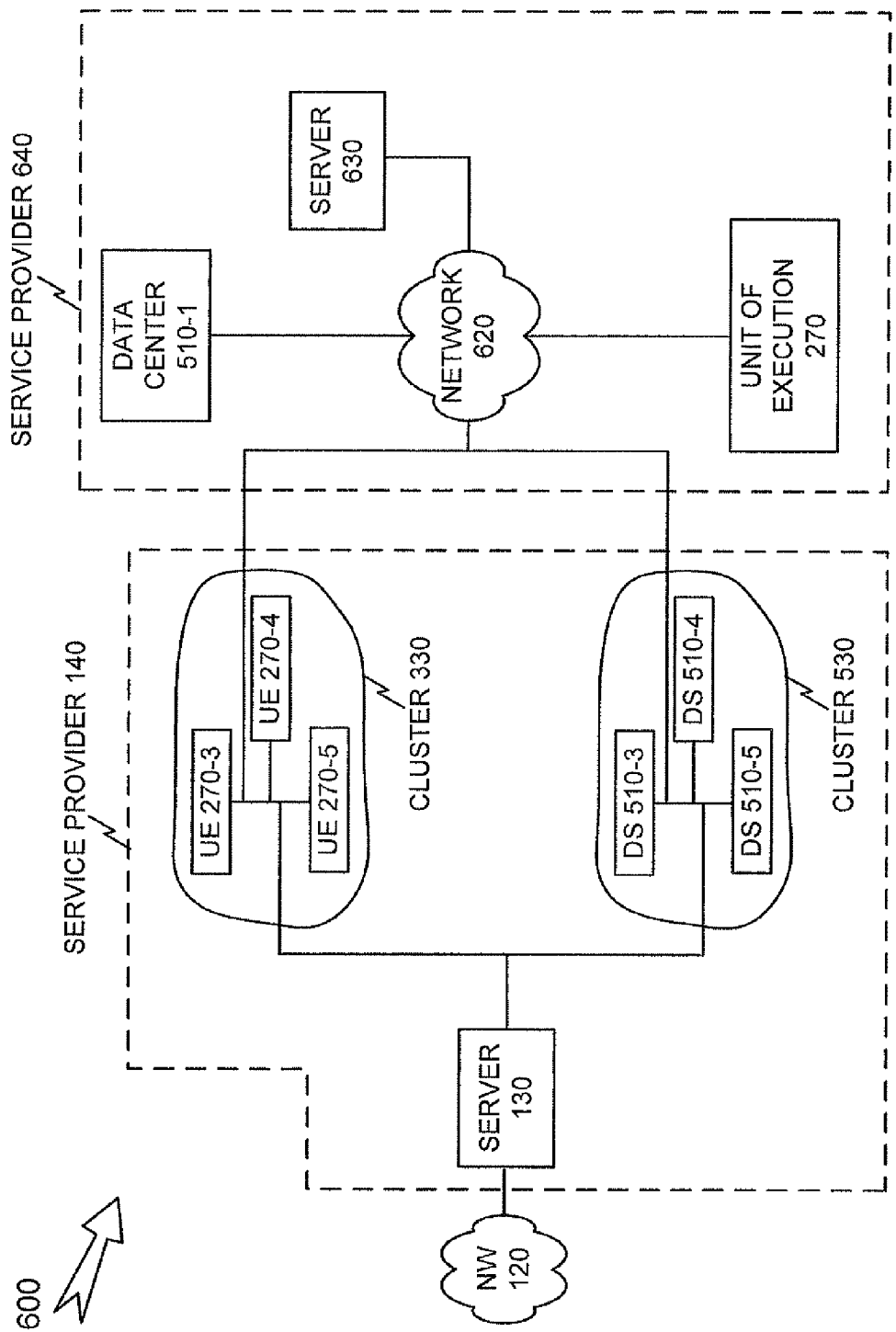
FIG. 6 illustrates an exemplary system that can include multiple service providers.

FIG. 6 illustrates an exemplary system 600 that can include two service providers. Exemplary embodiments may include two or more service providers 140 and 640 that can cooperatively operate to provide scalable remote processing resources to a number of customers. For example, service provider 140 may operate cluster 330 and cluster 530 using server 130 to provide remote processing resources to users. Another service provider, e.g., service provider 640, may maintain server 630, data center 510-1 and UE 270 to provide remote processing resources to users.

In one embodiment, service provider 640 may make its processing resources available to service provider 140 periodically, continuously, etc., to allow service provider 140 to service additional users and/or users with complex processing tasks. Alternatively, service provider 140 can provide processing resources to service provider 640 to allow service provider 640 to better serve its users. Exemplary embodiments can operate with any number of service providers 140, 640, etc., data centers 510, UEs 270, clusters 330, 530, etc., without departing from the spirit of the invention.

Exemplary Functional Diagram

Figure 7:
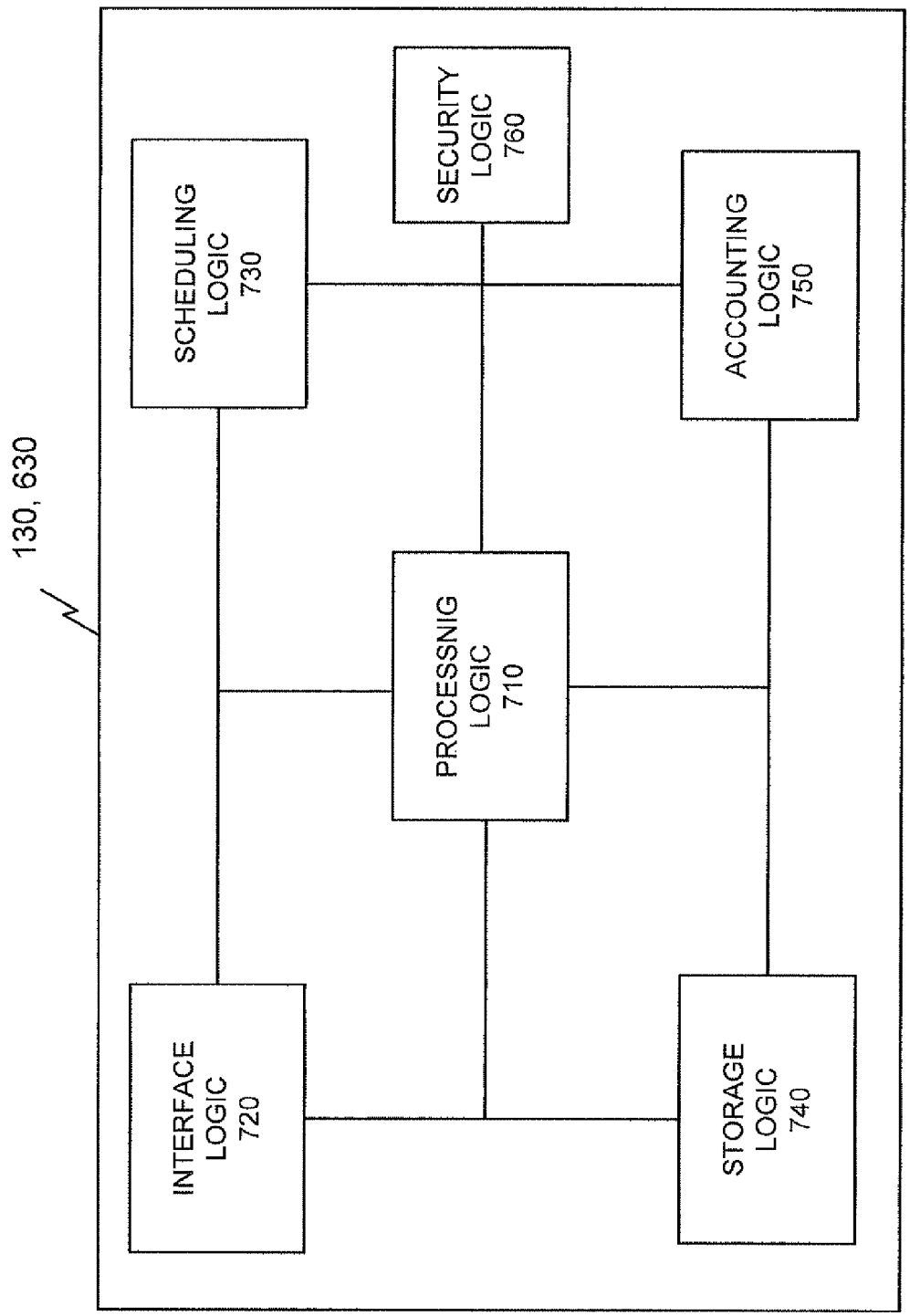
FIG. 7 illustrates an exemplary functional diagram that includes logic that can be used to implement a server.

FIG. 7 illustrates an exemplary functional diagram 700 that includes logic that can be used to implement server 130 or 630. Functional diagram 700 can include processing logic 710, interface logic 720, scheduling logic 730, storage logic 740, accounting logic 750, and security logic 760. Logic in FIG. 7 can reside on a single device, such as server 130, or the components of FIG. 7 can be distributed across multiple devices. Moreover, the components of FIG. 7 can be implemented in hardware based logic, software based logic, a combination of hardware and software based logic (e.g., hybrid logic, wetware, etc.). The implementation of FIG. 7 is exemplary, and server 130, 630 and/or other devices may include more or fewer functional components without departing from the spirit of the invention.

Processing logic 710 may include logic to process instructions or data related to activities. For example, processing logic 710 may instruct other logic to perform operations, may parse a user problem into a number of portions that can be sent to different UEs 270, combine results received from different UEs 270 into a single result, perform arithmetic operations, etc.

Interface logic 220 may send information to or may receive information from another device, component, object (e.g., a software object), etc. In one implementation, interface logic 220 may include a code-based interface (e.g., an application program interface (API)), and in another implementation, may include a hardware interface, such as a network interface card (NIC).

Scheduling logic 730 may coordinate activities of devices, components, objects, etc., on server 130, 630. For example, scheduling logic 730 may maintain a list of available resources that can be used for distributed and/or parallel processing (e.g., UEs 270). Scheduling logic 730 may send information to a determined number of available resources so that the resources can perform parallel processing activities using the information. For example, scheduling logic 730 may determine that four UEs 270 are required to perform a simulation on behalf of client 110. Scheduling logic 730 may determine how to schedule portions of the simulation among the four UEs 270. Scheduling logic 730 may send the simulation portions to the four UEs 270 via interface logic 720.

Storage logic 740 may store information related to server 130, 630. In an embodiment, storage logic 740 may store instructions, equations, functions, data, communication protocols, availability information for devices (e.g., UEs 270), etc.

Accounting logic 750 may perform operations that monitor client activities and/or activities of other devices associated with server 130/630. For example, accounting logic 750 may measure the amount of time, processor cycles, memory, types and number of applications or modules, etc., used by client 110 when client 110 is performing remote processing activities via server 130,630. Accounting logic 750 may also compute charges and/or credits for client 110. Accounting logic 750 may operate with other devices, such as electronic banking devices external to server 130,630, when performing accounting operations on behalf of server 130,630.

Security logic 760 may perform operations that identify and/or verify the identity of a user related to client 110 and/or the identities of devices that perform remote processing activities on behalf of the user. For example, security logic 760 may verify user identifiers and/or passwords, client network addresses, may establish communication tunnels on behalf of a client, etc.

Exemplary Data Structure

Figure 8:
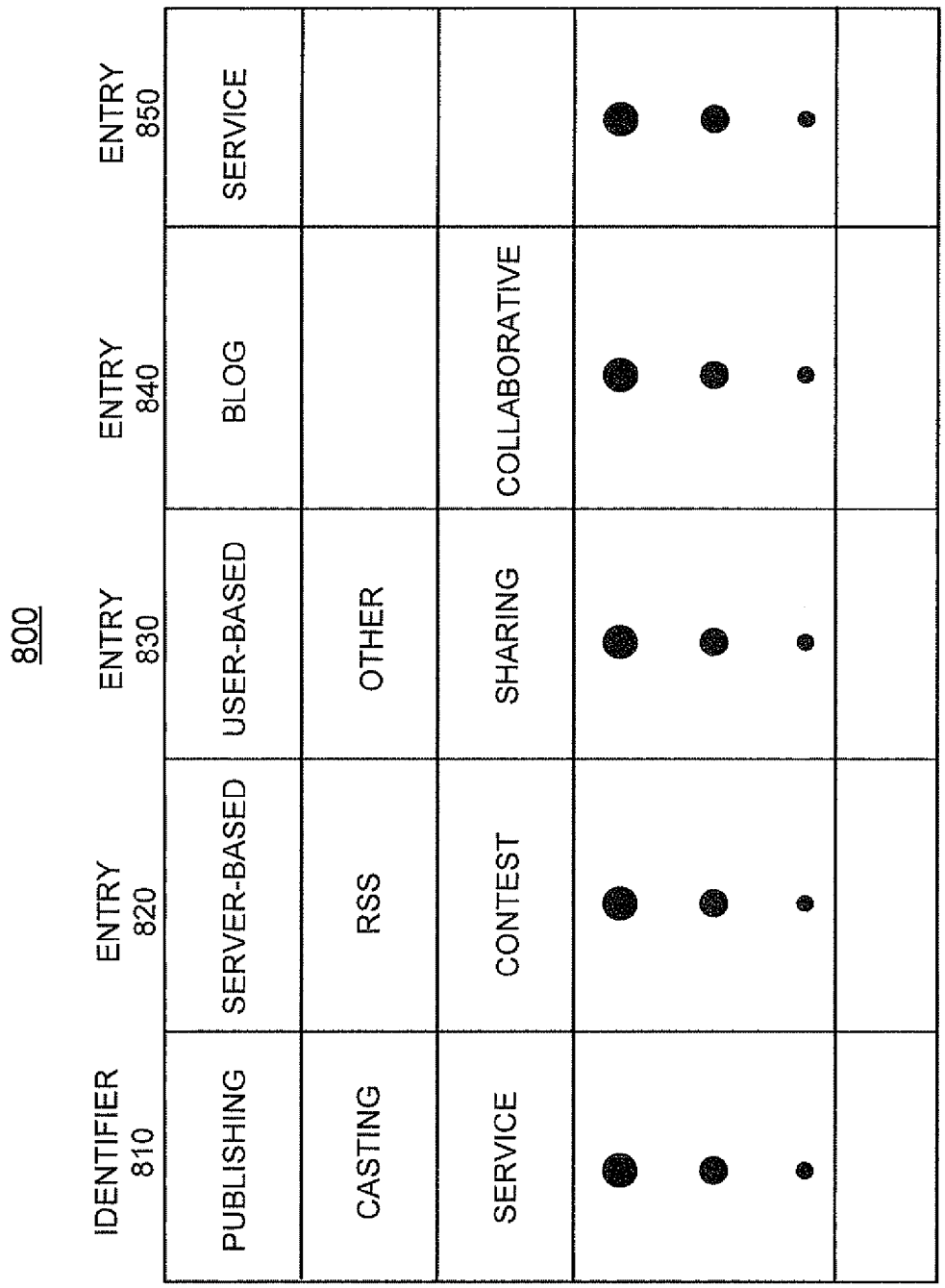
FIG. 8 illustrates an exemplary data structure that can store information about operations performed by a server.

FIG. 8 illustrates an exemplary data structure 800 that can store information used by server 130. Data structure 800 may be implemented on a computer-readable medium that can be used to store information in a machine-readable format. Information stored in data structure 800 may be processed, executed, etc., via processing logic 710. Exemplary embodiments of server 130 may use substantially any number and/or type of data structures 800 to store information associated with remote processing. Instances of data structure 800 may be populated via an operator or a device, such as a device in system 100, 200, etc. In one implementation, data structure 800 may include information arranged in a row and column format to facilitate interpretation by an operator of server 130, by devices associated with server 130, etc. Other implementations of data structure 800 may be configured in other ways.

Data structure 800 may include identifier 810, entry 820, 830, 840, and 850 (collectively entries 820). Identifier 810 may include information that uniquely identifies an activity performed by server 130, such as publishing, casting, serving, etc. Entries 820 may include information related to an entry identified using identifier 810. For example, server 130 may perform "publishing" (in entry 810) activities using network 120. Publishing may include activities that make information available to a destination. For example, server-based publishing (in entry 820) may make content, such as remote processing content, available to a destination (e.g., client 110) using a server (e.g., server 130, 630, etc.). In a server-based publishing embodiment, a client may access content associated with the server when the client wants to perform remote processing activities.

User-based publishing (in entry 830) may allow client 110 to make content available to other devices. For example, a user of client 110 may write a simulation application that can be used by other clients on system 300. Client 110 may make the simulation application available to other clients directly or via a proxy (e.g., client 110 may post the application on a web page maintained by a server).

Blog publishing (in entry 840) may allow information related to remote processing to be made available to destination devices via a web log.

Service-based publishing (in entry 850) may make information about remote processing available to destinations as part of a service, such as a subscription-based service.

"Casting" (in identifier 810) may refer to distributing content to destinations using techniques, such as really simple syndication (RSS) feeds (entry 820) and/or other techniques. "Service," in identifier 810, may refer to services that can be offered using server 130, where the services can be related to remote processing. For example, server 130 may host one or more contests (in entry 820) that are related to remote processing. Examples of contests are, but are not limited to, coding competitions where participants attempt to write the most compact, fastest, most accurate, etc., code for a given problem; first to solve competitions where the first user to successfully solve a problem wins; etc.

Another type of service is a collaborative service (in entry 840) that allows users to share and/or collaboratively develop code amongst each other. For example, a first user may write an application to solve a certain problem and a second user may improve the application. A third user may use the improved application to solve the problem and may provide feedback to the first and/or second user about the performance of the improved application.

Implementations of data structure 800 and/or other machine-readable structures compatible with client 110, server 130, and/or other devices in FIGS. 1, 2, 3A-C, 5, 6 and 7 can be used locally on a device (e.g., stored, read, copied, transferred from one component to another component in that device) or may be sent from one device to another device over a communication medium (e.g., a wired link, a wireless link, a network, a bus, etc.). Therefore, embodiments of data structures discussed herein are not limited to any particular implementation, format, language, device, configuration, etc. For example, some or all of data structure 800 can be used as code-based interfaces (e.g., APIs) or embedded in hardware to facilitate the exchange of information in exemplary embodiments.

Figure 9A:
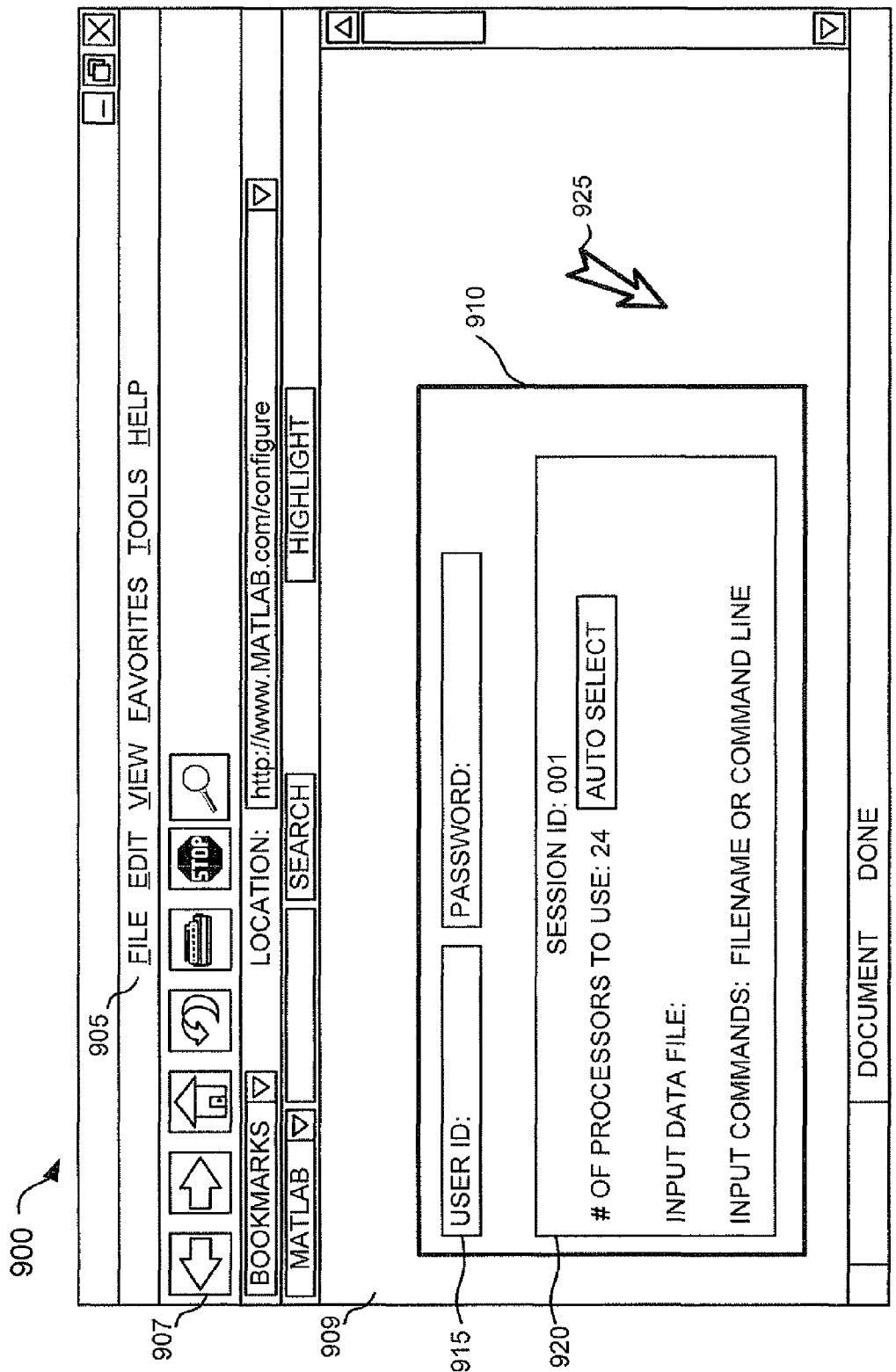
FIGS. 9A-9C illustrate exemplary user interfaces that can be displayed on a client.
Figure 9B:
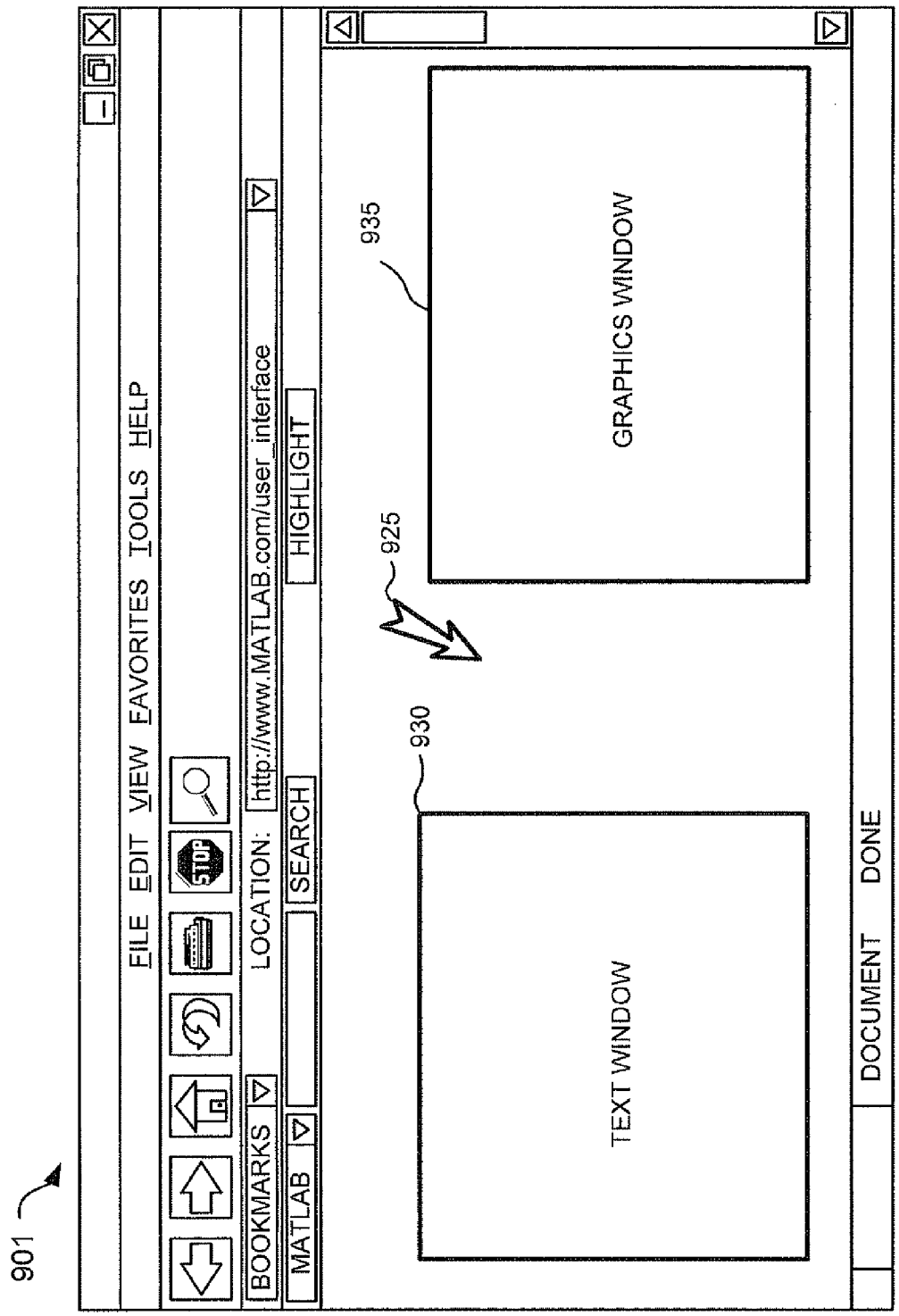
Figure 9C:
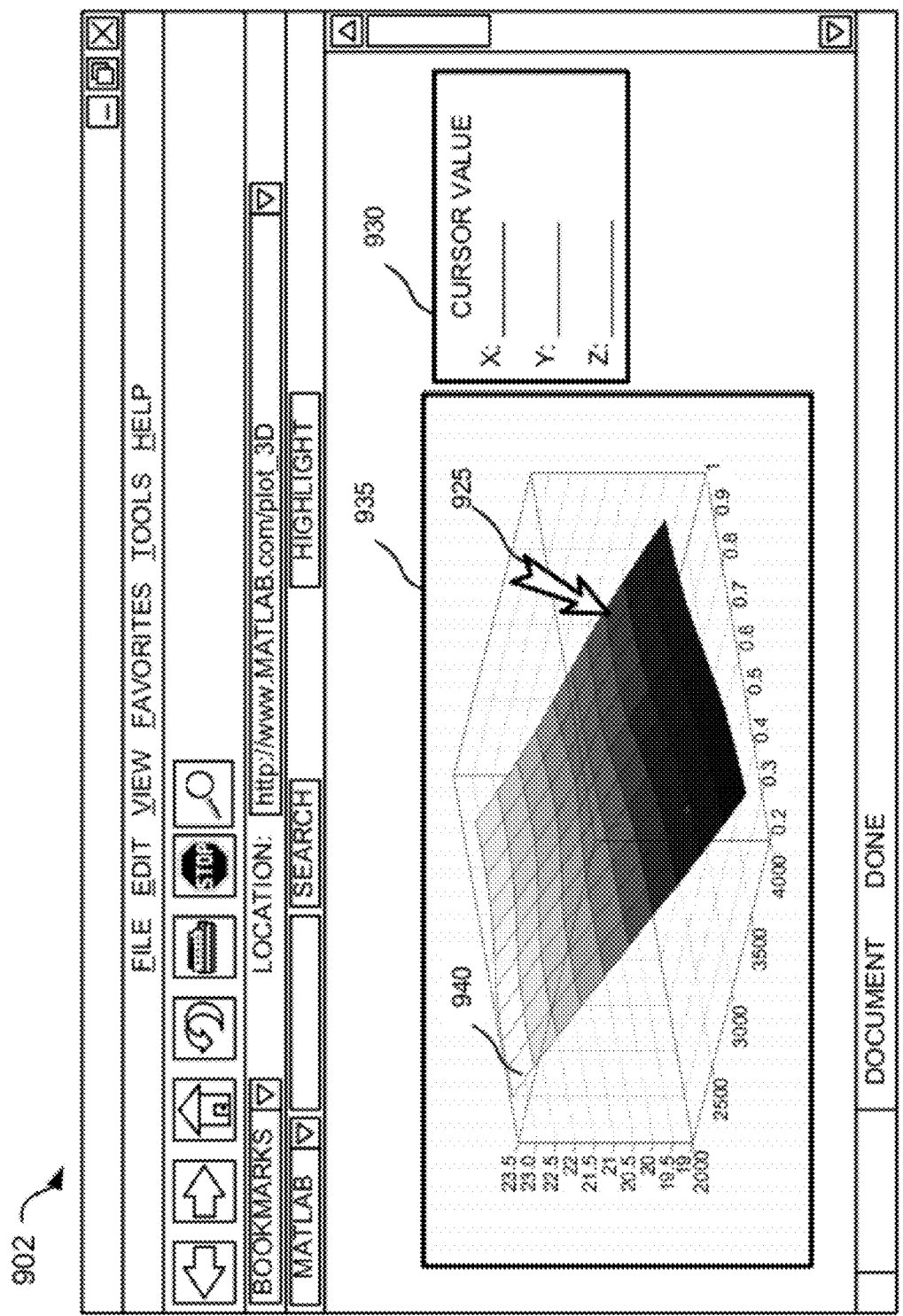

FIGS. 9A-9C illustrate exemplary user interfaces that can be displayed on client 110. In FIG. 9A, interface 900, as well as other interfaces described herein, may be a graphical user interface (GUI) displayed to a user via browser 220 and/or a non-graphical interface, such as a text interface. Interface 900 and/or other user interfaces described herein may further provide information to users via customized interfaces (e.g., proprietary interfaces) and/or interfaces that are generally known to and available those of skill in the art (e.g., browser-based interfaces).

User interfaces described herein, may receive user inputs via input devices, such as but not limited to, keyboards, pointing devices (e.g., a mouse, stylus, trackball, touchpad, joystick, other types of motion tracking devices, etc.), biometric input devices, touch sensitive displays, microphones, etc. User interfaces described herein may be user configurable (e.g., a user may change the size of the user interface, information displayed in a user interface, color schemes used by the user interface, positions of text, images, icons, windows, etc., in the user interface, etc.) and/or may not be user configurable.

Interface 900 may be displayed to a user via display 210 and may include menu 905, selection icons 907, display area 909, information window 910, login information 915, session information 920 and cursor 925. Menu 905 may include information associated with menus that are accessed by the user. For example, in one embodiment, menu 905 may identify items, such as File, Edit, View, etc., that can be selected by a user (e.g., via cursor 925) to open one or more drop down menus. Drop down menus may provide the user with substantially any number of items that can be selected by the user to invoke various types of functionality on the user's behalf. For example, selecting File may open a drop down menu that includes Open, Close, Save, Save As, Print, Print Preview, etc. Interface 900 may further include icons that let the user perform actions, such as moving to a previous display, returning to a home display (or page), printing the contents of a portion of interface 900, etc.

Icons 907 may include mechanisms that perform predetermined functions on behalf of the user based on a user input. For example, an icon may include an arrow that points in a first direction and allows the user to scroll back to a previous display when the arrow is selected by the user. In an embodiment, icons 907 may be associated with a piece of executable code (e.g., a widget) that performs an operation on behalf of a user when icon 907 is selected. Display area 909 may include a portion of display 210 that is used to display information to a user.

Information window 910 may include a portion of a display region that is used to display information to a user, such as information about remote processing performed by the user. Information window 910 may display text or graphics to the user. For example, information window 910 may display login information, such as user identification (ID) and password 915, session information 920, etc., to a user of client 110. In addition, information window 910 may display information about UEs 270, a status of a parallel remote processing task, source code, debugging information that allows the user to diagnose code, a dashboard to provide the user information about a remote processing session, etc.

Cursor 925 may include a mechanism that can be positioned by a user or device to identify and/or select information in interface 900. Cursor 925 may be positioned within interface 900 via a pointing device, a spoken command, a keyboard input, etc.

FIG. 9B illustrates an exemplary user interface 901 that can include a text window 930 and a graphics window 935. Text window 930 may display text information (e.g., debugging information, source code, help guide information, operating instructions, etc.) to a user. Graphics window 935 may display images, data, diagrams, etc., to a user. In other embodiments, text and graphics can be displayed to a user via a single window.

FIG. 9C illustrates an exemplary user interface 902 that displays data to a user. Interface 902 may include plot 940 within graphics window 935. For example, a user may have performed an optimization on parameters associated with an automobile engine (e.g., optimizing engine performance over a determined range of engine speeds), where the optimization was performed using remote processing resources (e.g., virtualized TCEs) on a network. Results of the optimization may be sent to client 110 and displayed to the user via browser 220 using plot 940.

Graphics window 935 may interact with the user, such as by allowing the user to select portions of plot 940. For example, the user may move cursor 925 over plot 940 within graphics window 935. Cursor 925 may operate with logic (e.g., executable code) that displays information about the position of cursor 925 in text window 930. For example, text window 930 may display coordinate information for cursor 925 to the user.

Exemplary Client Processing

Figure 10:
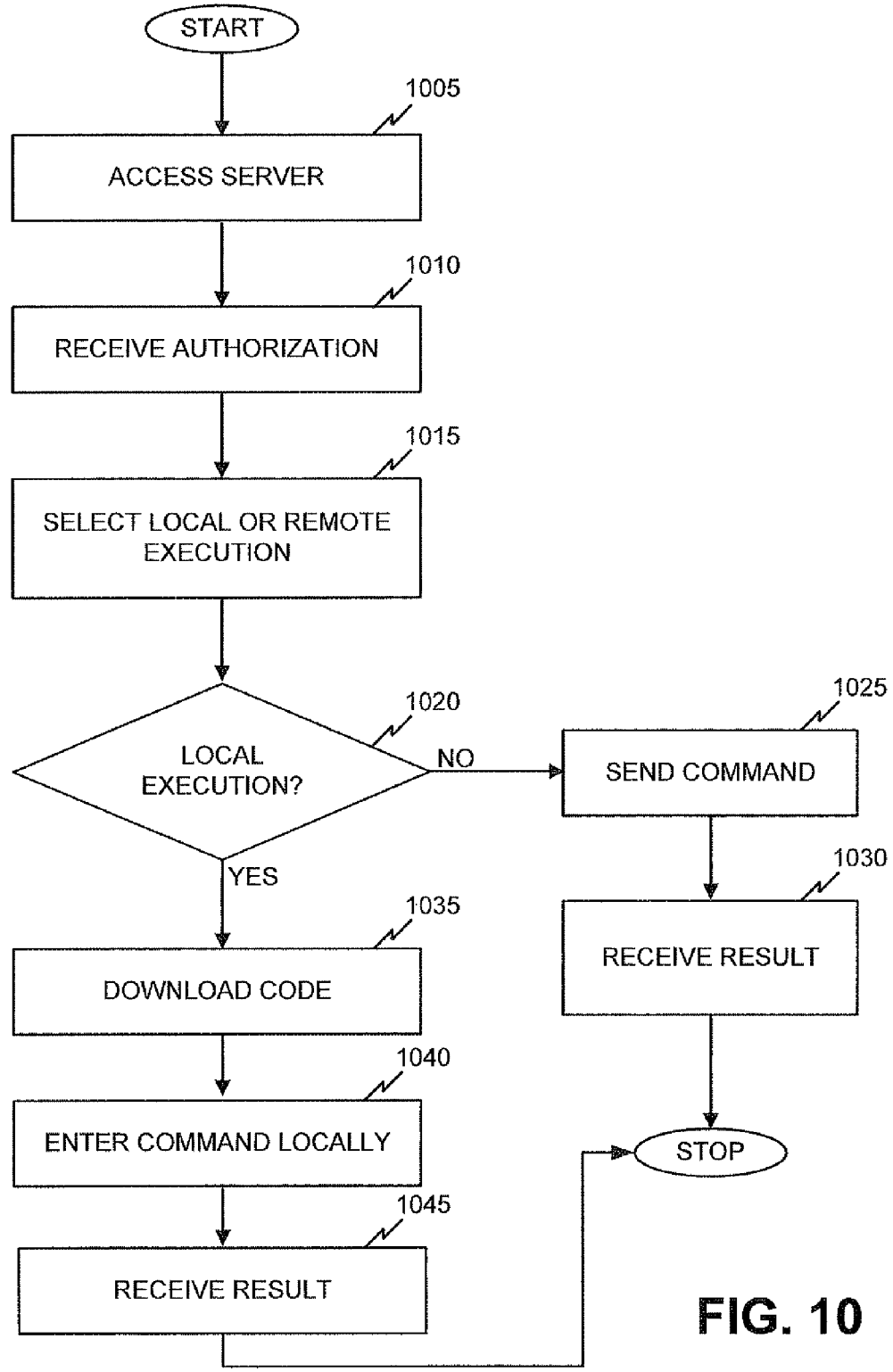
FIG. 10 illustrates exemplary processing performed by a client.

FIG. 10 illustrates exemplary processing that may be performed by a client. A user may access server 130 via client 110 (act 1005). For example, the user may enter a URL for server 130. The URL may be sent to server 130 as message 402 and server 130 may send login 404 to client 110 when message 402 is processed. The user may enter a user identification and/or password and may send them to server 130. Server 130 may determine whether the user identification and/or password are valid. Client 110 may receive an authorization when server 130 determines that the user identification and/or password are valid (act 1010).

An authorized user/client may select local or remote execution (act 1015). For example, a user may select local execution when the user wants to execute a portion of remote processing code locally on client 110. In contrast, the user may select remote execution when the user does not want to execute remote processing code on client 110. In certain applications, a user may not wish to download code for local execution because downloading code may delay execution of remote processing activities until the download is complete. A user may further not wish to download code for local execution when the user is operating a client with limited processing capabilities. For example, a thin client may not have adequate processing power to execute remote processing code locally.

Client 110 may determine whether local or remote execution is desired based on the user selection in act 1015 (act 1020). When remote execution is selected by the user, client 110 may send a command to server 130 for remote execution (act 1025). For example, client 110 may send a simulation problem to server 130, where the simulation is to be run using remote processing resources connected to server 130. Server 130 may parse the simulation into pieces and may send the pieces to two or more UEs 270 for processing. Server 130 may receive results from UEs 270 and may assemble the results into a final result. Client 110 may receive the final result from server 130 via network 120 (act 1030).

When client 110 selects local execution at act 1020, client 110 may download code from server 130 via network 120 (act 1035). For example, server 130 may send code to client 110 that parses a problem into pieces, determines what UEs 270 are available, sends the problem pieces to identified UEs 270, and assembles UE 270 results into a final result. The user may enter and run a remote processing command locally at client 110 (act 1040). Client 110 may interact with two or more UEs 270 to produce a final result for the user. Client 110 may receive two or more results from UEs 270 and may assemble the results into a final result (act 1045). Client 110 may display the final result to the user via display 210.

Exemplary Server Processing

Figure 11:
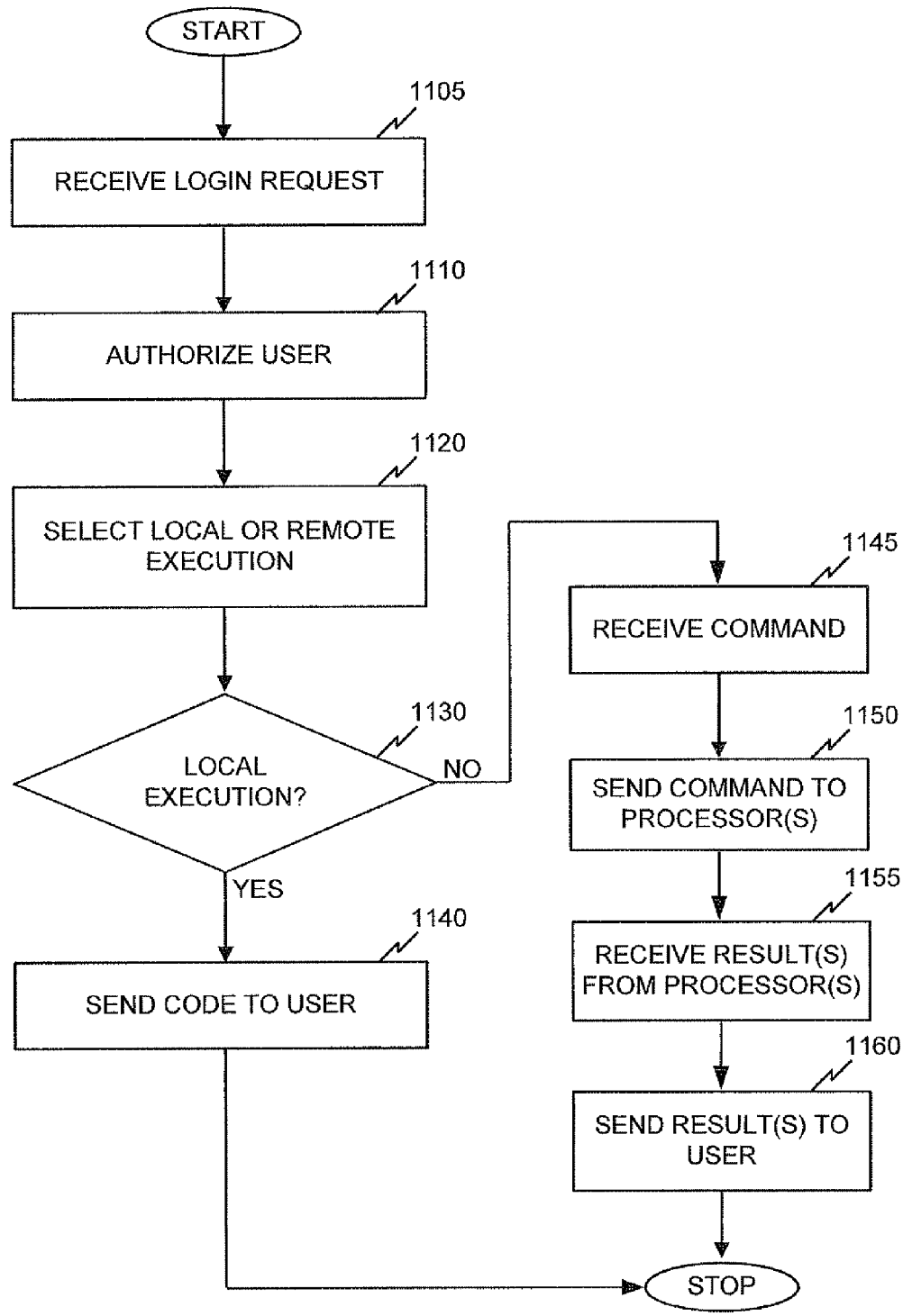
FIG. 11 illustrates exemplary processing performed by a server.

FIG. 11 illustrates exemplary processing that may be performed by server 130. Server 130 may operate a web service 250 that exposes a TCE to one or more clients 110. Web service 250 may process logins, may receive user commands, may coordinate remote processing activities on behalf of clients 110, and may send results to clients 110.

Server 130 may receive a login request from client 110 using web service 250 (act 1105). For example, server 130 may receive message 406. Server 130 may process the login request and may authorize client 110 (act 1110). For example, server 130 may use security logic 760 and/or user information from database 335 to authorize client 110.

Server 130 may select local or remote execution based on information received from client 110 or based on information in database 335 (act 1120). For example, server 130 may receive a request for local or remote execution from client 110. Alternatively, server 130 may maintain information in database 335 as to whether client 110 should run in a local or remote mode. For example, database 335 may include information that indicates client 110 has only rudimentary processing capabilities; and, therefore, client 110 should always run via remote execution (i.e., client 110 should not run remote processing code locally).

Server 130 may determine that client 110 should operate via remote execution (act 1130), and server 130 may receive a command from client 110, where the command is for remote processing (act 1145). Server 130 may process the command (e.g., may process command 416) and may send the processed command to one or more UEs 270. For example, server 130 may determine that the command should be sent to two UEs operating individually and to one cluster that includes three UEs. Server 130 may send the command and any necessary data (e.g., data that will be operated on by the command) to the two individual UEs and to the cluster) (act 1150).

Server 130 may receive results from devices performing remote processing on behalf of client 110 (act 1155). For example, server 130 may receive a first result from a first one of the two individual UEs, a second result from the second UE and a third result from the cluster. Server 130 may assemble the results into a final result, where the final result includes information from the first result, the second result and the third result. Server 130 may send the final result to client 110 via network 120 (act 1160). Client 110 may display the final result to the user via, for example, browser 220.

When server 130 determines that local execution should be used in act 1130, server 130 may send code to client 110 or to a user of client 110 (act 1140)

Figure 12:
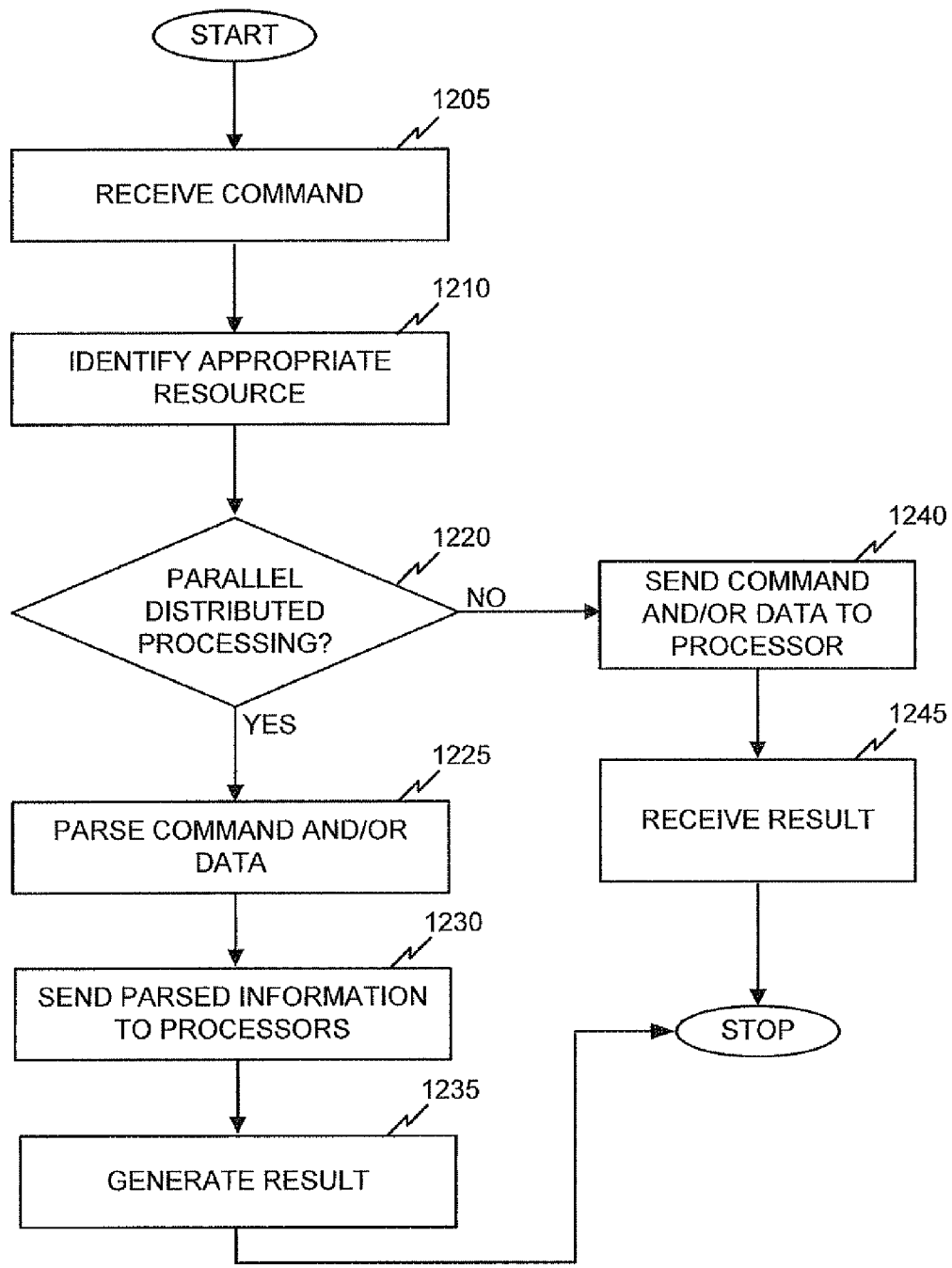
FIG. 12 illustrates exemplary processing performed by a server.

FIG. 12 illustrates exemplary processing that may be performed by a server. Server 130 may make determinations with respect to processing resources that can be used on behalf of client 110 to perform remote processing. For example, server 130 may receive a command from client 110, where the command includes an instruction that can be processed by remote (e.g., distributed) devices (act 1205). Server 130 may process the command to determine how the command should be allocated among remote processing resources (e.g., UEs 270). For example, server 130 may perform a database lookup using database 335 to identify resources that can be used for remote processing on behalf of client 110.

Server 130 may identify appropriate remote processing resources (act 1210). For example, server 130 may determine that the command should be operated on by cluster 530 and data center 510-1. In one embodiment, server 130 may make this determination based on the availability of cluster 530 and data center 510-1. In another embodiment, server 130 may make the determination based on a priority associated with the command and/or client 110, based on a fee that client 110 is willing to pay for remote processing, etc.

Server 130 may determine whether parallel processing should be performed on the command, and/or data operated on using the command (act 1220). When server 130 determines that parallel processing should be performed, server 130 may identify resources that can perform the parallel processing.

Server 130 may parse the command and/or data (act 1225). For example, server 130 may determine that cluster 530 and data center 510-1 are the most desirable resources to perform parallel processing on the command; however, when server 130 attempts to send the request to data center 510-1, data center 510-1 may inform server 130 that it is busy and cannot perform processing on behalf of client 110. Server 130 may dynamically adjust configuration of parallel processing resources based on the busy status of data center 510-1 and may send a portion of the command to data center 510-2.

Server 130 may send parsed information, such as the command, to devices that perform parallel processing on behalf of client 110 (act 1230). The remote devices may operate on their portions of the command and may produce results that are sent to server 130. Server 130 may assemble the results into a final result (act 1235) and may send the final result to client 110.

In act 1220, server 130 may determine that parallel processing should not be performed. Server 130 may send a command received from client 110 and/or data received from client 110 to a single processing device (act 1240), where the single device performs processing for client 110. Server 130 may receive a result from the processing device (act 1245) and may send the result to client 110.

Exemplary embodiments may be deployed in a number of arrangements to perform types of remote technical computing tasks. For example, embodiments may participate in remote computing using various communication link configurations, using a quick command service, using scheduled sessions, using a number similar software applications, using resources that compute results within a determined time interval, using logic that monitors computing applications, and using published code. Examples of these embodiments will be further described below.

Exemplary Unit of Execution Arrangements

Client 110 may operate in a number of configurations to perform remote processing using two or more units of execution. FIGS. 13A-E illustrate high level schematics of selected exemplary configurations that can be used to provide client 110 with a number of remote processing services via UEs 270.

Figure 13A:
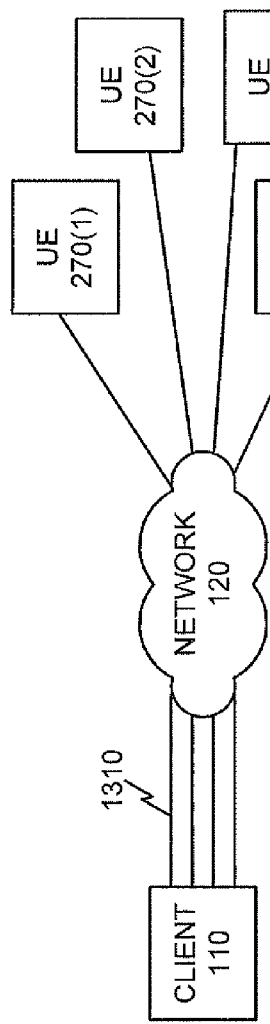
FIGS. 13A-13E illustrate exemplary embodiments that can perform remote processing operations on behalf of a client.

FIG. 13A illustrates a client 110 that maintains a number of connections (e.g., links) to a network when performing remote processing activities. In the embodiment of FIG. 13A, network 120 may include hardware and/or software devices that receive requests from client 110 via links 1310. For example, client 110 may wish to use four remote processing services and may initiate four links with network 120. By way of example, client 110 may wish to use a collaborative coding service, a remote testing service, a remote processing service, and a remote coding competition service (e.g., a service that allows client 110 to participate in contests where participants generate code to see which programmer writes the most efficient, shortest, or simplest piece of code to solve a particular problem). Network 120 may send the first request for the collaborative coding service to a first UE (e.g., UE 270(1)), the second request for the remote testing service to a second UE (e.g., UE 270(2)), the third request for the remote processing service to a third UE (e.g., UE 270(3)), and the fourth request for the collaborative coding service to a fourth UE (e.g., UE 270(4)). The respective services may return results to client 110 via network 120 and the four links 1310.

In the embodiment of FIG. 13A, client 110 may dynamically set up and/or teardown links 1310. For example, client 110 may set up or teardown links based on processing needs, computation costs, etc. By way of example, assume that UE 270(1) finishes processing before another UE, e.g., UEs 270(2), (3) and (4). Further assume that client 110 tears down link 1310 when client 110 receives results from UE 270(1) while leaving links to the other UEs in place. Alternatively, client 110 may teardown a link to another UE, e.g., UE 270(2) and may shift traffic from that link to UE 270(1) via link 1310.

Figure 13B:
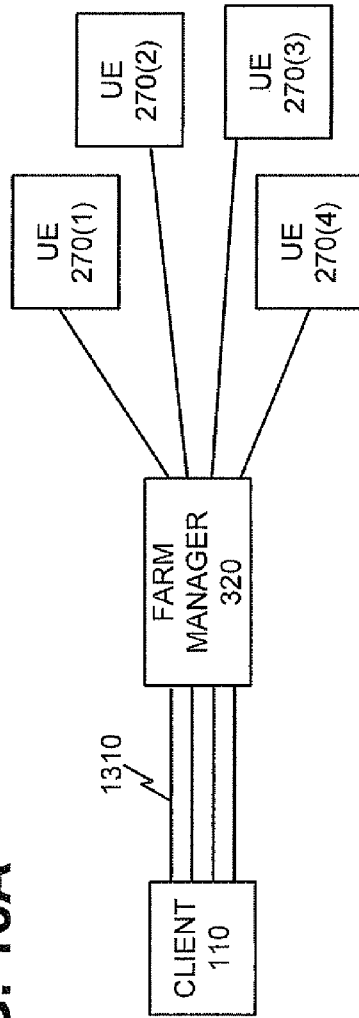

FIG. 13B illustrates an exemplary embodiment that allows client 110 to maintain a number of links with a network device (e.g., a farm manager) when using one or more remote services. In FIG. 13B, client 110 may initiate four links 1310 with a network device that can communicate with one or more destination devices, directly or indirectly. For example, client 110 may initiate links 1310 with farm manager 320, where farm manager 320 maintains direct connections to UEs 270(1)-270(4). Client 110 may request the collaborative coding service, a remote testing service, a remote processing service, and a remote coding competition service discussed in FIG. 13A via farm manager 320. Farm manager 320 may provide results to client 110 via links 1310.

Figure 13C:
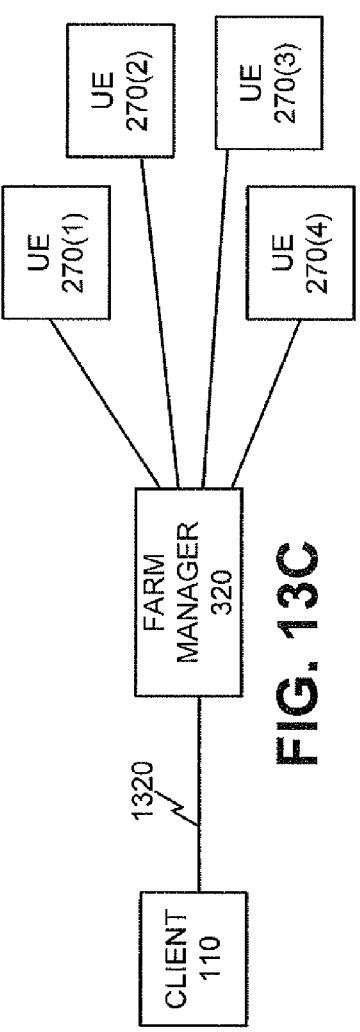

FIG. 13C illustrates an exemplary embodiment that allows client 110 to request one or more services using a single link to a farm manager 320. In FIG. 13C, client 110 may communicate with farm manager 320 over a single link 1320, such as an Internet connection over an optical fiber, coaxial cable, Wi-Fi link, cellular telephone link, satellite link, etc. For example, client 110 may request the collaborative coding service, the remote testing service, the remote processing service, and the remote coding competition service discussed in FIGS. 13A and B from farm manager 320 over link 1320. Farm manager 320 may operate UEs 270(1)-270(4) to provide the services to client 110. Farm manager 320 may send results from the services to client 110 over link 1320.

Figure 13D:
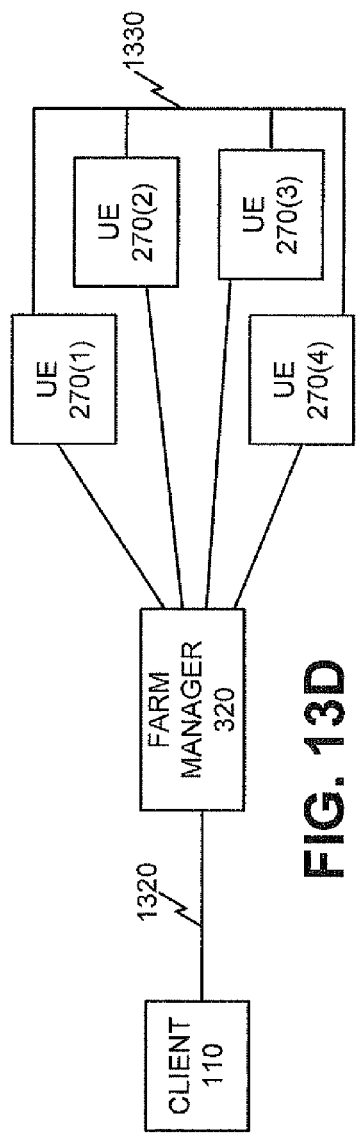

FIG. 13D illustrates an exemplary embodiment that allows client 110 to request services through farm manager 320 via a single link. In FIG. 13C, farm manager 320 may operate UEs that can perform UE to UE communications directly or indirectly. For example, client 110 may request a collaborative coding service, a remote testing service, a remote processing service, and a remote coding competition service over a single link 1320. Farm manager 320 may use UEs 270(1)-270(4) to provide the services to client 110. In the embodiment of FIG. 13D, UEs 270(1)-270(4) can communicate with each other, which may allow one UE to assist another UE with providing a portion of a requested service. For example, UE 270(1) may request assistance from UE 270(2) when code is compiled on behalf of client 110. In one embodiment, UEs 270(1)-270(4) may communicate with each other without requiring instructions from client 110 and/or farm manager 320. In another embodiment, client 110 and/or farm manager 320 may provide instructions to UEs 270(1)-270(4) that allow the UEs to communicate amongst each other. The embodiment of FIG. 13D may further allow UEs to share resources, such as memory, workspaces, etc.

Figure 13E:
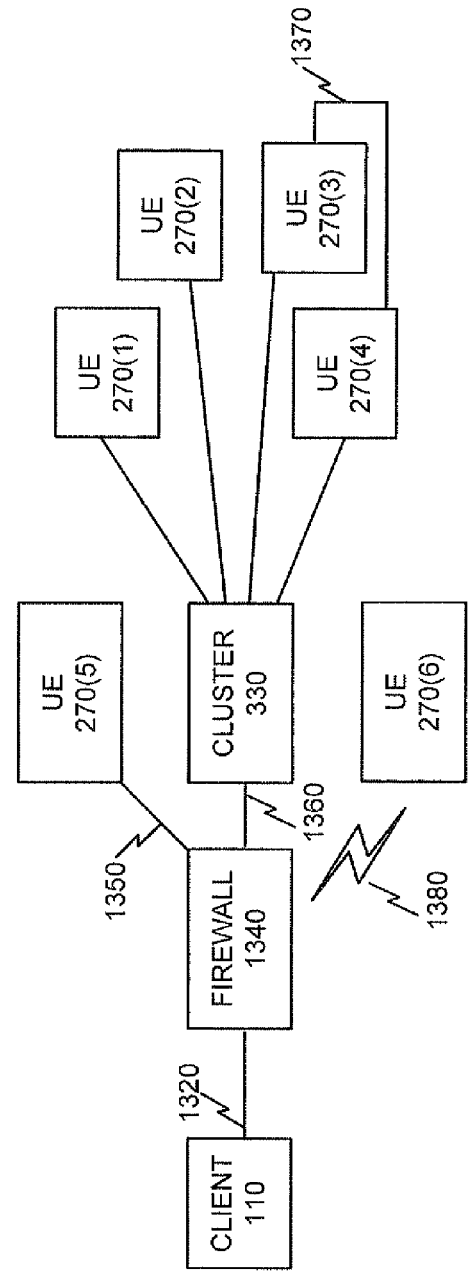

FIG. 13E illustrates an exemplary embodiment that allows client 110 to communicate with a firewall 1340 when performing remote processing activities. In FIG. 13E, client 110 may send requests for the services of FIG. 13A to firewall 1340. Firewall 1340 may process requests received from client 110 to determine how to allocate requests to UEs. Firewall 1340 may send a request for one service, e.g., the collaborative coding service to UE 270(5) directly (as shown in FIG. 13E via link 1350) or indirectly. Firewall 1340 may determine that requests for the remote testing service, the remote processing service, and the remote coding competition service should be sent to different UEs. In FIG. 13E, firewall 1340 may send the requests for the other services to cluster 330 via link 1360. Cluster 330 may determine that its UEs are not available to process the requests received from firewall 1340.

Cluster 330 may send the requests for the remote testing service, the remote processing service, and the remote coding competition service to UEs outside cluster 330. For example, cluster 330 may send the remote testing service request to UE 270(2), the remote processing service request to UE 270(3), and the collaborative coding service request to UE 270(4). In the embodiment of FIG. 13E, UE 270(3) and UE 270(4) may be able to communicate with each other via path 1370 (e.g., a bus or another type of interconnect) to allow sharing of processing resources between the two UEs. In the embodiment of FIG. 13E, firewall 1340 may send requests to services via fixed links (e.g., link 1320) and/or wireless links, such as wireless link 1380.

Other exemplary embodiments may take other forms when providing remote services to one or more clients without departing from the spirit of the invention. For example, an exemplary embodiment may provide a window that allows a user to quickly evaluate a technical computing command without requiring that the user be running a technical computing application locally on the user's device (e.g., client 110).

Exemplary Quick Command Embodiment

Figure 14:
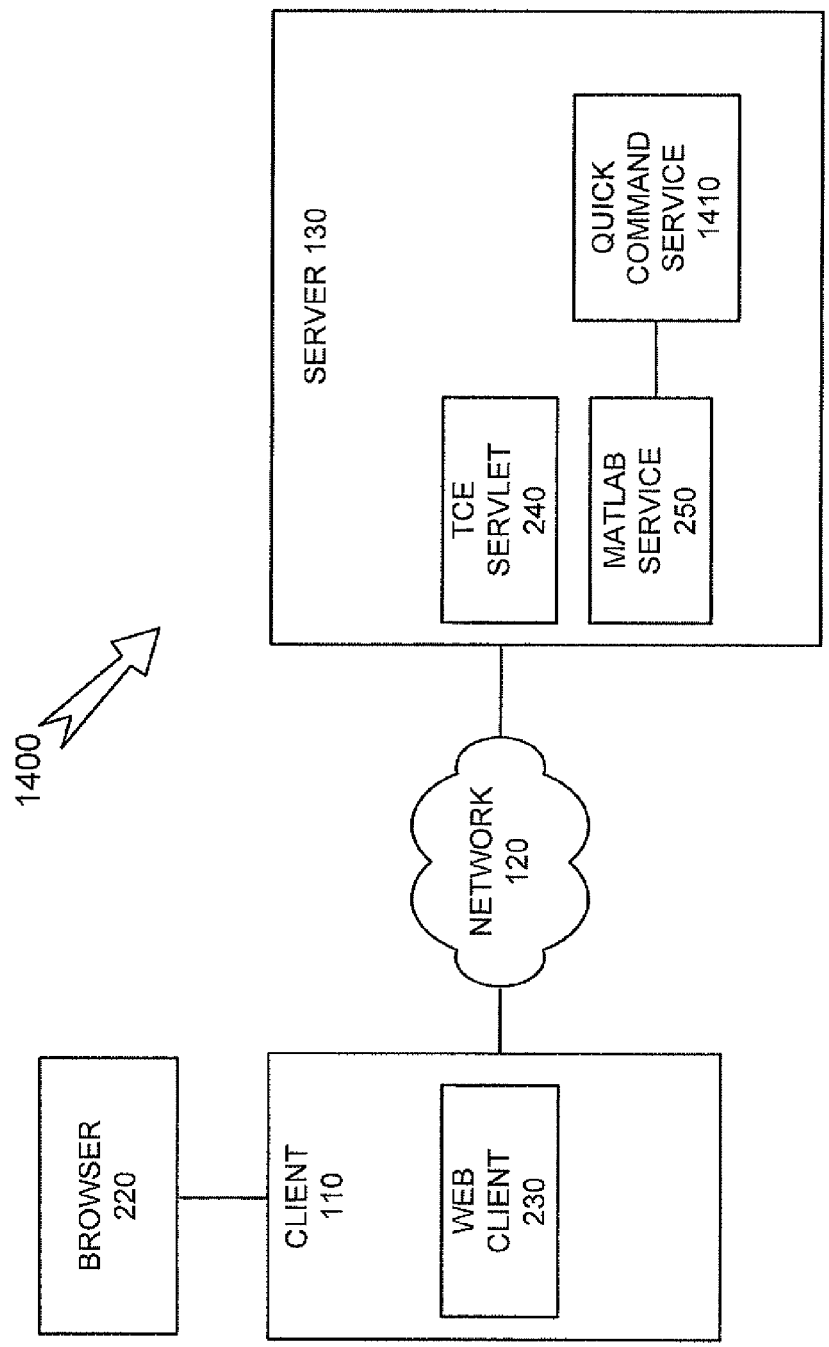
FIG. 14 illustrates an embodiment that implements a quick command service.

FIG. 14 illustrates an exemplary embodiment that can implement a quick command window. FIG. 14 can include client 110, network 120, browser 220, web client 230 and server 130 that can include TCE servlet 240, MATLAB® service 250 and quick command service 1410. Client 110, network 120, server 130, browser 220, web client 230, TCE servlet 240, and MATLAB service 250 may be configured and may operate as previously described.

Quick command service 1410 may include software that provides a browser based quick command window to client 110. In one embodiment, quick command service 1410 may be configured to quickly execute commands on behalf of a user. For example, a browser based quick command service may execute single commands much faster than the single commands can be executed locally on client 110 when client 110 is running a local version of a technical computing application (e.g., a MATLAB software application).

Assume, for sake of example that a user wishes to execute a MATLAB command on his local machine. The user may launch a MATLAB application on his computer and may have to wait for thirty seconds while the application loads on the local machine. Using the quick command service, the user may type a command into a quick command window while working in an application while the MATLAB application is not open, loaded, or resident on the local machine. The user may type the command into the quick command window and a result for the command may be displayed to the user without requiring that the user wait for the MATLAB application to load. In fact, the result may be displayed to the user almost instantaneously once the user enters the command. In one embodiment, the quick command service may use a MATLAB application is that always running on a remote device with respect to the local machine, such as a server connected to the local machine via a network.

Embodiments of quick command service 1410 may be implemented as widgets to allow a user to interact with a window, such as a quick command window, within browser 220. In one embodiment, the window may be an HTML input window that is interfaced to an output region on browser 220 (e.g., an output window).

Figure 15A:
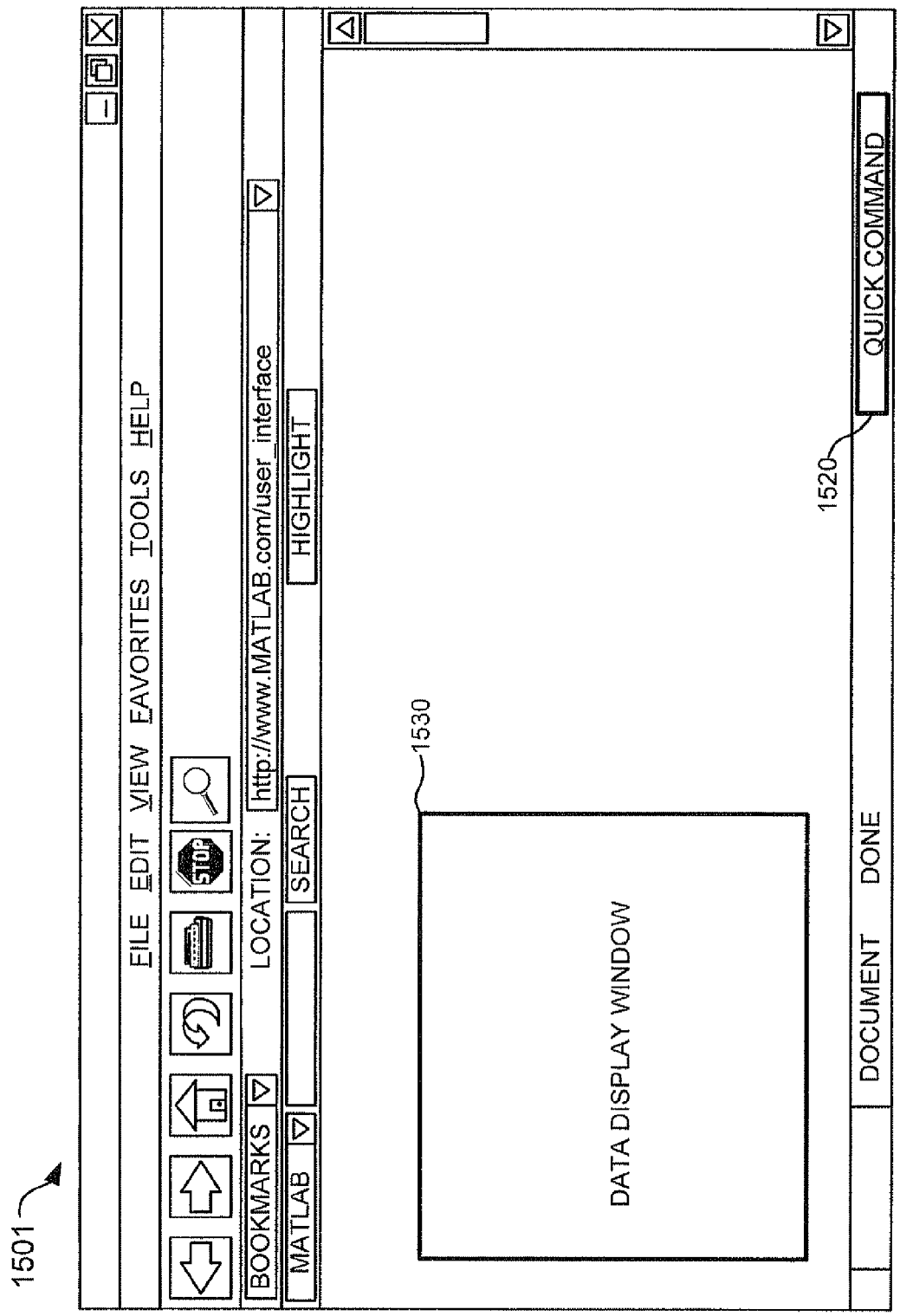
FIGS. 15A and 15B illustrate exemplary user interfaces that can be used with a quick command service.

FIG. 15A illustrates an embodiment of quick command service 1410 that is provided via a widget. The embodiment of FIG. 15A may include user interface 1501, quick command widget 1520 and data display window 1530. User interface 1501 may include a browser window and may display text and/or graphics to a user of client 110. Quick command widget 1520 may include a window that a user selects to interact with quick command service 1410. For example, a user may type a command into quick command widget 1520 in one embodiment. Or, in another embodiment, the user may double click on quick command widget 1520 to open a larger dialogue window. Data display window 1530 may include a display region that allows a user to view results of processed commands (e.g., commands entered into quick command widget 1520).

Figure 15B:
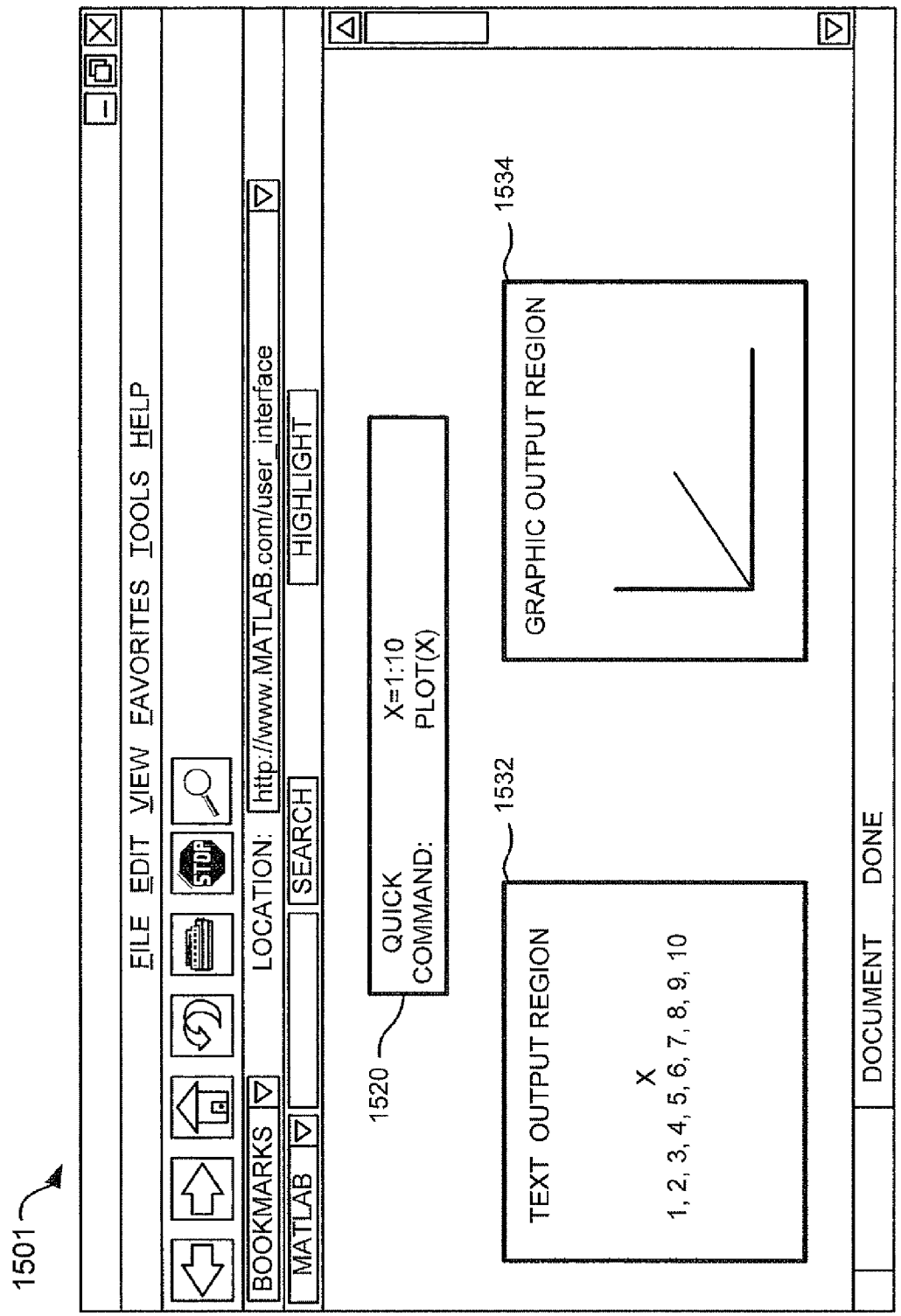

FIG. 15B illustrates an embodiment of quick command service 1410 that uses an enlarged quick command widget for receiving user inputs. FIG. 15A may include user interface 1501, quick command widget 1520, text output region 1532 and graphic output region 1534. A user may enter a command into quick command widget 1520, such as x=1:10. The user may further wish to plot x=1:10 and may enter a plot command, such as plot(x) into quick command widget 1520. Information entered into quick command widget 1520 may be sent from web client 230 to server 130 over network 120. On server 130, the user inputs may be processed by quick command service 1410 and/or MATLAB service 250 to generate a result.

A result may include text, graphics, audio, etc. For example, quick command service 1410 may process x=1:10 and plot(x) and may produce textual results and graphical results. Quick command service 1410 may send the textual and graphical results to client 110. Web client 230 may process the received results and may send them to browser 220. Browser 220 may display the textual portion of the results in a text output region 1532 and the graphical portion of the results in graphic output region 1534. In one embodiment, text output region 1532 and/or graphic output region 1534 may include windows for displaying results to the user.

Quick command service 1410 may let users rapidly prototype and/or understand how certain commands, functions, etc., perform. In addition, quick command service 1410 may let the user quickly obtain help regarding a command, function, etc. Assume, for sake of example, that a user is interacting with an application (e.g., a spreadsheet application) that is implemented in a statically typed programming language, such as the C programming language, via user interface 1501. The user may wish to evaluate an expression using a dynamically typed programming language to quickly determine whether the expression is acceptable for inclusion into the spreadsheet application. The user may wish to prototype the expression in the dynamically typed language because processing the expression in the spreadsheet application may take too long.

In this example, the user may wish to interact with a technical computing application to evaluate the expression. The user may be able to evaluate the expression in the technical computing application via quick command service 1410. The user may select quick command widget 1520 while the spread sheet application is open in browser 220. Selecting quick command widget 1520 may associate a remote application (here the technical computing application) with quick command widget 1520 so that the expression can be evaluated.

The user may enter the expression in quick command window 1520 and the remote application may receive the expression. The remote application may use one or more remote processing resources (e.g., UEs 270) to evaluate the expression using the technical computing application to produce a result. The remote application may send the result to client 110 where the result may be displayed in user interface 1501.

The user may view the result and may decide that he/she wants to perform additional computations using the remote application. For example, the user may wish to write scripts that can be executed on the remote application to produce other results. The user may launch the remote application by, for example, selecting a launch application button on user interface 1501. Selecting the launch application button may send a request from client 110 to a device hosting quick command service 1410 and the device may provide the full capabilities of the remote application to client 110 via user interface 1501. For example, the spreadsheet application may be closed and a user dialog screen for a remote technical computing application may be provided to the user. The user may be able to access all of the capabilities of the remote technical computing application via the dialog screen. For example, the user may be able to execute a number of MATLAB commands using the remote technical computing application to produce a number of results.

Other embodiments of quick command service 1410 can be implemented in a variety of ways. For example, another embodiment of quick command service 1410 may include a special key on a user's keyboard. Depressing the special key may open a quick command widget that allows a user to quickly enter and evaluate a command. Depressing the special button a second time may close the quick command widget and may remove displayed quick command results from the user's display device.

Other exemplary embodiments may perform other types of remote tasks on behalf of a client. For example, an embodiment may run scheduled sessions using a technical computing application.

Exemplary Scheduled Session Embodiment

Figure 16A:
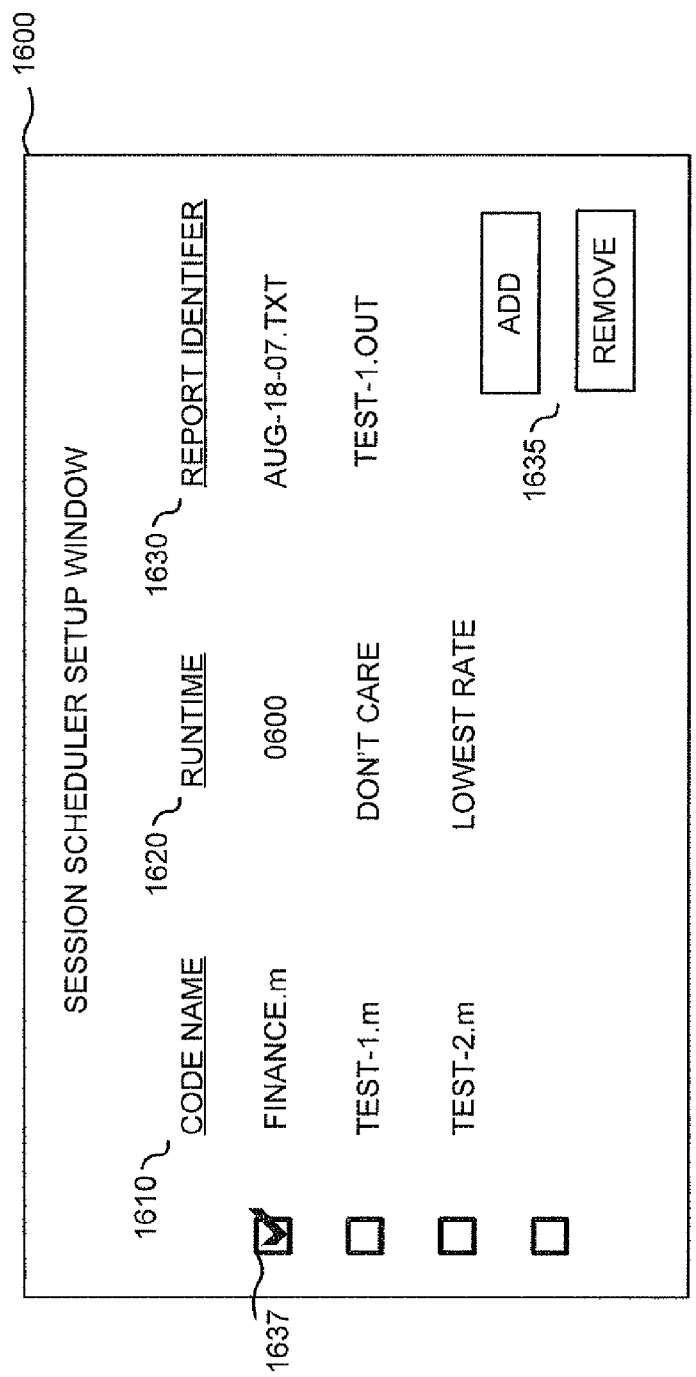
FIG. 16A illustrates an exemplary setup window.

FIG. 16A illustrates a user interface that can be used to schedule processing sessions with a remote technical computing service. For example, a finance administrator may wish to run the contents of a file that causes one or more reports to be run. In one embodiment, the finance administrator may want to run the contents of an M-file that runs a report using a remote MATLAB service (e.g., MATLAB service 250). For example, server 130 in FIG. 14A may include a module that allows scheduled sessions to be run using MATLAB service 250.

Referring to FIG. 16A, user interface 1600 may include code name field 1610, runtime field 1620, report identifier field 1630, add/remove buttons 1635, and check boxes 1637. Interface 1600 may be displayed on client 110 using, for example, browser 220. A user of client 110 may use interface 1600 to set up a scheduled session.

Code name field 1610 may include user entries that identify file contents to be run. For example, code name field 1610 may include the names of jobs, files, folders, etc., that include content that will be executed via the remote technical computing service.

Runtime field 1620 may include entries that identify when corresponding file contents identified under code name field 1610 should be run. For example, runtime field 1620 may include start times, start dates, etc., that identify when a respective job, file, folder, etc., should be executed via a remote technical computing service.

Report identifier field 1630 may include entries (e.g., file names) that identify data structures for holding results produced when entries under code name field 1610 are run.

Add/remove buttons 1635 may allow a user to add or remove entries from interface 1600. For example, selecting the add button may open a window in interface 1600 or may move a cursor to a position within interface 1600 that allows the user to enter a filename in code name field 1610, a runtime value in runtime field 1620, or a filename in report indenter field 1630. In contrast, selecting the remove button may let a user delete information from interface 1600. Check box 1637 may let a user select which reports to run. For example, a user may double click on the check box 1637 proximate to FINANCE.m and a check mark may appear in check box 1637. The check mark may indicate that an output file named AUG-18-07.TXT will be generated when FINANCE.m is run at 0600 hours.

Exemplary embodiments may generate a new user interface when a report is run for an entry in FIG. 16A. For example, a results window may be generated that contains information about each file that was processed. Assume, for sake of example, that a user specifies a number of jobs and start times for the jobs in interface 1600. Further assume that the designated start times arrive. A scheduler may operate as part of the remote technical computing service and may identify available remote processing resources.

For example, the scheduler may receive the job information and start times from interface 1600. The scheduler may identify remote processing resources (e.g., UEs 270) that are available to perform remote processing on the jobs. The scheduler may send the jobs to available remote processing resources at the identified start times and may receive results from the remote processing resources when processing is complete. In one embodiment, the scheduler may divide a job into parts and may send a first part to one remote processing resource and may send another part to another remote processing resource. The scheduler may receive a first result for the first part and a second result for the second part when processing activities are complete. The scheduler may assemble the first result and the second result into a complete result, or final result, that can be displayed to the user via interface 1600 or stored in a storage device.

In an embodiment, the scheduler may dynamically schedule jobs among a number of remote processing resources. In dynamic scheduling, the scheduler may allocate or de-allocate jobs among remote processing resources while processing is performed. Dynamic scheduling may allow real-time load balancing of processing for a particular job or for a particular arrangement (e.g., cluster or pool) or remote processing resources. Dynamic scheduling may further allow remote processing resources to be identified and/or selected based on criteria, such as processing costs, processing speeds, memory sizes, locations (e.g., geographic locations of remote processing resources), input speeds for remote processing resources, output speeds for remote processing resources, security policies for remote processing resources, etc.

FIG. 16B illustrates a results window for a scheduled session that has run. Results window 1602 may include code name field 1610, runtime field 1620, successful field 1640 and report identifier field 1630. Successful field 1640 may include information that identifies whether a report was run successfully. For example, successful field 1640 may include information that indicates that a report ran successfully (e.g., YES in FIG. 16B), that a report only ran partially (e.g., PARTIAL in FIG. 16B), that a report did not run (not shown in FIG. 16B), etc.

Embodiments, such as the ones illustrated in FIGS. 16A and 16B may run reports for substantially any type of information, such as financial information, test data, weather data, population data, sports data, education data, etc.

Other embodiments can be used to perform other tasks, such as comparing the operation of various versions (e.g., releases) of one or more software applications. For example, an engineering manager may be running two different versions of a technical computing application (e.g., MATLAB software, Simulink software, etc.) within his group. The engineering manager may wish to determine if both versions of the software produce the same results when run against a particular input, such as some or all of the problems, models, data sets, etc., used within the group.

In another example, the engineering manager may be considering whether to upgrade legacy versions of technical computing applications to a most recent version of the application. Before investing in the new software, the manager may wish to determine if the new version produces the same results as the legacy versions of the technical computing application.

Other exemplary embodiments may perform other types of remote tasks on behalf of a client. For example, an embodiment may allow a manager to compare operation of multiple versions of a technical computing application and/or another type of application simultaneously.

Exemplary Simultaneous Execution Applications

By way of example, server 130 in FIG. 14A may include a module that runs multiple versions of a technical computing application against each other using a predetermined input (e.g., problem, model, data set, etc.). Assume client 110 identifies a problem and versions of a software application (e.g., a technical computing application) that will be run against the problem in parallel (e.g., at substantially the same time). In one embodiment, server 130 may dynamically determine available versions of a technical computing application associated with client 110 and/or available from other locations or sources (e.g., a latest version of the technical computing application available from a manufacturer or distributor). Server 130 may display information about available versions of the technical computing applications to client 110 via pop-up windows and/or other techniques using browser 220.

Further assume server 130 executes the selected versions of the technical computing application against each other line-by-line. For example, server 130 may execute the first application on a first remote processing resource and the second application on a second remote processing resource. Server 130 may stop executing and may provide an error and/or intermediate result to client 110 when answers between two or more compared versions begin to diverge. Alternatively, server 130 may identify locations in compared versions where results begin to diverge and may continue running the versions until a fatal error is encountered or until final results are produced, even if the final results vary between the compared versions.

In one embodiment, server 130 may use synchronization logic to perform line-by-line execution between two versions of a technical computing application even when the two versions may contain a different number of lines of code with respect to each other, may be written in different languages, may run on different platforms (e.g., different operating systems), etc.

Figure 17A:
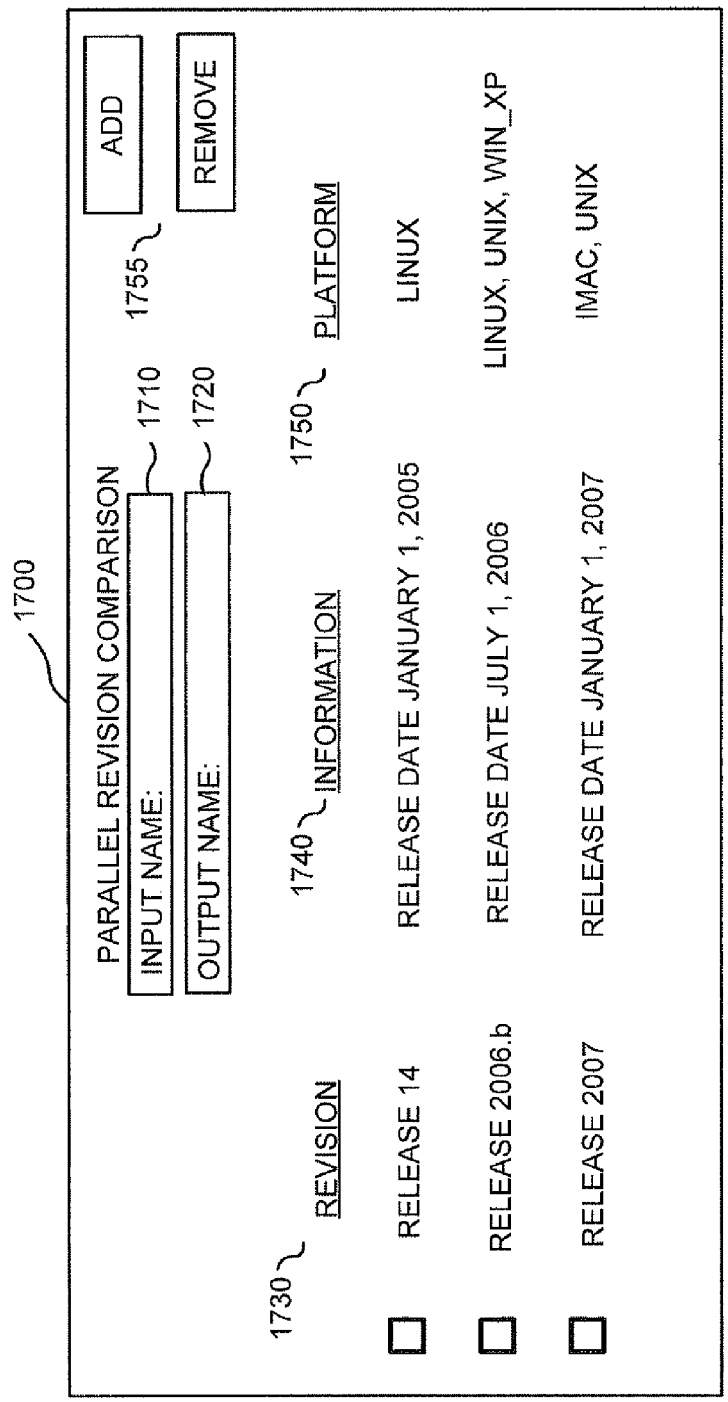
FIG. 17A illustrates an exemplary revision comparison window.

FIG. 17A illustrates an exemplary user interface that can be used to compare the operation of multiple versions of a software application. FIG. 17A includes user interface 1700 that can include input name 1710, output name 1720, revision identifier 1730, information field 1740, platform field 1750, and add/remove buttons 1755.

Input name 1710 may include information that identifies the name of a problem, data set, model, etc., against which multiple versions of the software application are run. Input name 1710 may include, for example, a filename, a link, an address, etc., that identifies information input to two or more software applications. Output name 1720 may include information that identifies a result produced by the two or more software applications when run against the filename, link, address, etc., identified in input name 1710. Output name 1720 may include a filename, a link, an address, etc. Information associated with output name 1720 may include text, graphics, audio, video, etc., depending on the types of results produced by the two or more software applications.

Revision identifier 1730 may include information that identifies software applications that will be run against a problem, data set, model, etc., identified by input name 1710. Revision identifier 1730 may include a filename, link, address, etc. For example, revision identifier may include version names or version numbers for respective software applications that will be run against a particular problem. In FIG. 17A, revision identifiers 1730 may include names like release 14 of a MATLAB software application, release 2006.*b* of a MATLAB software application, or release 2007 of a MATLAB software application. Other embodiments may include information identifying other types of programs.

Information identifier 1740 may include types of information that further elaborate on entries in revision identifier 1730. For example, information identifier 1740 may indicate a release date for a software application, indicate a size of a software application, indicate the last time a software application was used, etc. Platform identifier 1750 may include information that identifies a platform on which a software application is run. For example, platform identifier 1750 may include operating system identifiers, hardware platform identifiers (e.g., type of microprocessor, memory configuration, etc.), and/or other types of information related to a platform on which a software application is run.

Add/remove buttons 1755 can include logic that allows a user to enter or delete information from user interface 1700. User interface 1700 may further include check boxes that can be used to activate or deactivate entries. For example, placing a check mark next to an entry in user interface 1700 may cause a software application associated with the entry to be run against a problem identifier in input name 1710.

User interface 1700 may allow client 110 to compare the operation of two or more software applications against each other with respect to a single problem. For example, a problem for a control system can be identified via input name 1710 and an output file can be identified via output name 1720. Client 110 may further identify three versions of a MATLAB software application to run against the control system problem, namely release 14, release 2006.*b*, and release 2007. In addition, some of the software applications may be run on multiple platforms against the control system problem (e.g., release 2006.b which can be run on LINUX, UNIX, and Windows XP, and release 2007 which can be run on an Imac compatible operating system and UNIX).

Server 130 may run the identified software applications against the problem in parallel and may generate a result file that includes results from the respective software applications. For example, in one embodiment, two versions may be started at the same time so as to operate in parallel. In another embodiment, a first version may be started at a first time and a second version may be started at a second time that occurs after the first time. As long as the two versions are operating at the same time for at least one time increment, the two versions are considered to be running in parallel.

Embodiments may store and/or display information to a user via a results file on client 110. In one embodiment, result information may be displayed on client 110 in an arrangement that lets a user of client 110 quickly compare results among the software versions that were run in parallel against the problem. For example, a user may view a first result for a first version of a software application and a second result for a second version of the software application via browser 220. The user may evaluate the performance of the first and second versions with respect to an input to determine which version performed best. Embodiments may further store results for the compared versions via a storage device.

Figure 17B:
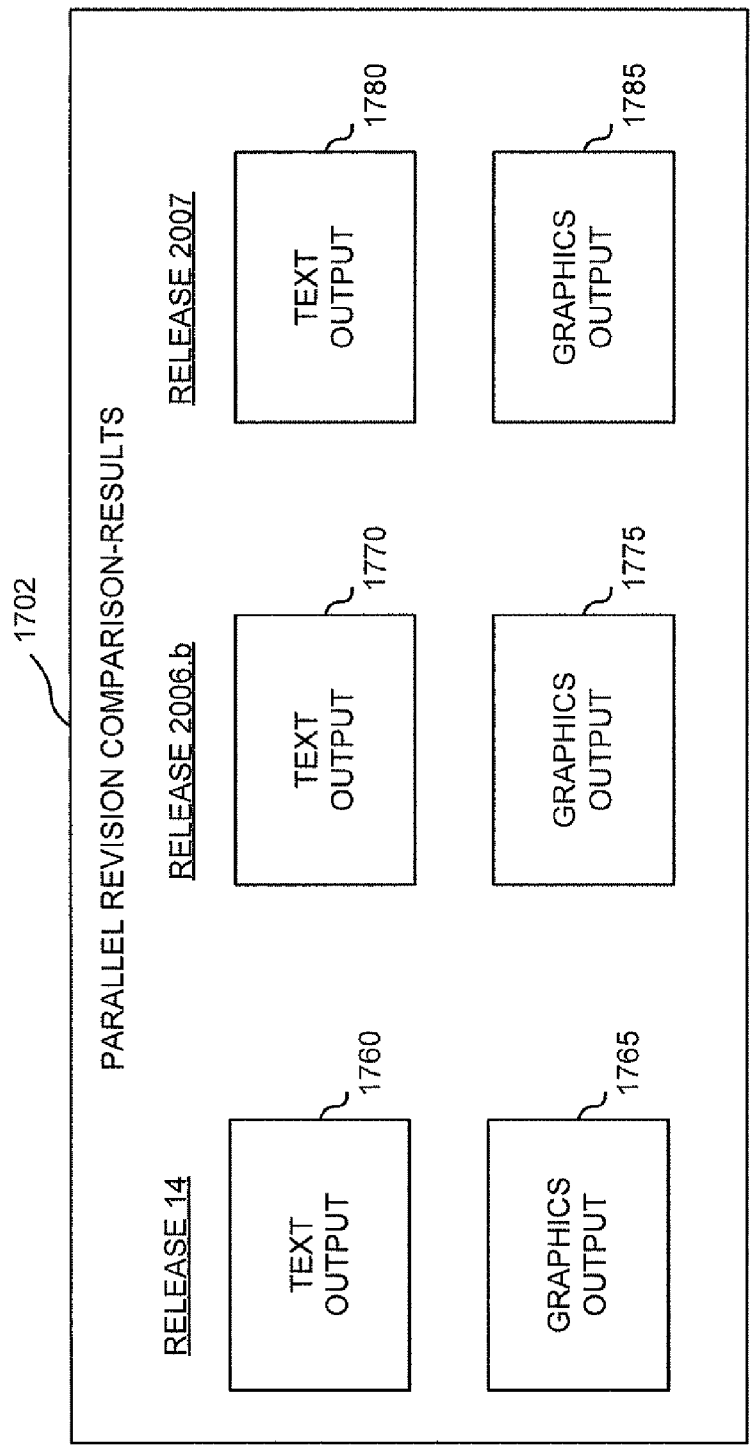
FIGS. 17B and 17C illustrate an exemplary results window.

FIG. 17B illustrates an embodiment of a user interface that may display results on client 110. FIG. 17B may include user interface 1702 that displays results for software versions that were run in parallel against a particular problem, data set, model, etc. For example, user interface 1702 may include text output 1760 and graphics output 1765 for release 14, text output 1770 and graphics output 1775 for release 2006.b, and text output 1780 and graphics output 1785 for release 2007. In the embodiment of FIG. 17B, the text output and the graphics output may be displayed in respective windows via user interface 1702. Other embodiments may display results to a user in different ways. For example, a user interface may include information about the problem, information about the results, and logic to let a user launch one or more versions of the software applications that were run against the problem.

Figure 17C:
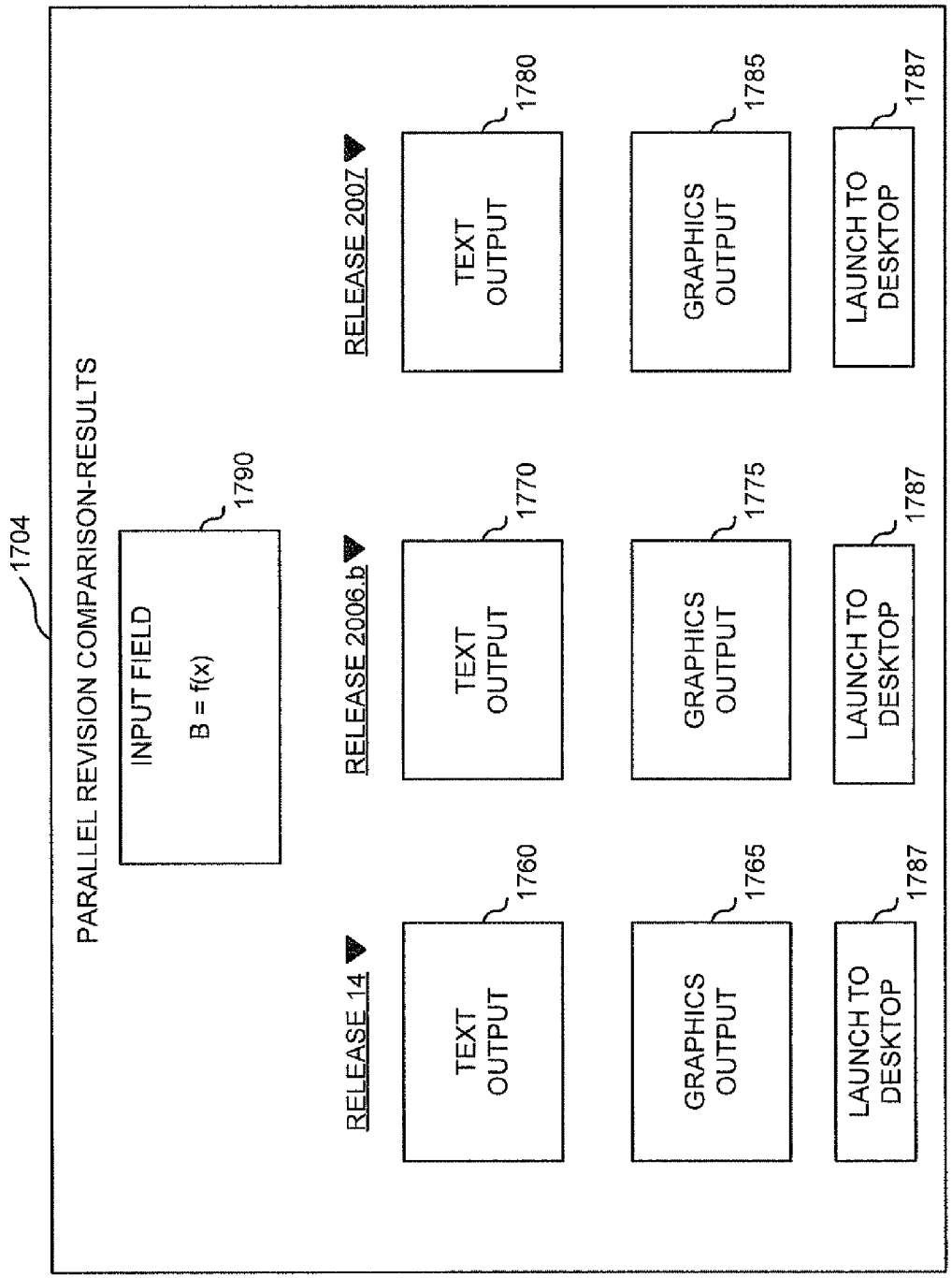

FIG. 17C illustrates an embodiment that may display a problem, one or more results, and logic that can launch a software application on client 110. FIG. 17C can include user interface 1704. User interface 1704 can in turn include problem window 1790 and information about versions of software applications run against the problem. For example, user interface 1704 can include text output 1760, graphic output 1765 and launch to desktop button 1787 for release 14. Launch to desktop button 1787 may include logic that lets a user of client 110 launch a respective software application to a desktop of client 110. For example, a user may determine, based on information displayed in user interface 1704, that he/she is happy with the results produced by release 14. The user may select launch to desktop button 1787 by, for example, double clicking on button 1787. A copy of release 14 may be downloaded to client 110 and launched in response to the user's selection. Alternatively, release 14 may already be resident on client 110 and may be retrieved from local storage and launched in response to the user's selection. In still another embodiment, release 14 may run on a desktop of client 110 via a remote computer, e.g., server 130 in response to the user's selection.

User interface 1704 may further include an expand/collapse arrow (black triangle in FIG. 17C) that can be used to expand and/or collapse information related to a software application. For example, user interface 1704 may provide summary results for each software application and a user may select an expand/collapse marker to see additional information about results for a particular software application.

User interface 1704 may further include text output 1770, graphics output 1775, and launch to desktop button 1787 for release 2006.b; and text output 1780, graphics output 1785, and launch to desktop button 1787 for release 2007.

Alternative embodiments that compare execution of two or more versions of a software application may include threshold logic that is used to determine when results for the two applications diverge. For example, a user may specify a threshold value that identifies a minimum or maximum acceptable deviation between a first result produced by a first version of a software application and a second result produced by a second version of the software application. Parallel execution of the two versions may stop when deviation between the first result and the second result meets or exceeds the threshold value.

In still other alternative embodiments that compare two or more revisions of a software application, intermediate results may be generated. For example, each version of the software application may contain three code modules where each module produces an intermediate result when executed. A user may specify a threshold value for each module and/or a threshold value for the entire application. In this example, three intermediate results may be generated when the two versions of the software application are executed against each other in parallel.

Other exemplary embodiments may perform other types of remote tasks on behalf of a client. For example, an embodiment may perform a number of calculations within a predetermined interval for client 110.

Exemplary Interval Bounded Processing

Assume, for sake of example, that a financial analyst has a number of financial calculations that must be performed before financial markets open the next day. The analyst may use an exemplary embodiment to perform the financial calculations within a determined interval. The analyst may identify a time by which the calculations must be performed and/or other parameters, such as cost, security protocols, etc. For example, the analyst may be able to specify that calculations must be complete by 7:00 AM the next day and that the calculations should be performed as inexpensively as possible.

An embodiment may accept inputs on behalf of the analyst and may distribute computations that use the inputs among a number of remote processing resources that run technical computing applications for performing processing activities on behalf of a requesting device. The embodiment may include logic that estimates the number of resources and/or computational power of resources required to perform desired calculations within a specified interval (here 7:00 AM the next day). In addition, the embodiment may dynamically identify and/or reserve remote processing resources based on calculations to be performed and/or other parameters (e.g., cost, etc.). The embodiment may parse the calculations into portions and may send the portions to reserved resources for remote processing. The reserved resources may send results to the embodiment when remote processing is complete, and the received results may be assembled into a format that is useful to the analyst. For example, the embodiment may display results to the analyst in a format that allows the analyst to make predications about how financial markets will perform when they open the following day.

Figure 18:
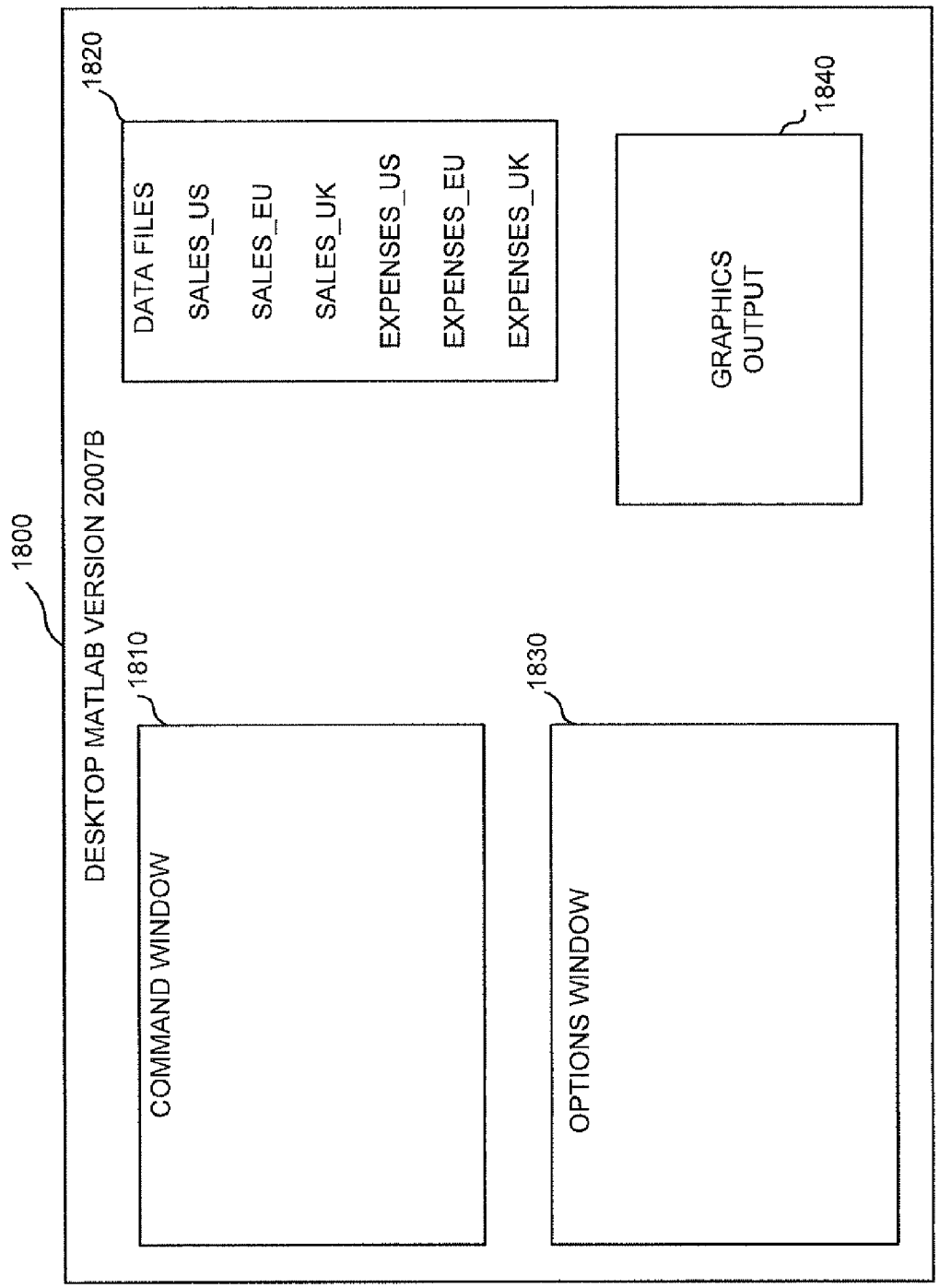
FIG. 18 illustrates an exemplary user interface for configuring a remote processing application.

FIG. 18 illustrates an embodiment that can be used to perform calculations within a determined interval. FIG. 18 may include user interface 1800, command window 1810, data files window 1820, options window 1830, and graphics output window 1840. In an embodiment, server 130 of FIG. 14 may include a module that performs distributed calculations within a predetermined interval. The module may provide user interface 1800 to client 110, may dynamically identify and/or reserve processing resources based on user selections input to user interface 1800, and may provide results to user interface 1800 when distributed processing is complete.

Command window 1810 may include a window for receiving user inputs. For example, a user may enter commands, functions, scripts, etc., in command window 1810. Information entered in command window 1810 may be used to process data, perform simulations, generate graphical displays, etc. Data files window 1820 may include information that is operated on by commands in command window 1810 to produce results. For example, data files window 1820 can include the names of files that include financial data that is processed to produce one or more results. In other embodiments, data files window 1820 may include links, addresses, etc., that identify data used with interface 1800.

Options window 1830 may include information related to remote processing activities performed on behalf of client 110. For example, a user may enter criteria associated with the remote processing into options window 1830. For example, a user may enter a completion time, names of the processing resources that will be used in the remote processing, addresses for the processing resources, costs associated with the processing resources, an estimated completion time, storage requirements for results generated by the processing, etc.

In an embodiment, a user may modify information in options window 1830. For example, the user may remove an identifier (e.g., name) for a resource that has a high cost. The user may enter information for one or more other resources having lower costs in place of the removed resource and may run calculations using the lower cost resources. For example, the user may delete the name of one high cost resource and may replace it with the names of two lower cost resources. In another embodiment, interface 1800 may include a dial, slider, etc., that allows the user to change processing resource names, speeds, memory sizes, etc. For example, a user may move a graphical dial clockwise and names progressively faster processing resources may appear in options window 1830. In contrast, when the user moves the graphical dial counter-clockwise names for lower speed processing resources may appear in options window 1830.

Graphics output window 1840 may include graphical information related to processing performed on behalf of client 110. In one embodiment, graphics output window 1840 may include plots, images, etc., of results produced when data files are operated on by commands in command window 1810. In another embodiment, graphics output window 1840 may include graphs of performance data (e.g., percent completion, CPU usage of remote resources, workspace usage, etc.) related to remote processing activities performed on behalf of client 110.

In one embodiment, a user may run a technical computing application at client 110 (e.g., a local copy or a remotely accessed copy). The user may access remote processing resources that will perform a desired calculation prior to a determined time. In one embodiment, remote processing resources may be provided via a virtualized operating system that can be served from a number of CPU's (e.g., CPUs associated with a number or remote processing devices). Use of virtualized resources facilitates dynamically moving a processing task from one resource to another resource (e.g., a processing task can be moved from a slower resource to a faster resource during a calculation). In an embodiment, the user may request resources that are operated by the user (i.e., the user may own the resources) or an organization to which the user belongs (e.g., a corporation that employs the user), or the user may request resources that are owned by a third party with respect to the user (e.g., the user may rent processing resources from the third party).

In the embodiment of FIG. 18, logic may determine the number and types of devices required to perform desired processing on behalf of the user. For example, the logic may determine whether processing should be performed by remote clusters or a number of individual remote devices and/or whether single core or multicore machines should be used. The logic may further determine whether machines with high speed processors are needed or whether machines with standard speed processor are satisfactory. The logic may also make other determinations, such as whether machines with large memory capacities are needed to complete the processing before the determined time.

Other exemplary embodiments may perform other types of remote tasks on behalf of a device. For example, an embodiment may be used to monitor activities performed by a number of users.

Exemplary Client Device Monitoring

For example, a technical computing application may be hosted as a web service (e.g., within a corporation). The hosted technical computing application may be used by a number of users (e.g., developers) at any given time. The hosted technical computing application may include a module that monitors usage of the application by the developers. For example, server 130 in FIG. 14 may include monitoring logic that determines how often each developer runs the hosted application, the types of operations performed by the developers (e.g., writing code, compiling code, debugging code, and/or executing code), etc.

Figure 19:
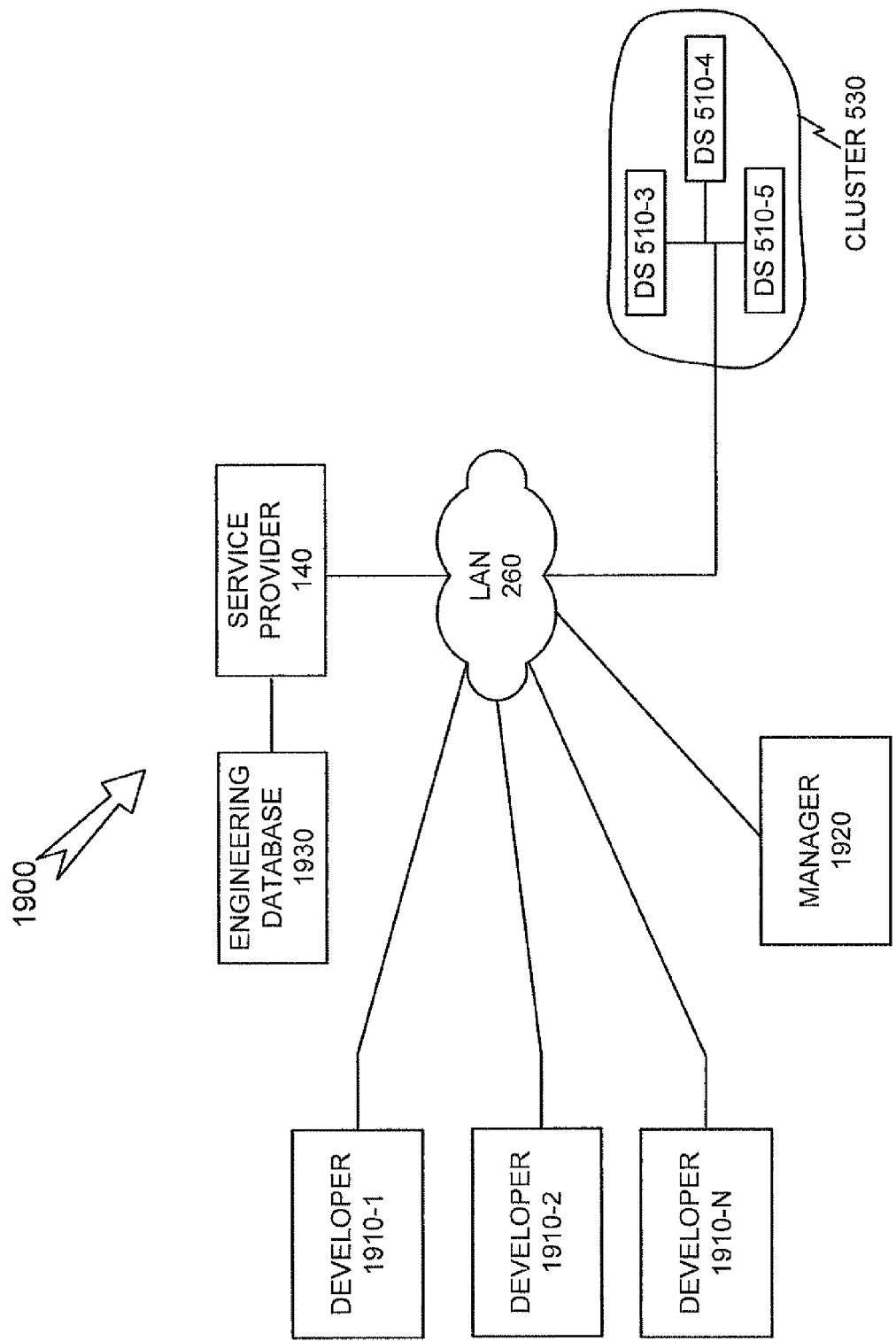
FIG. 19 illustrates an exemplary system for monitoring software application usage.

FIG. 19 illustrates a hosted embodiment that can monitor application usage by a number of developers. FIG. 19 includes system 1900 that can include service provider 140, LAN 260, cluster 530, developers 1910-1 to N (collectively developers 1910), manager 1920, and engineering database 1930. In one embodiment, system 1900 may be deployed within a corporation, an institution (e.g., a university), a government agency, etc. Developers 1910 may include clients 110 that are used by software developers to write code, debug code, execute code, generate documentation, etc. For example, developers 1910 may write code for modeling physical systems.

Manager 1920 may include a computing device that interacts with developers 1910. For example, a supervisor of a software engineering group may operate manager 1920 to monitor and/or coordinate activities of software developers working at developers 1910. The supervisor may issues tasks, receive time cards, receive reports, monitor usage, etc., of developers 1910 using manager 1920. Assume that the supervisor wants to determine how a software application is being used within an organization so that decisions can be made with respect to the software application, individuals working with the software application, etc. The supervisor may use manager 1920 to monitor developers' activities with the software application. For example, the supervisor may determine how often developer 1910-1 interacts with the software application.

Engineering database 1930 may store and/or process information related to developers 1910, manager 1920 and/or software applications used in system 1900. For example, engineering database 1930 may store information about usage of software applications operated in system 1900. Database 1930 may further process the stored information and may generate reports for manager 1920.

Figure 20:
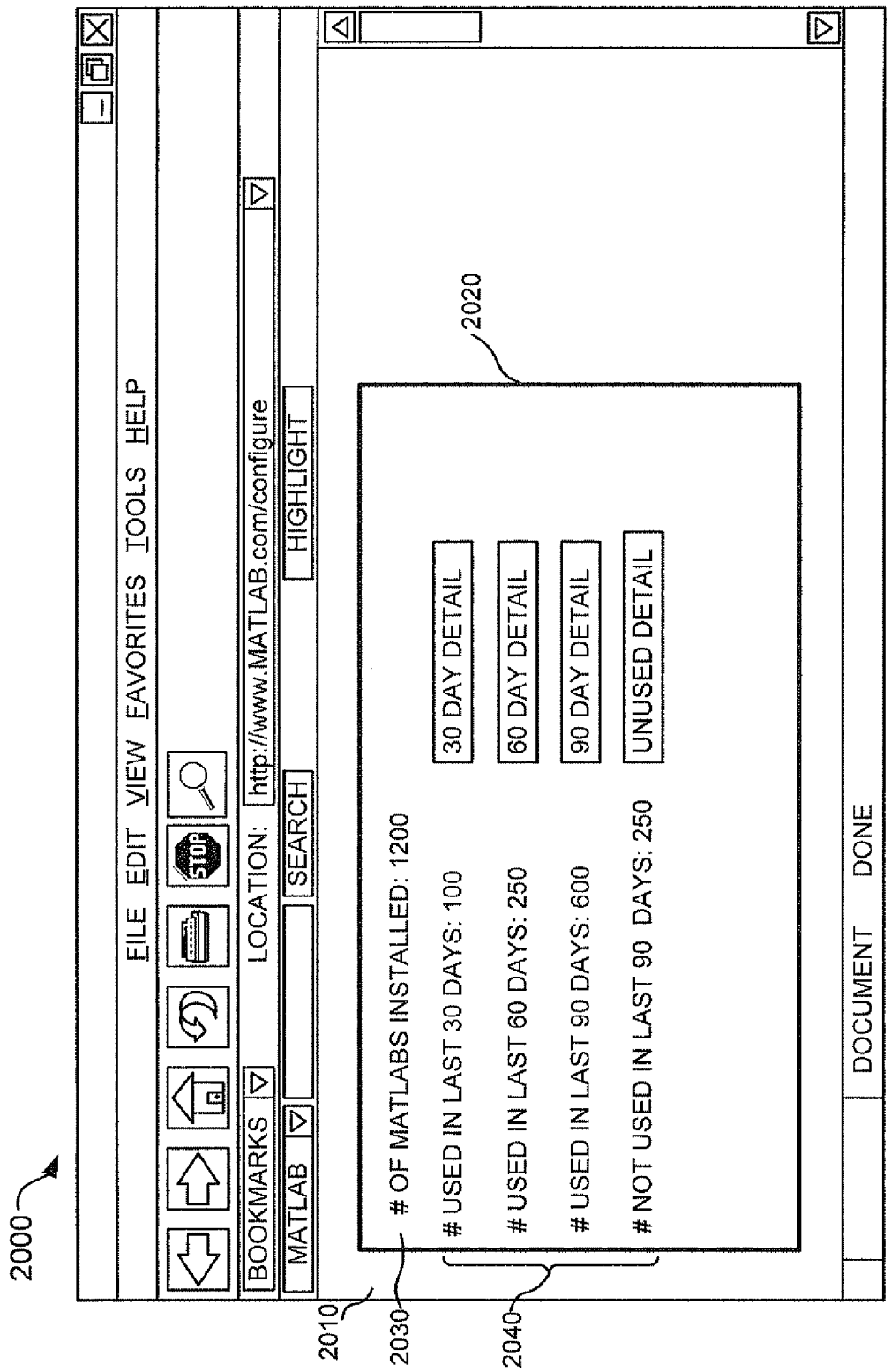
FIG. 20 illustrates an exemplary user interface for monitoring software application usage.

FIG. 20 illustrates an exemplary user interface 2000 that can display usage information about the software application used in system 1900. For example, user interface 2000 may be displayed to the supervisor via a display device on manager 1920. User interface 2000 may include display area 2010, window 2020, installed information 2030, used information 2040, and detail button 2050. Display area 2010 may include a region of, for example, browser 220 that displays information about a software application that is used by developers 1910. Display area 2010 may display text, graphics, etc., to provide the supervisor with information about the software application and/or developers 1910.

Window 2020 may include information that identifies versions of a software application (e.g., number of seats installed), usage information for the installed versions, etc. For example, window 2020 may indicate the number of seats of a technical computing application (e.g., MATLAB software) that are installed in an engineering department at a corporation. For example, installed information 2030 may identify the number of seats installed within the engineering department. Window 2020 may further include information related to the installed seats. For example, used information 2040 may indicate the number of seats used within determined intervals (e.g., within the last 30 days, 60 days, 90 days, etc.) Used information 2040 may further identify seats that have not been used within a determined interval, e.g., not used within 90 days. Information about seat usage may be used by the engineering manager to perform, for example, wear based analysis on the software applications (e.g., by identifying "worn applications" which are applications that are frequently used).

Window 2020 may further include detail button 2050 that can be selected to display additional information about one or more of used information 2040. For example, a supervisor may double click on detail button 2050 ("30 day Detail") to obtain additional information about seats used within the last 30 days.

Figure 21:
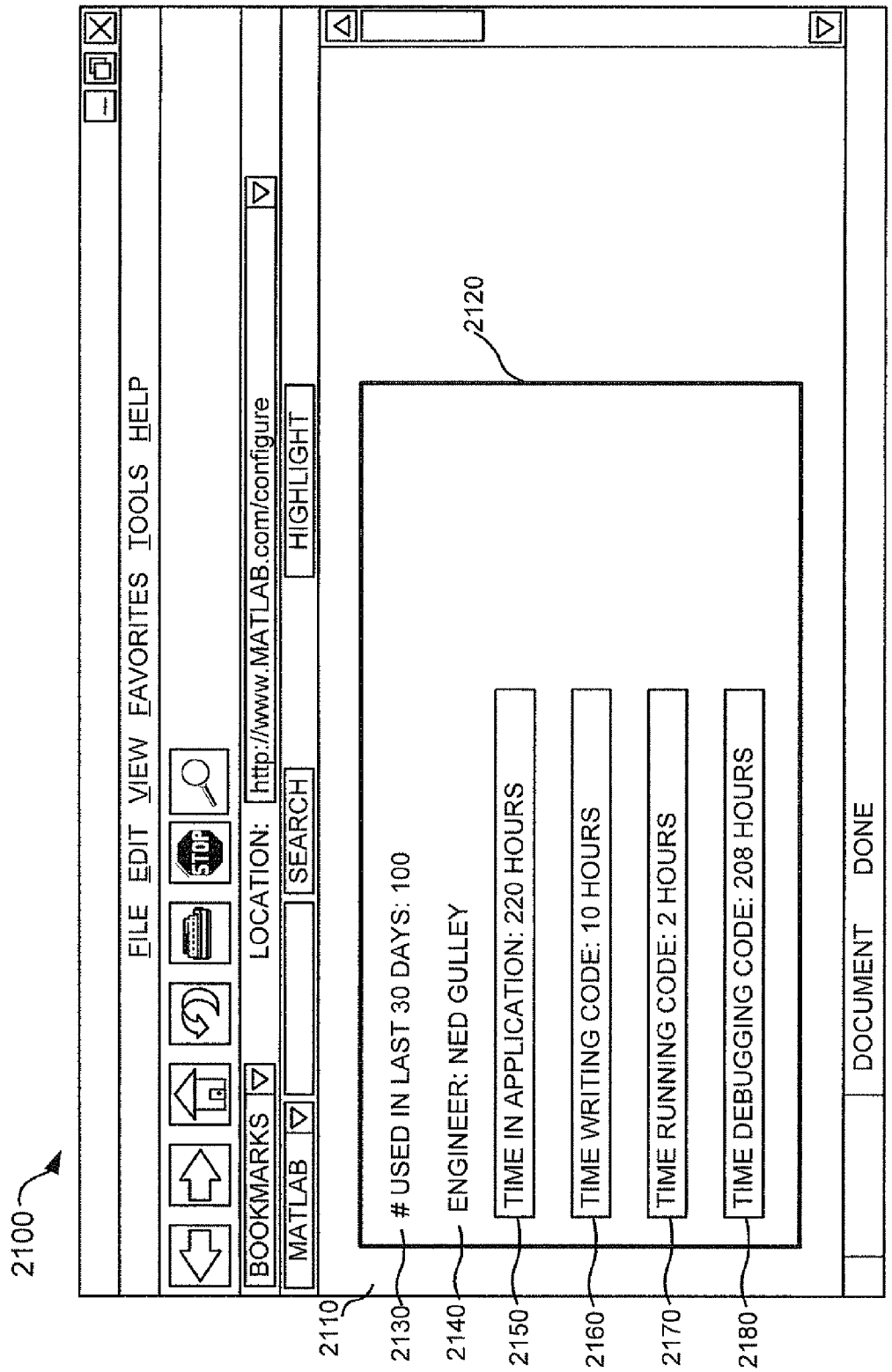
FIG. 21 illustrates an exemplary user interface for monitoring software application usage for a device.

FIG. 21 illustrates a user interface that can be used to display additional information about a software application. For example, user interface 2100 may be displayed to the supervisor when detail button 2050 is selected. User interface 2100 may include used information 2040, display area 2110, window 2120, engineer identifier 2140, time in application 2150, time writing code 2160, time running code 2170, and time debugging code 2180. Window 2120 can include a portion of a display area that contains information about used information 2030.

Window 2120 may include engineer identifier 2140 that identifies an individual or a device used by the individual (e.g., developer 1910-1) that is associated with one or more seats of a software application. For example, Ned Gulley may be an engineer that is associated with a seat that has been used within the last 30 days. Time in application 2150 may include information that identifies usage information for a seat. For example, Ned may have used the software application for 220 hours in the last 30 days.

Time writing code 2160 may include information that identifies an amount of time that an individual or device spent writing code or other material (e.g., documentation). For example, Ned may have spent 10 hours of the 220 hours that he was using the software application actually writing code. Time running code 2170 may include information that identifies an amount of time that was spent running code. For example, Ned may have spent two hours running code that he wrote during the last 30 days. Time debugging code 2180 may include information that identifies an amount of time that was spent debugging code. For example, Ned may have spent 208 hours debugging code that he wrote during the last 30 days.

Information displayed in user interfaces 2000 and 2100 may help the supervisor make decisions about installed software applications and/or individuals using the software applications. For example, the supervisor may determine that 250 of the 1200 installed seats (see FIG. 20) are not needed because they have not been used within 90 days.

The supervisor working at manager 1920 may further use information from user interfaces 2000 and 2100 to make forward looking decisions, such as purchasing decisions, hiring decisions, resource allocation decisions, etc. For example, the supervisor may decide that his group needs additional copies of certain software based on high usage rates. Or, the supervisor may determine that faster hardware and/or distributed processing capabilities are needed to reduce the amount of time required for running code.

Other exemplary embodiments may perform other types of remote tasks on behalf of a device. For example, an embodiment may publish code for a technical computing application to the Web.

Exemplary Publishing to a Network

Assume that an engineering professor wants to teach his students about control theory. The professor may wish to have the students focus on a particular aspect of control theory, e.g., feedback, without becoming distracted by other aspects of control theory. The professor may determine that computer based exercises will help the students learn the desired material; however, the professor may not want the students spending time generating their own code for the exercises. The professor may decide that a good way for his students to learn is to interact with web-based exercises that expose the students to all of the code used to implement an exercise while only letting the students change selected portions of the code, e.g., portions of the code that alter feedback in a control system.

The professor may interact with a system that allows the professor to create exercises that operate with a technical computing application (e.g., MATLAB software) that runs in dynamically typed programming language (e.g., an array based language). The system may further allow the professor to protect certain portions of the code (e.g., by preventing editing, copying, etc.) while leaving other portions of the code unprotected (e.g., by allowing editing, copying, etc.). The system may further allow the professor to identify protected portions of the code and/or unprotected portions of the code using various techniques, such as highlighting, labeling, etc.). The system may allow the professor to publish an exercise that includes the identified code portions, may allow students to interact with unprotected portions of the exercise, may produce results for the students based on the user interactions with the unprotected portions, and/or may capture user interactions so that the professor can determine whether the students understood the exercise.

Figure 22:
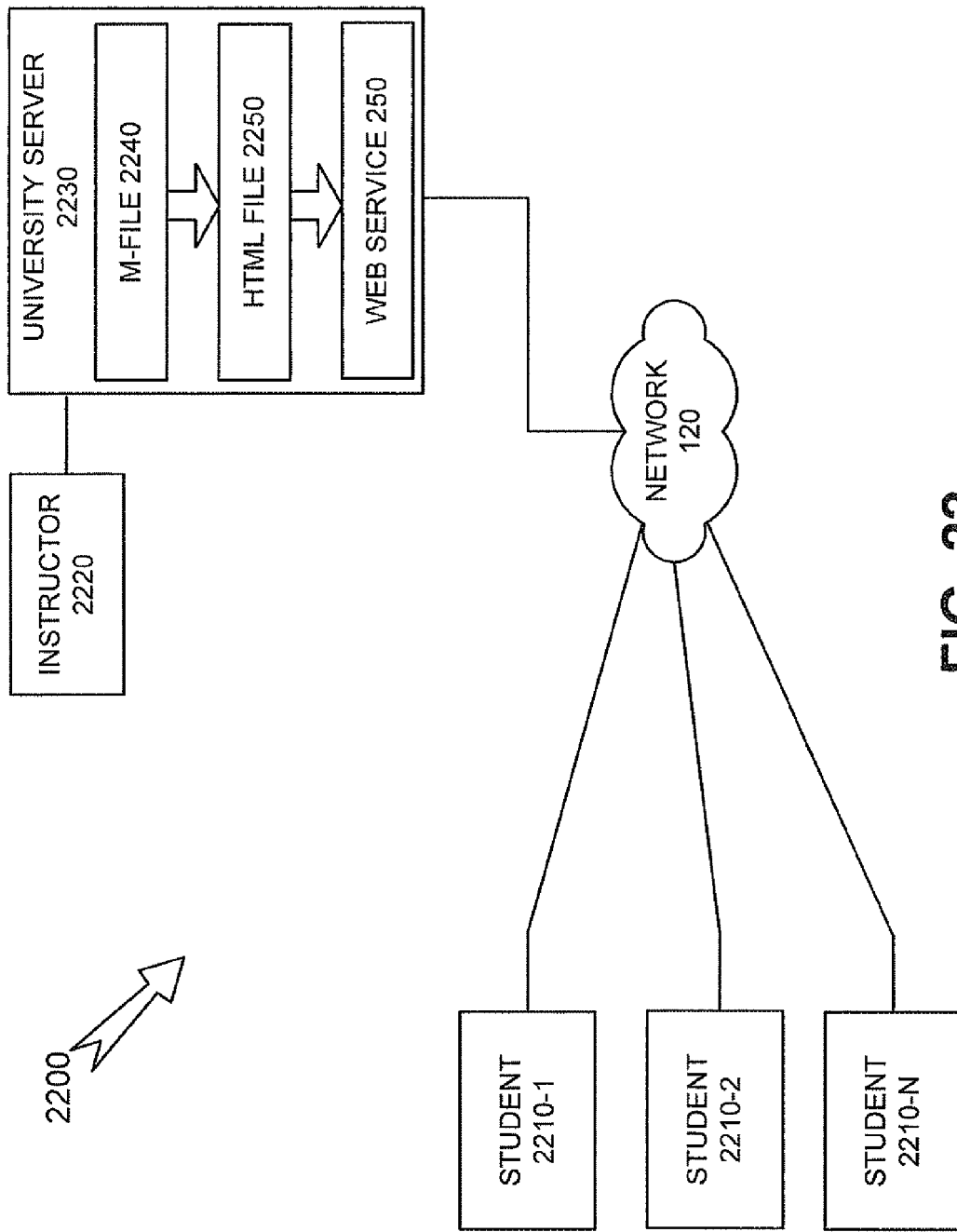
FIG. 22 illustrates an exemplary system for publishing code for performing technical computing operations.

FIG. 22 illustrates a system that publishes code using a network. System 2200 may include network 120, students 2210-1 to N (collectively students 2210), instructor 2220, and university server 2230. Students 2210 may include devices that execute instructions. For example, students 2210 can be implemented via clients 110. In FIG. 22, students 2210 may be used to access one or more code files prepared by instructor 2220.

Instructor 2220 may include a device that executes instructions. In one embodiment, instructor 2220 can include functionality of client 110 or server 130. Instructor 2220 may be used to write code, protect code, label code (e.g., with annotations or instructions for students), send code, and/or receive code or other information (e.g., questions, answers, etc., from students 2210).

University server 2230 may include a device that executes instructions. In one embodiment university server 2230 may include functionality of server 130. In one embodiment, university server 2230 may provide code from instructor 2220 to students 2210 via network 120. University server 2230 may include, web service 250, M-file 2240 and HTML file 2250. Web service 250 may include logic that sends information to or receives information from a destination. For example, web service 250 may send code written by instructor 2220 to students 2210 and/or web service 250 may receive questions, answers, etc., from students 2210.

M-file 2240 may be a file that includes code written in the M language for use with MATLAB software. For example, instructor 2220 may write an example problem for students 2210 in M. Instructor 2220 may receive an input from a user (e.g., a professor teaching the class) that identifies and/or modifies portions of the M-code. For example, some of the inputs may identify a portion of M-code (e.g., one or more functions in the code) as protected code. Protected code may include code that has restrictions placed on it by instructor 2220. For example, protected code may include restrictions that prevent certain types of activities, such as copying, editing, saving, displaying, etc. In FIG. 22, protected code may be visible on a display of student 2210-1, 2, or N; however, protected code may not be edited by student 2210-1, 2 or N.

Instructor 2220 may further receive a user input that identifies a portion of the M-code as unprotected code. Unprotected code may include code that does not have restrictions placed on it. In an alternative embodiment, unprotected code may include code having fewer restrictions placed on it as compared to a number and/or type of restrictions placed on a piece or section of protected code. In FIG. 22, unprotected code may be edited by student 2210-1, 2 or N. For example, instructor 2220 may label certain equations in the M-code as unprotected, where the labeled equations control certain aspects of the M-code file.

Assume, for sake of example, that the professor wants his students to understand how certain activities may alter the performance of a system, such as a control system. In particular, the professor may want the students to understand how sample rates, feedback and/or damping contribute to stable and/or unstable performance of the system. The professor may label code portions as protected portions when the code portions do not contribute to, for example, a sample rate of the system. For example, the professor may protect code portions that create plot axes, axes labels, that set initial conditions for the system, that vary feedback for the system, etc. In contrast, the professor may label other code portions as unprotected when these other code portions are related to the sample rate of the system. The students may be allowed to manipulate values and/or operations in unprotected code portions to change how the system operates.

University server 2230 may pass information about M-file 2240 to HTML file 2250 when protected and unprotected portions of M-file 2240 are identified. HTML file 2250 may include information about the M-code code or may include the M-code itself. HTML file 2250 may include code that renders a dynamic HTML page on a device, such as students 2210. An embodiment of the HTML page may make use of a technical computing application (e.g., MATLAB software) to allow students 2210 to interact with unprotected portions of M-file 2240. The HTML page may identify protected and/or unprotected portions of M-file 2240 using substantially any technique, such as shading, highlighting, contrasting colors, contrasting fonts, flickering fonts, symbols, audio signals, tactile signals, etc. In one embodiment, a window may be placed around unprotected code and the unprotected code may be visible to a user. In contrast, protected code may be blocked from view (e.g., by covering the protected code with an opaque area), or protected code may be identified by a type of shading that differs from shading associated with unprotected code.

University server 2230 may pass HTML file 2250 to web service 250 for display to students 2210. Information displayed to students 2210 via web service 250 may be interactive so that user inputs can be received from students 2210 and passed to web service 250. For example, web service 250 may display an unprotected code portion on student 2210-1. A user of student 2210-1 may enter a new value for a parameter in the unprotected code portion and web service 250 may pass the new value to an M code function operating on university server 2230. The function may be evaluated using the new value to produce an updated result. Web service 250 may receive the updated result and may display the updated result to the user via a display device on student 2210-1.

The embodiment of FIG. 22 can be modified to operate in other ways. For example, functions performed by university server 2230 may be offered as a service that allows full access to all of the M-code for a first price and that allows access to a portion of the M-code for a second price that is lower than the first price. Subscribers may vary payments to university server 2230 depending on the number and/or type of modifications they wish to make to the M-file.

FIGS. 23-27 illustrate an example of an M-file that can be created and/or published using exemplary embodiments.

Figure 23:
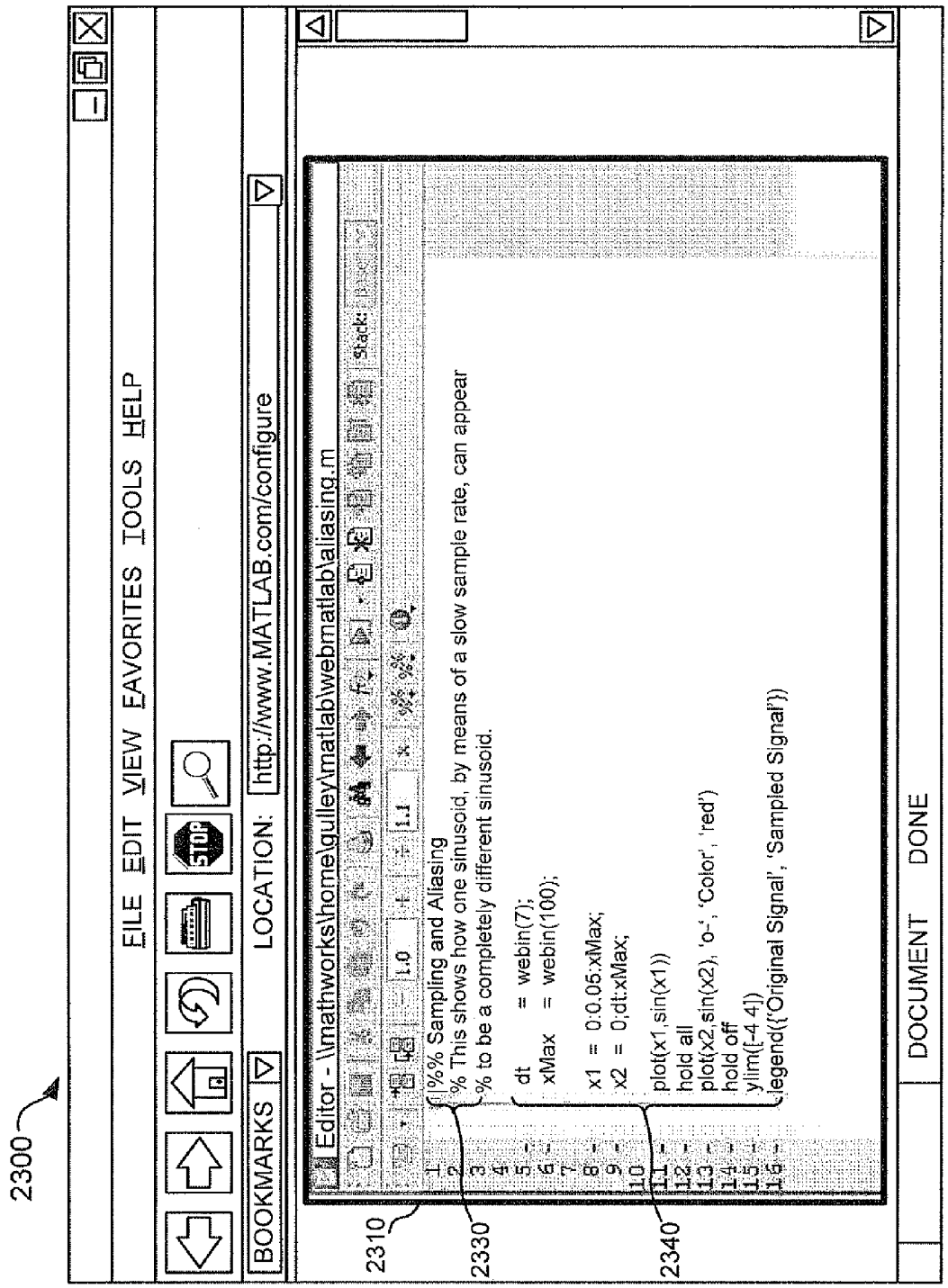
FIG. 23 illustrates an exemplary user interface for interacting with code.

FIG. 23 illustrates an exemplary page 2300 that can be displayed on instructor 2220 using system 2200 (FIG. 22). For example, page 2300 may be displayed to the professor via a browser running on instructor 2220. In FIG. 23, page 2300 may include code window 2310, instructions 2330 and operational code 2340. Code window 2310 may include a region of page 2300 where an M-file or another type of file is displayed to the professor. Embodiments of code window 2310 may use borders, shading, and/or other techniques to define a region of page 2300 for the professor.

Instructions 2330 may include text, graphics, symbols, audio, video, images, etc. Instructions 2330 may inform a user about information included in code window 2310. For example, instructions 2330 may inform a user (e.g., a student) about entering information into code window 2310, may inform a user about lessons that should be learned by interacting with code window 2310, may explain what other text, graphics, etc., in code window 2310 do, etc. Instructions 2330 may further include information that identifies portions of code that should be labeled as protected code and/or unprotected code.

Operational code 2340 may include text, graphics, symbols, audio, video, images, etc. In an embodiment, operational code 2340 may include text based code that implements one or more functions that produce results when executed. For example, in FIG. 23, operational code 2340 may receive user inputs, process user inputs, generate data values, plot data values, display data values, etc.

Page 2300 may be created and/or edited using instructor 2220. When page 2300 is complete, it can be sent to university server 2230 where page 2300 can be formatted for publishing via web service 250. For example, page 2300 can include an M-file 2240 that implements one or more functions that generate results. M-file 2240 may be converted into an HTML file 2250 that can be published via web service 250.

Figure 24:
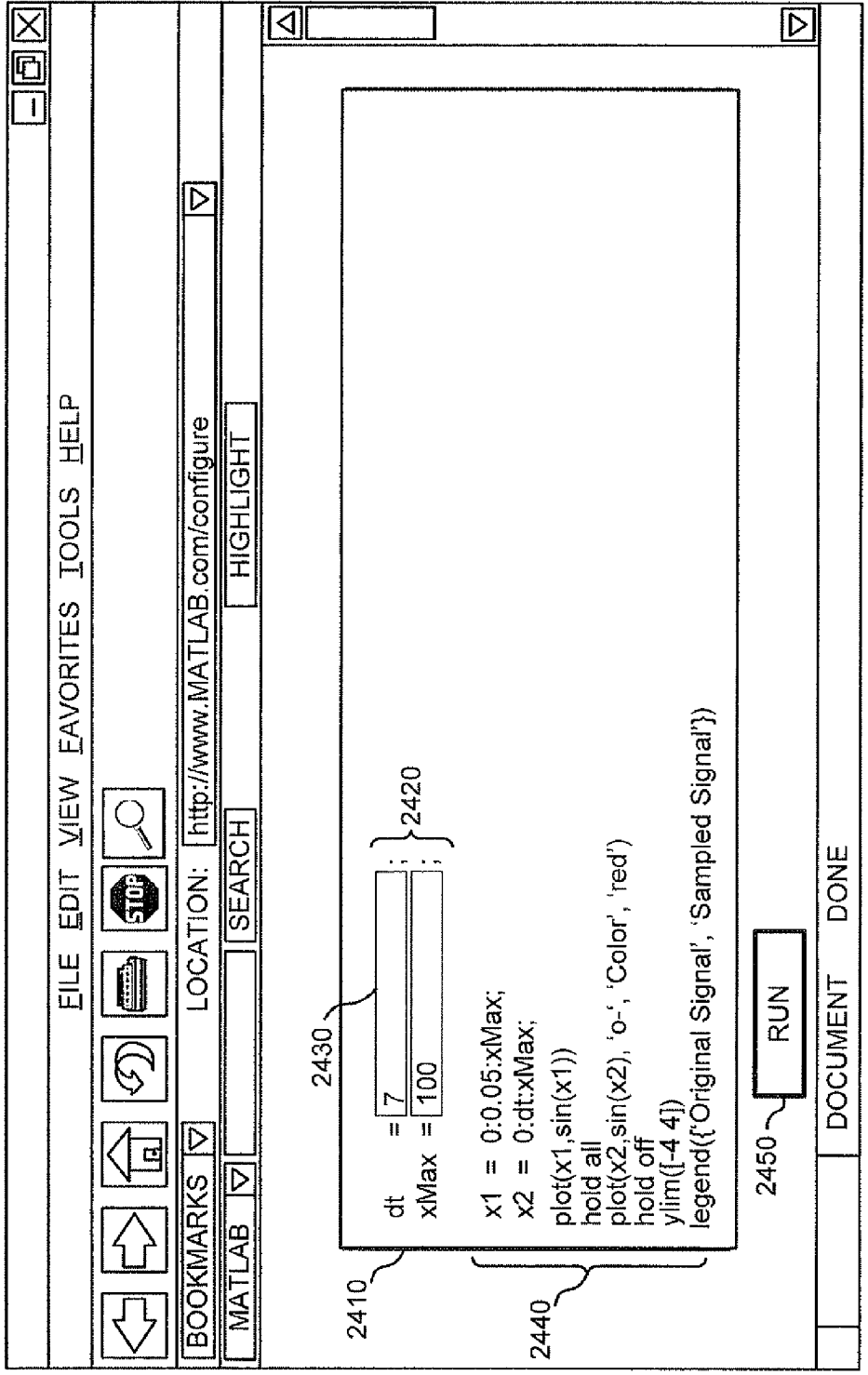
FIG. 24 illustrates an exemplary user interface for interacting with published code (e.g., to enter a first input)

FIG. 24 illustrates an exemplary published HTML page 2400. In an embodiment, HTML page 2400 can be displayed on students 2210 via browser 220. HTML page 2400 can include window 2410, unprotected code 2420, input fields 2430, protected code 2440, and run button 2450.

Window 2410 may include a portion of a display area that includes user inputs, unprotected code 2420, and/or protected code 2440. Window 2410 may be defined using borders and/or other techniques in an embodiment.

Unprotected code 2420 may include code that can be modified by a user. For example, unprotected code 2420 may include a portion of a published M-file that allows a user to enter values before running the M-file. In an embodiment, unprotected code 2420 may include fields 2430 that identify a region where user inputs can be entered. The published M-file may read values in fields 2430 when the M-file is run and may generate results using read values.

Protected code 2440 may include a portion of the published M-file that cannot be modified by a user. For example, protected code 2440 may include code that reads values from fields 2430, that processes the values, that generates results based on the processed values, and that plots the results on a display device or printed output, or that stores the results in a storage device.

Run button 2450 may include logic that runs the published M-file using values in fields 2430. For example, a user may enter a value of "7" for dt and a value of "100" for xMax into fields 2430 and may select run button 2450 via a pointing device. The published M-file may run and may produce one or more results based on the values "7" and "100". For example, the published M-file may generate a plot.

Figure 25:
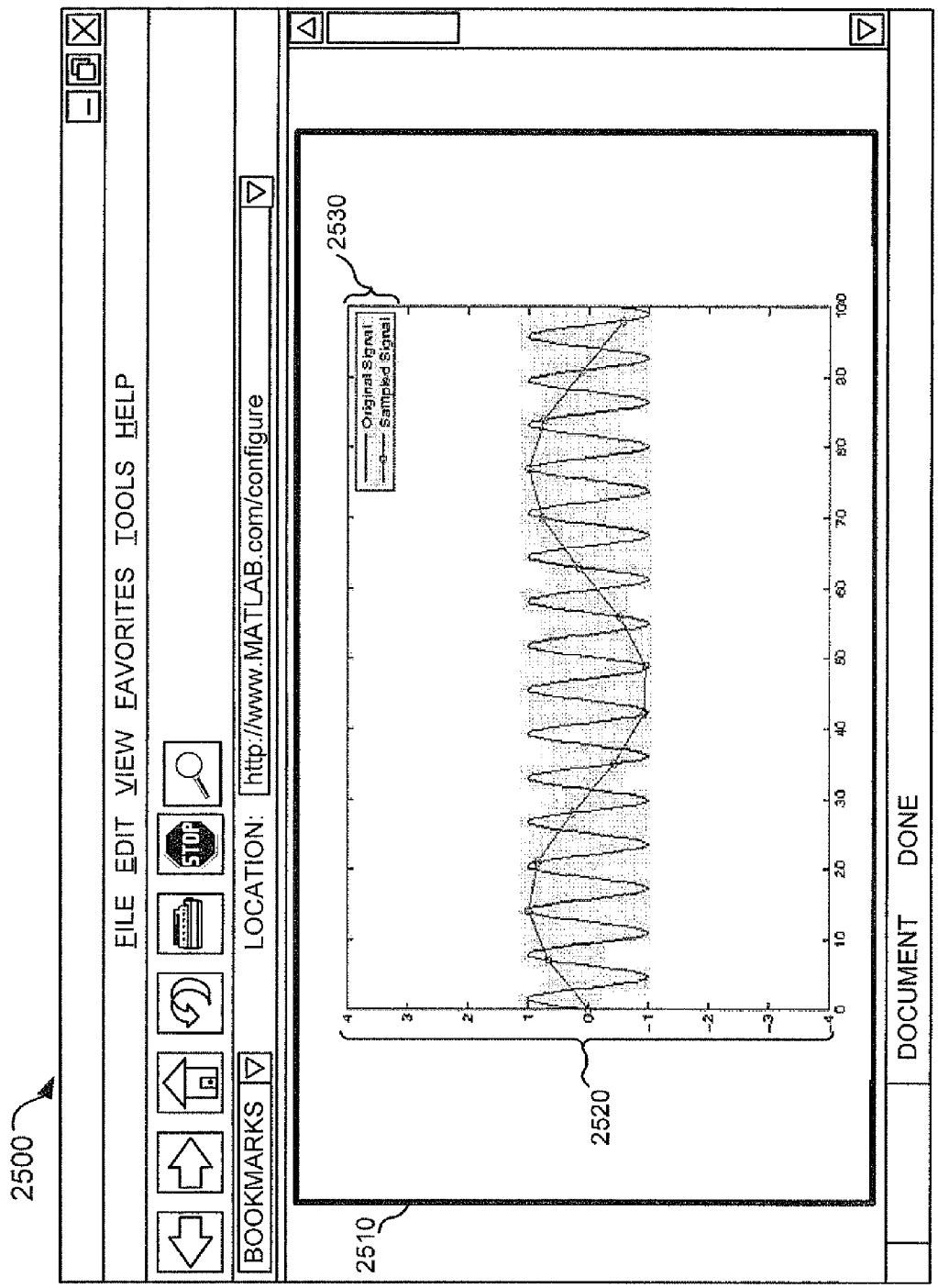
FIG. 25 illustrates an exemplary result produced by running published code (e.g., code run in response to the first input)
Figure 26:
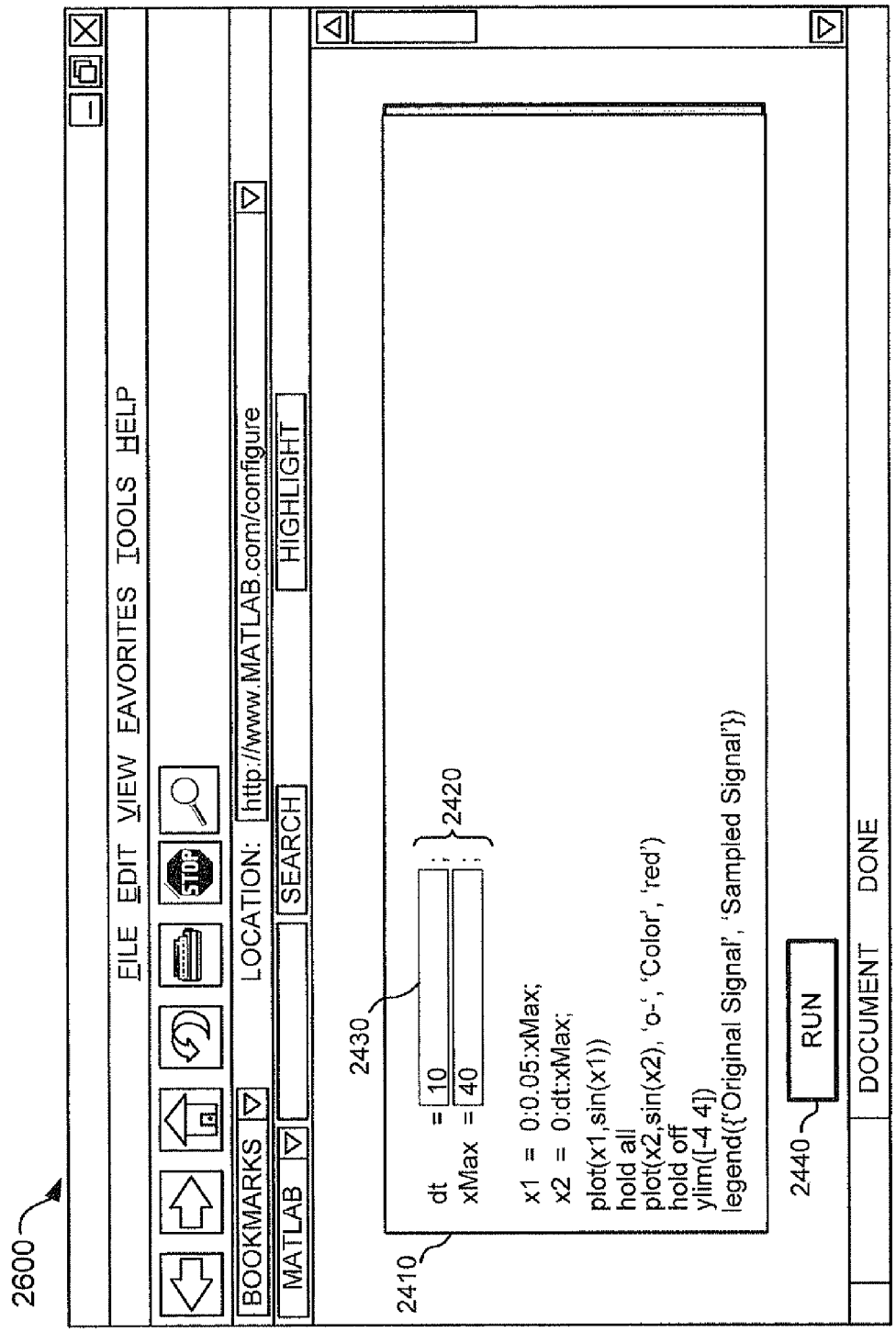
FIG. 26 illustrates an exemplary user interface for interacting with published code (e.g., to enter a second input)

FIG. 25 illustrates an exemplary page 2500 that can include a plot produced when a published M-file is run. Page 2500 may be displayed to the user via browser 220 in an embodiment. Page 2500 may include window 2510, plot 2520, and legend 2530. Window 2510 may include a portion of page 2500 where one or more results of a published M-file can be displayed to a user. Plot 2520 may include one or more outputs generated when a published M-file is run. For example, plot 2520 may include values for an original signal and a sampled signal plotted against an x and y axis. Legend 2530 may include information that identifies data displayed in plot 2520. For example, legend 2530 may identify which line represents the original signal and which line represents the sampled signal.

A user may re-run the published M-file using different values to determine how the operational code 2440 operates with the different values. For example, in FIG. 26, display page 2600 may be displayed via browser 2220. The user may interact with unprotected code 2420 in page 2600 and may enter new values in fields 2430. For example, the user may change "7" to "10" for dt and may change "100" to "40" for xMax. The user may re-run the published M-file by selecting run button 2440.

Figure 27:
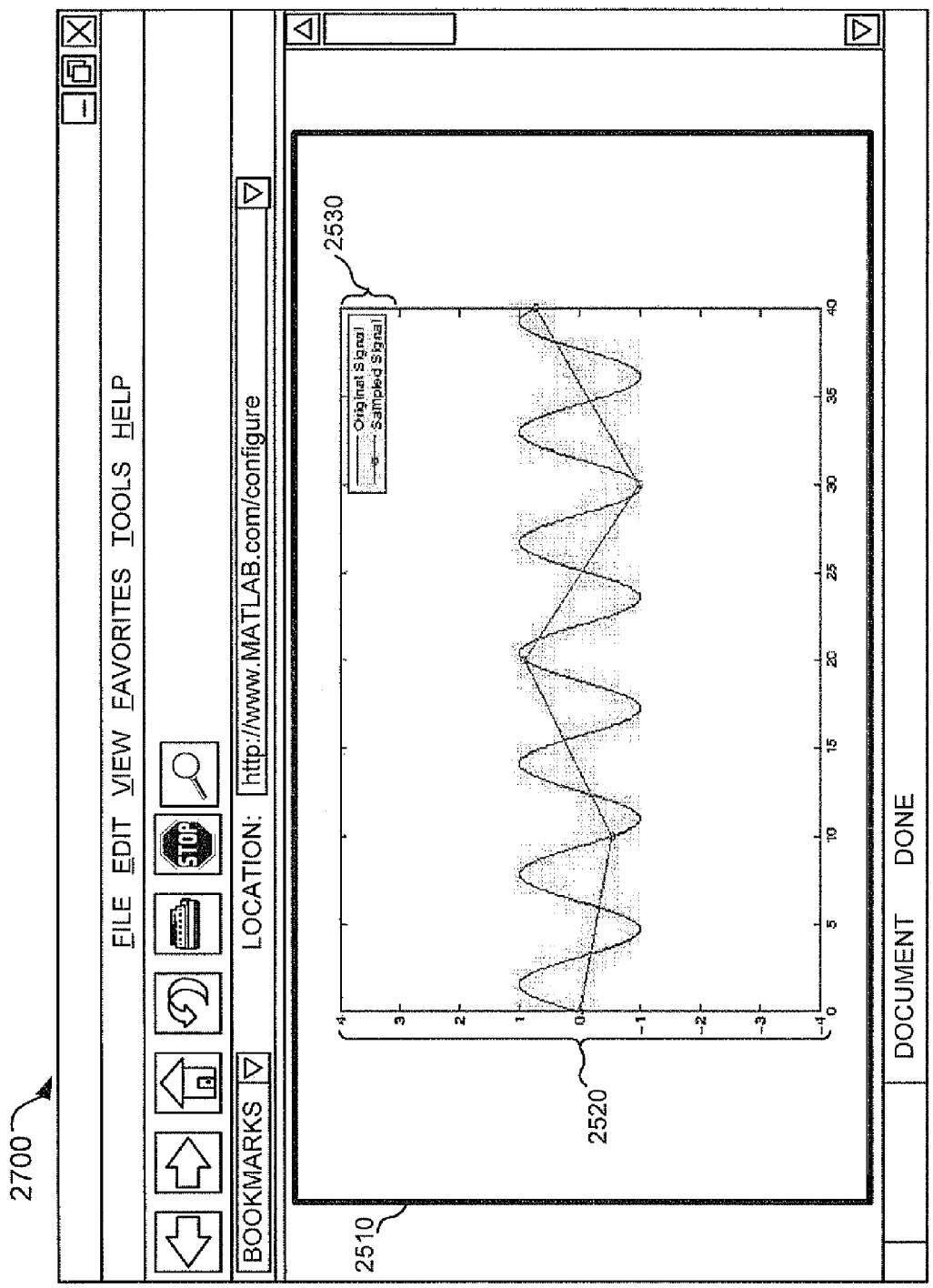
FIG. 27 illustrates an exemplary result produced by running published code (e.g., code run in response to the second input)

The published M-file may run using "10" and "40" as inputs and may produce a result. FIG. 27 illustrates an exemplary plot that is produced when the published M-file is run with these updated inputs. For example, page 2700 may be displayed to the user when the published M-file is run with "10" and "40" as input values. In an embodiment, information in plot 2520 may change when the published M-file is run with "10" and "40". The embodiment may help a user make decisions based on results displayed in pages 2500 and 2700. For example, the user may determine whether the published M-file produces more desirable results with "7" and "100" as input values or with "10" and "40" as input values.

In an embodiment, information entered by the user may be sent back to university server 2230 and/or instructor 2220. For example, the professor may determine whether his students completed an entire exercise, obtained correct results, etc., by examining information received from pages 2400, 2500, 2600 and/or 2700.

Exemplary Device Architecture

Figure 28:
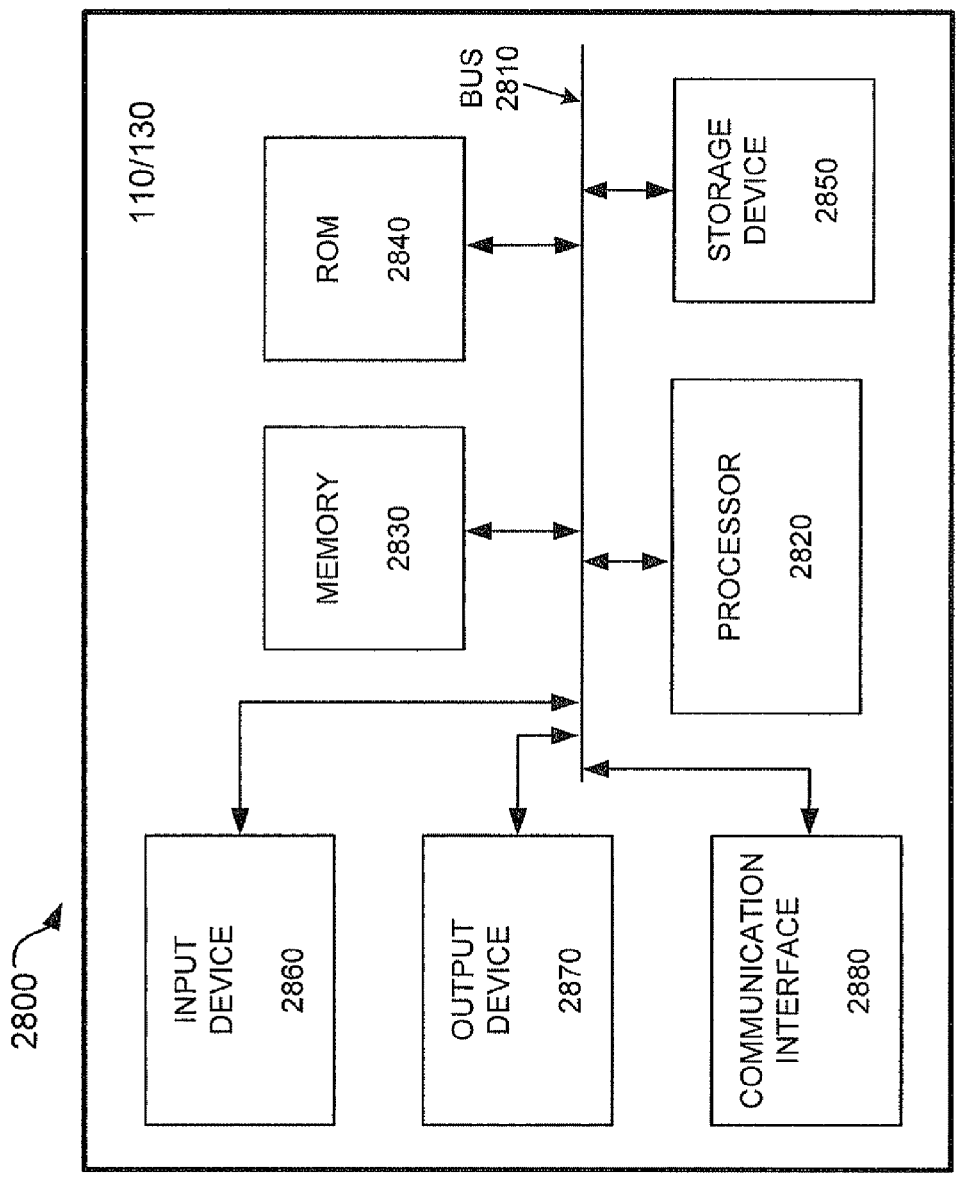
FIG. 28 illustrates an exemplary computing architecture that can be used to implement a client or a server.

FIG. 28 illustrates an exemplary architecture for implementing client 110 or server 130. It will be appreciated that a hardware implementation of UE 270, farm manager 320, and/or other devices may be similarly configured. As illustrated in FIG. 28, architecture 2800 may include a bus 2810, a processor 2820, a memory 2830, a read only memory (ROM) 2840, a storage device 2850, an input device 2860, an output device 2870, and a communication interface 2880.

Bus 2810 may include one or more interconnects that permit communication among the components of client 110/server 130. Processor 2820 may include any type of processor, microprocessor, or processing logic that may interpret and execute instructions (e.g., an FPGA, a application specific integrated circuit (ASIC), an analog processing device, a quantum-based processing device, etc.). Processor 2820 may include a single device (e.g., a single core) and/or a group of devices (e.g., multi-core).

Memory 2830 may include a random access memory (RAM) or another type of dynamic storage device that may store information and instructions for execution by processor 2820. Memory 2830 may also be used to store temporary variables or other intermediate information during execution of instructions by processor 2820.

ROM 2840 may include a ROM device and/or another type of static storage device that may store static information and instructions for processor 2820. Storage device 2850 may include a magnetic disk and/or optical disk and its corresponding drive for storing information and/or instructions.

Input device 2860 may include any mechanism or combination of mechanisms that permit an operator to input information to a device that includes architecture 2800, such as a keyboard, a mouse, a touch sensitive display device, a microphone, a pen-based pointing device, and/or a biometric input device, such as a voice recognition device and/or a finger print scanning device. Output device 2870 may include any mechanism or combination of mechanisms that outputs information to the operator, including a display, a printer, a speaker, etc.

Communication interface 2880 may include any transceiver-like mechanism that enables a device to communicate with other devices and/or systems, such as client 110, service provider 140, UE 270, farm manager 320, etc. For example, communication interface 2880 may include one or more interfaces, such as a first interface coupled to network 120 and/or a second interface coupled to another device, such as farm manager 320. Alternatively, communication interface 2880 may include other mechanisms (e.g., a wireless interface) for communicating via a network, such as a wireless network. In one implementation, communication interface 2880 may include logic to send code to a destination device, such as a destination device that can include general purpose hardware (e.g., a personal computer form factor), dedicated hardware (e.g., a digital signal processing (DSP)), etc.

A device that includes architecture 2800 may perform certain functions in response to processor 2820 executing software instructions contained in a computer-readable medium, such as memory 2830. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Policy-based Dispatch of Requests

Exemplary embodiments can be configured to dispatch requests according to policies. For example, a client, such as client 110, may make a request for processing activities, storage service operations, application level services, etc. An embodiment of the invention can intelligently handle the requests according to one or more policies that are used to determine how to handle the request. For example, a policy may be used to identify the most appropriate remote processing resource to handle a processing request from the client given certain constraints, such as a maximum latency for obtaining a result, a cost threshold, an accuracy threshold, a security constraint, etc.

Figure 29:
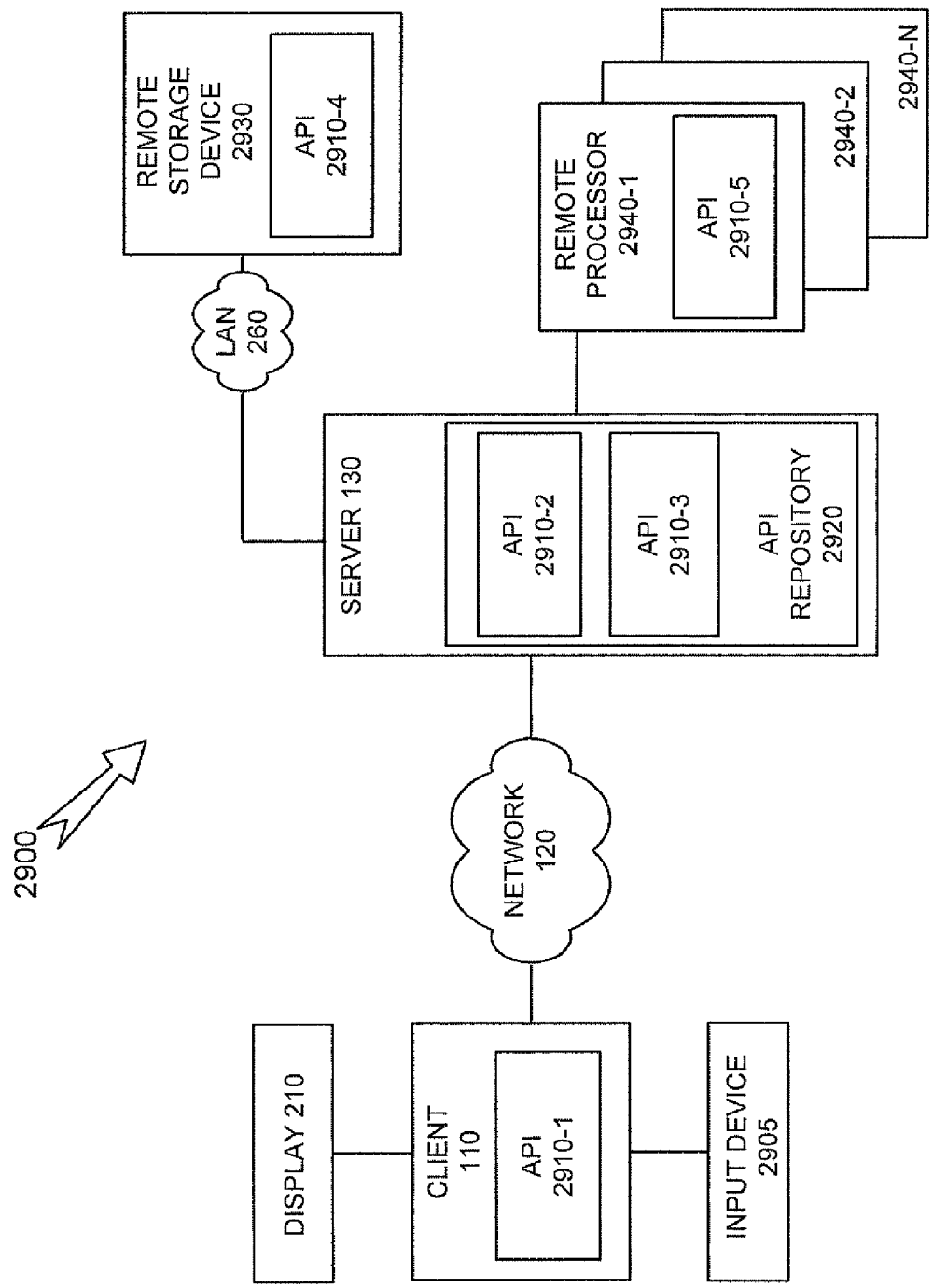
FIG. 29 illustrates an exemplary system for implementing an embodiment of the invention.

FIG. 29 illustrates a system for intelligently dispatching requests from a client to one or more remote devices. System 2900 can include client 110, network 120, server 130, display 210, LAN 260, input device 2905, remote storage device 2930 and remote processors 2940-1, 2, to N.

Client 110, network 120 and server 130 may be devices as described in connection with FIG. 1; and, display 210 and LAN 260 may be devices as described in connection with FIG. 2. Client 110 may include application programming interface (API) 2910-1, and other devices in system 2900 may include similar APIs 2910-2, 3, 4, and/or 5 (generally referred to as API 2910). API 2910 may be comprised of software that invokes a service. For example, API 2910-1 may invoke a service that performs processing on behalf of client 110, while another API, such as API 2910-4 may invoke a service that stores information on behalf of a requesting device. API 2910 may be on a device that invokes the API, may be remote with respect to a device that invokes the API, or API 2910 may be sent to a requesting device so that the requesting device can invoke the API locally once received.

In system 2900, API 2910 may dynamically determine where a software service should be run to satisfy a request. System 2900 may use one or more policies with API 2910 to determine where to run a software service on behalf of the requesting device. For example, client 110 may use API 2910-1 for requesting a processing service. API 2910-1 may be used to dynamically determine whether a local service (i.e., a processing service resident on client 110) should be used or whether a remote processing service should be used. If a remote service should be used, API 2910-1, alone or in combination with other software in system 2900, may determine a particular remote processing resource for performing the service.

In an embodiment, the APIs 2910 may be selected according to policies that can include, but are not limited to, a security policy, a cost policy, a bandwidth policy, a state policy, a latency policy, a configuration policy, a location policy, a quality-of-service policy, a topology policy, an affiliation policy, a licensing policy, a rights policy an accuracy policy, etc.

For example, a security policy may require that resources used to satisfy the request must meet a certain security threshold, e.g., must be on a certain type of network, that processing resources are associated with certain entities, that the processing resources provide an uncontaminated environment to the requesting device, etc. A cost policy may include pricing metrics that cannot be exceeded by resources processing a request, e.g., a cost per mega-flop of CPU time, a cost per mega-byte of storage, an access cost for a resource, etc.

A bandwidth policy may determine a throughput for a network or device associated with performing processing on behalf of a requesting device, e.g., a network connection may need to have a certain guaranteed bandwidth to comply with the policy. A state policy may identify a state that a processing resource needs to satisfy in order to perform processing on behalf of a requesting device, e.g., a processing device may need to establish a processing environment from scratch before processing the request to eliminate chances that old information is residing in the environment when the request is processed.

A latency policy may identify a time interval, within which a result must be produced, received, etc., once a request is dispatched to a processing resource. A configuration policy may identify a particular hardware, software, or combination of hardware and software configuration that must be present on a processing resource operating on a request.

A location policy may indicate that processing resources need to be at a certain location (e.g., a geographic location) in order to be used to process the request. A quality-of-service policy may identify a minimum threshold for the quality-of-service of a network, device, etc., used to process a request. A topology policy may identify one or more network topologies (e.g., that may include devices in a cloud computing network) or characteristics of the topologies that should be satisfied by devices and/or networks used to process a request. Example characteristics may include, but are not limited to, proximity between two or more elements within the topology as measured by, for example, network bandwidth, latency, and/or network addresses (e.g., network domain, network sub-domain, etc.).

An affiliation policy may identify affiliations for entities or devices used to process a request. For example, an affiliation policy may indicate that only processing resources associated with an educational institution can be used to process a request. A licensing policy may indicate that processing resources need to comply with certain licenses in order to process a request. For example, processing devices may need to have valid licenses for a technical computing environment in order to operate on a request received from a client.

A rights policy may identify certain legal rights that need to be complied with by processing resources operating on a request. For example, a rights policy may indicate that processing resources need to satisfy patent, copyright, trademark, export compliance, etc., laws with respect to hardware and/or software used to process a request. An accuracy policy may identify a threshold that identifies a minimum accuracy that processing resources must satisfy in order to operate on a request. Other embodiments of the invention may employ one or more other types of policies, with or without the policies discussed above, without departing from the spirit of the invention.

Server 130 may include an API repository 2920 that stores APIs for use in system 2900. For example, when client 110 requests a service and client 110 does not have an appropriate API locally available, an API, such as API 2910-3, may be retrieved from API repository 2920 and made available to client 110. Client 110 may use API 2910-3 to access the requested service.

Remote storage device 2930 may provide remote storage services to client 110. Remote storage device 2930 may include API 2910-4 that may be required to provide storage services to client 110 in an embodiment. In another embodiment, server 130 may retrieve an API from API repository 2920 and may provide it to client 110 or to remote storage device 2930 so that client 110 can access remote storage services. In still another embodiment, client 110 may have an appropriate API in local storage and may use the API to access storage services.

System 2900 may include one or more remote processors 2940-1, 2940-2 to 2940-N (generally remote processors 2940) that perform remote processing operations on behalf of a requesting device, such as client 110 or server 130. Remote processors 2940 may include APIs, e.g., API 2910-5, for accessing remote processing services, or APIs may be stored elsewhere in system 2900. In an embodiment, remote processor 2940-1 may make API 2910-5 available to client 110 when client 110 requests a remote processing service. API 2910-5 may determine which ones of remote processors 2940 are most appropriate for providing a requested processing service to client 110 based on a remote processing policy associated with system 2900.

Exemplary Processing for Policy-based Dispatch of Requests

Figure 30:
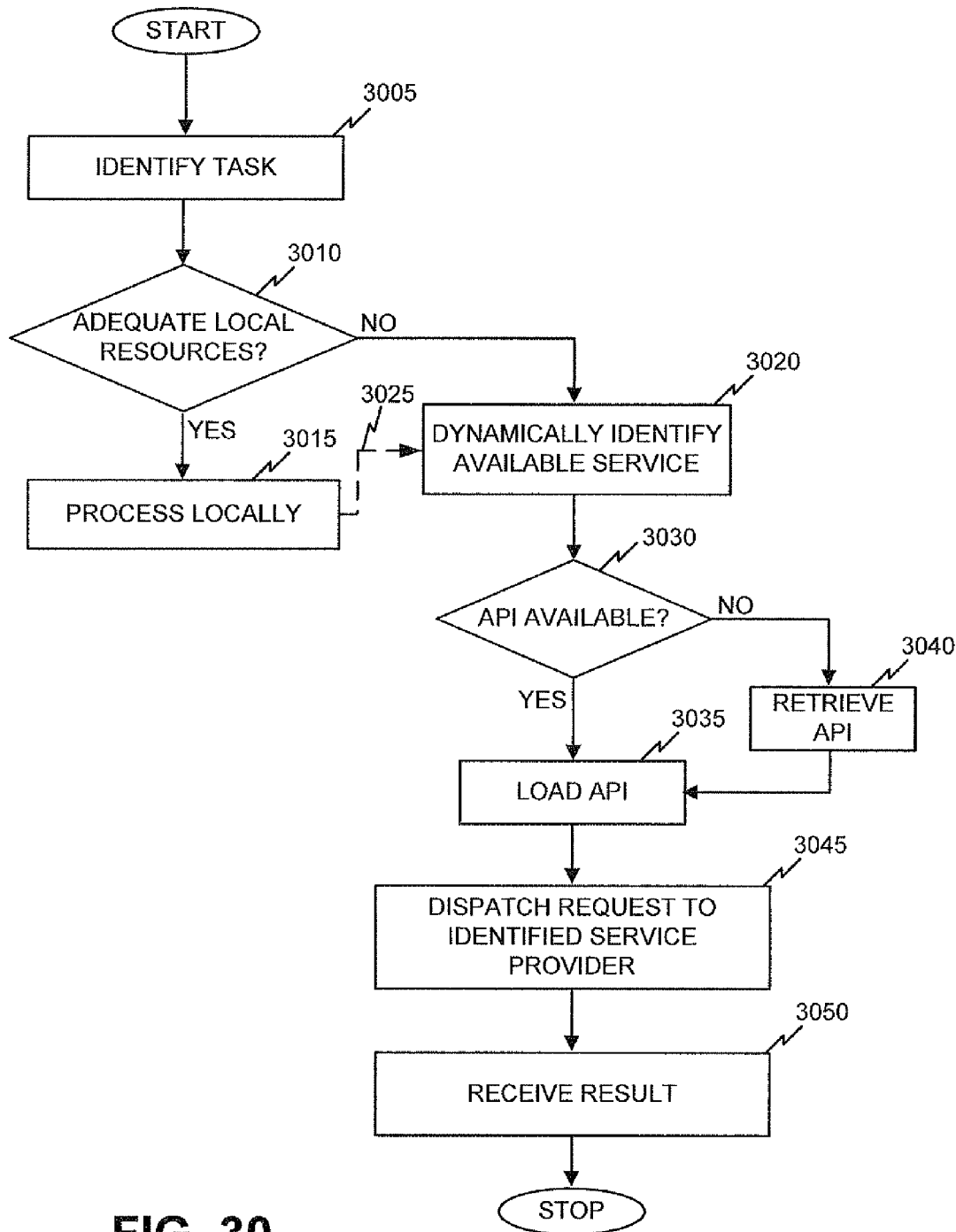
FIG. 30 illustrates exemplary processing for dispatching processing requests to distributed processing resources using an embodiment of the invention.

FIG. 30 illustrates exemplary processing for performing policy-based dispatching of requests for services. For example, the acts of FIG. 30 may be performed by devices illustrated in FIG. 29 according to an embodiment of the invention.

Referring to FIG. 30, a task may be identified (act 3005). For example, client 110 may have a processing task, a storage task, a communication task, application level task, etc., that needs to be performed. In an embodiment, the task may be performed using a device that provides a service on behalf of the client, where the device may be local (e.g., performed on client 110) or remote with respect to client 110. Once the task is identified, a determination may be made as to whether adequate local resources are available on client 110 for performing the task (act 3010). If adequate local resources are available, the task may be processed locally using a service resident on client 110 (act 3015). However, if adequate local resources are not available, an available service may be dynamically identified (act 3020). In an embodiment, when a task is processed locally at act 3015, another service may be requested via path 3025 and dynamically identified via act 3020.

Once a service is identified, a determination may be made as to whether an API is available for the identified service (act 3030). When an API for the required service is available, the API is loaded (act 3035). In contrast, when an API is not available, for example locally at client 110, an appropriate API may be retrieved (act 3040). The retrieved API at act 3040 may then be loaded (act 3035).

The loaded API may be used to dispatch a request that includes the task to an identified service (act 3045). For example, a task may be sent from client 110 to remote storage device 2930 using server 130. Remote storage device 2930 may provide a storage service to client 110. In an embodiment, remote storage device 2930 may provide a confirmation message indicating that the storage request was satisfied. Client 110 may receive the confirmation (identified as a result in FIG. 30) via network 120 (act 3050).

Exemplary Technique for Dynamically Scaling Resources

Embodiments of the invention can be configured to dynamically scale remote processing resources according to current processing demands and according to predicted processing demands. For example, an embodiment may use predictive models that accept current processing loads as an input and use other information, such as historical processing data, along with one or more algorithms to generate estimates of future processing loads. These future processing loads may be for a determined time interval, such as a number of seconds, minutes, hours, days, etc.

By way of example, a number of clients 110 may be using remote processing resources to perform calculations. The clients may be placing a current demand on these resources and the current demand may be used as an input to a predictive model that uses the time of day and date information to predict remote processing loads for the next hour. The model may produce a result that indicates the current demand will likely increase by 25% within the next hour. The model result may be used by a scheduler operating in server 130 to bring additional remote processing resources online and to make the additional resources available to clients 110. The additional resources may include enough processing devices to handle a processing demand increase of 25% without adversely impacting response times, processing speeds, processing accuracy, etc., for clients 110.

Figure 31:
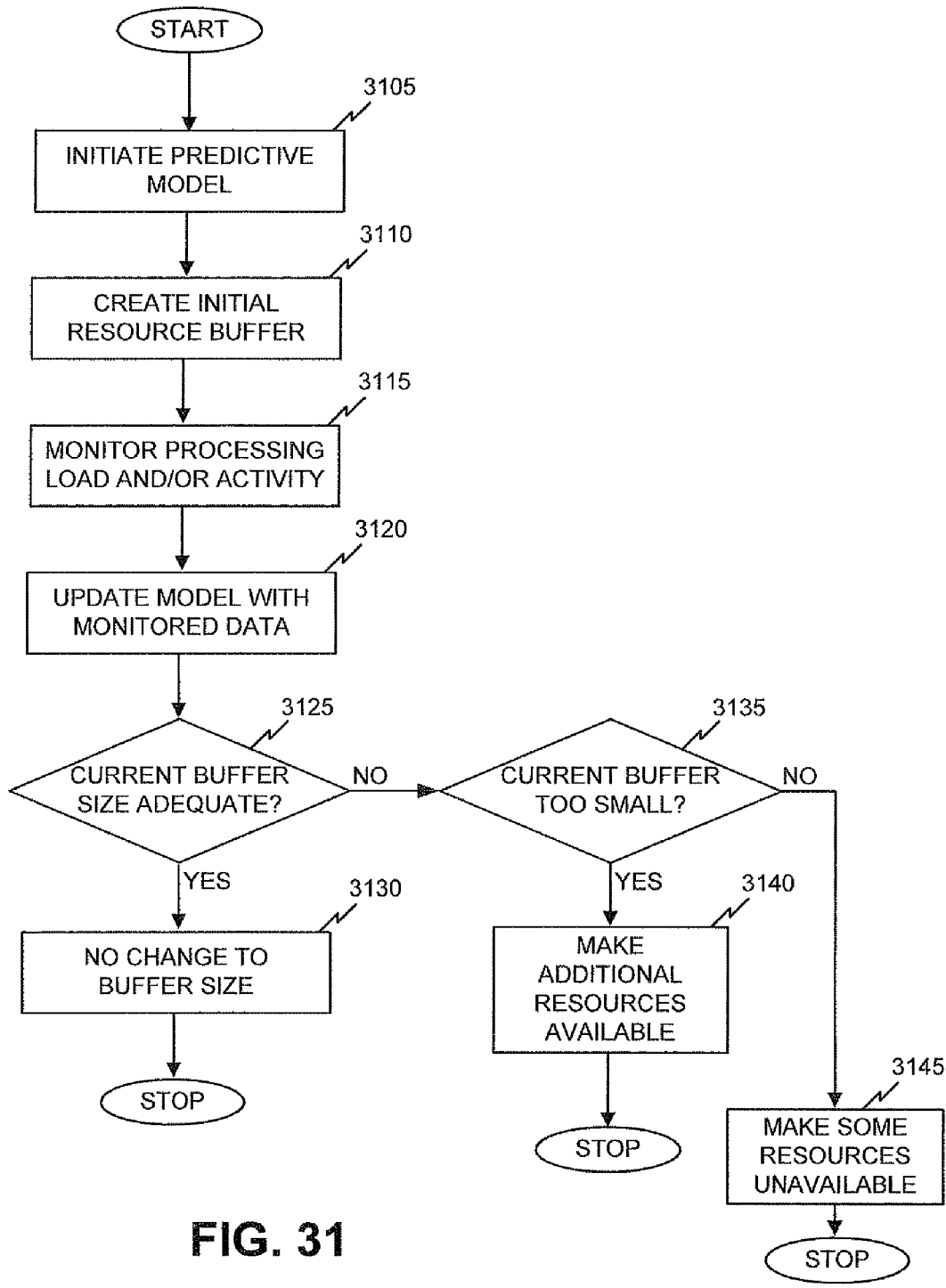
FIG. 31 illustrates exemplary processing for proactively providing remote processing resources using an embodiment of the invention.

FIG. 31 illustrates exemplary processing that may be used to dynamically scale processing resources using predictive algorithms. A predictive model may be initiated (act 3105). The predictive model may be configured to provide a processing power buffer (e.g., a certain amount of excess processing capability) to an environment that provides distributed processing capabilities to clients 110.

An initial resource buffer may be created using outputs from the predictive model (act 3110). For example, a buffer of 5% may be maintained, where the 5% indicates that enough processing resources are provided so that no more than 95% of available processing resources are being used at a given time. Embodiments may establish buffers based on various parameters associated with a distributed processing environment. For example, a buffer may be established based on overall processing load on a system, based on particular types of processing loads (e.g., image processing loads, cell processing loads, etc.). In addition, a buffer may represent an aggregation of two or more different types of buffers that individually may be established according to different system parameters. Buffers may further be based on hardware resource loads, software resource loads, availability of specialized hardware resources, availability of specialized software resources (e.g., software applications, software toolboxes, operating system configurations, virtual machine configurations, etc.). Still further, buffers may be established or modified based on a rate-of-change for a load on a system. For example, buffers may account for rates-of-change for a number of users, types of processing (e.g., image processing, cell processing, filtering, etc.), system latencies, quality-of-service, accuracies of results, device failures, errors, etc., over a determined interval, such as a number of seconds, minutes, hours, days, etc.

Processing loads and/or other activities may be monitored in the environment using the predictive model (act 3115). Information related to the monitored activities may be fed to the predictive model to update the model with current information about demands being placed on the environment (act 3120).

The processing may determine whether a current buffer size is adequate based on a result from the updated predictive model (act 3125). When the buffer size is adequate, no change to the buffer size may be made (act 3130). However, when the current buffer size is not adequate at act 3125, a determination may be made as to whether the current buffer size is too small (act 3135). When the current buffer size is too small, additional resources may be brought online (act 3140). In contrast, when the current buffer size is too large, some resources may be rendered unavailable (e.g., taken offline) (act 3145).

Figure 32:
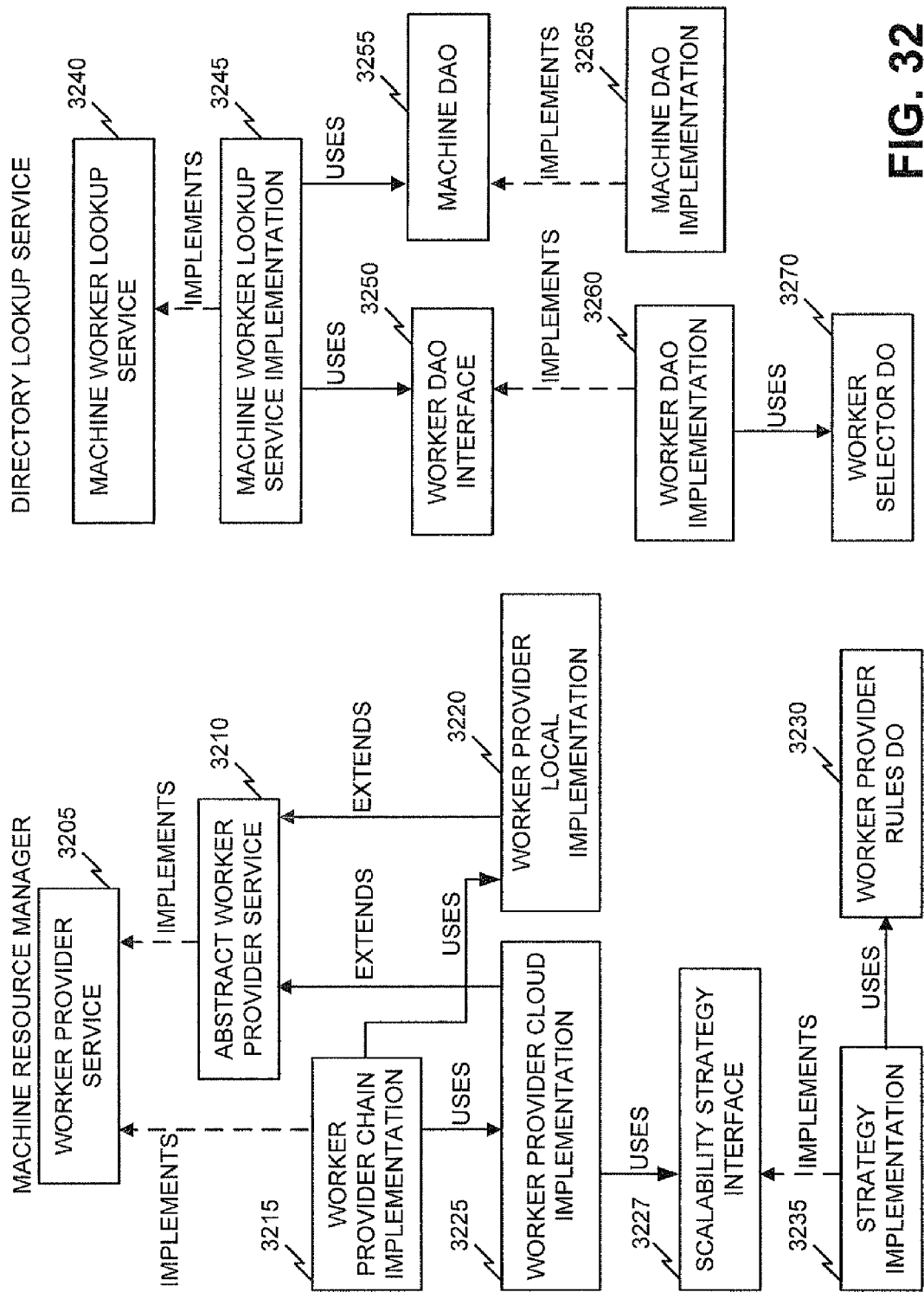
FIG. 32 illustrates an arrangement of software modules that can be used perform the exemplary processing illustrated in FIG. 31.

FIG. 32 illustrates an embodiment that can be used to dynamically scale resources in a distributed processing environment. The embodiment of FIG. 32 may include software modules configured to perform various operations associated with dynamically scaling resources. The modules of FIG. 32 may be generally grouped into machine resource manager functions located along the left side of FIG. 32 and directory lookup service functions located along the right side of FIG. 32. Other implementations for dynamically scaling resources may be configured in other ways without departing from the spirit of the invention.

Referring to FIG. 32, worker provider service 3205 may be a generic interface that describes lifecycle events for managing workers, such as workers used to perform remote processing activities on behalf of a client. For example, worker provider service 3205 may reserve a worker, may recycle a worker (e.g., by returning the worker to a pool or resources for performing remote processing and/or by cleaning the worker for reuse), may store or retrieve policies associated with a worker, etc. In an embodiment of the invention, workers that perform remote processing may be MATLAB workers or MATLAB-compatible workers and may operate as part of a computing cloud that is configured to perform technical computing operations on behalf of clients.

Abstract worker provider service 3210 may be a base class that implements reusable methods of the worker provider service interface 3205. In an embodiment, the abstract worker provider service 3210 may implement a subset of the methods defined in worker provider service 3205.

Worker provider chain implementation 3215 may include an implementation of worker provider service 3205 that aggregates several worker provider implementations 3215. In an embodiment, worker provider implementations 3215 may include logic needed for using a heterogeneous collection of workers. The heterogeneous collection of workers may include both local and cloud based workers.

Worker provider local implementation 3220 may be an extension of the abstract worker provider service 3210 that is suitable for managing a collection of local workers. For example, in an embodiment, local workers may be workers local with respect to an internal network or machine (i.e., may not be cloud based).

Worker provider cloud implementation 3225 may include an implementation of the worker provider service interface 3205 that embodies logic for managing life cycle events of workers that run in a computing cloud. In an embodiment, the workers may be MATLAB workers or MATLAB-compatible workers and the computing cloud may be a commercially available cloud or may be a cloud customized for one or more applications. In the embodiment of FIG. 32, an element of the logic embodied in worker provider cloud implementation 3225 can include the implementation of an event based (including time driven) mechanism for creating new workers, checking on the health (including network accessibility, validity of the technical computing environment, etc.) of workers and/or recycling "sick" workers, e.g., workers that fail to meet health requirements of the system Scalability strategy interface 3227 may include an interface that defines methods (e.g., key methods) invoked during dynamic scaling decision making, e.g. poll(workerLookupService, rules, cloudService), recycle(workerLookupService, rules, machineId). Scalability strategy interface 3227 allows the worker provider implementation 3215 or 3225 to apply different strategies based on configuration properties or other aspects of a system.

Scalability strategy implementation 3235 may include an implementation of scalability strategy interface 3227. Alternative implementations of scalability strategies may use different cloud resource providers, evaluate respective rules at different rates, selectively apply some rules and not others, etc., without departing from the spirit of the invention.

Worker provider rules 3230 may include a set of policies that are applicable during scalability strategy evaluation. Examples of policies may include, but are not limited to, setting dynamic scaling on/off, terminating sick machines, not terminating "n" sick machines so these machines can be examined, adjusting strategy algorithms based on time of day, day of week, etc.

Machine worker lookup service 3240 may include an interface that describes a service which allows clients to lookup specific workers or discover generically described workers and associated technical computing resources. These technical computing resources may include machines (e.g. virtual machines in a cloud computing environment). In an alternative implementation, the workers may be MATLAB workers operating in a cloud computing environment.

Machine worker lookup service implementation 3245 may include an implementation of the Machine Worker Lookup Service. Machine worker lookup service implementation 3245 may be responsible for providing lookup and discovery services for the collection of all resources needed to support a technical computing environment worker (e.g., worker DAO interface 3250). In an implementation, machine DAO 3255 may represent a single type of resource needed to support worker interface 3250.

Worker DAO 3250 may include an interface that defines a data access object (DAO) that manages a collection of worker resources. In an implementation, the worker resources may be MATLAB workers. In one implementation, the MATLAB Workers may be dependent on a collection of technical computing resources, an example of which is machine technical computing resource DAO (3255).

Machine/technical computing resource DAO 3255 may include an interface that defines a data access object that manages a collection of computing resources required by Worker DAO 3260. In an implementation, the worker DAO may be a MATLAB worker DAO.

Worker DAO implementation 3260 may include an implementation of worker DAO interface 3250. Machine DAO implementation 3265 may include an implementation of the machine DAO interface 3255.

Worker selector DO 3270 may include a data object used to generically describe a type of worker that meets a set of specified characteristics. In an alternative implementation, worker selector DO 3270 may describe a type of worker that satisfies a specific MATLAB Worker instance.

The embodiment illustrated in FIG. 32 and discussed above is illustrative and other embodiments may include more software modules, fewer software modules and/or software modules that differ from those illustrated in FIG. 32 and/or discussed above.

Exemplary Technique for Maintaining State

Exemplary embodiments may be configured to maintain a state of an environment in which a user performs computing operations. For example, a user may be working within a technical computing environment to perform computations associated with a model of a dynamic system. The environment may include data, plots, instructions, a workspace for storing variables and other information, etc. This information may collectively determine a state for the environment in which the user operates. In some embodiments, this state may change over time. For example, the environment may have a first state when the model is at a first time step during execution and a second state when the model is at a second time step.

Conventional environments may not allow a user to resume computing operations from where the user left off because the conventional environment may not be able to duplicate the state of the environment that was present when the user previously logged off of the environment. The conventional environment may further pose problems when, for example, the user was initially working on a desktop machine, logged off, and then tried to log in using a wireless device, such as an iPhone™ (made by Apple Inc.). The conventional environment may not be able to synchronize the state of the desktop environment with the iPhone for several reasons, such as but not limited to, format incompatibilities between the wireless device and desktop device, differences in processing capabilities between the wireless device and the desk top device (e.g., the wireless device may not be able to handle all of the information making up the state of the desktop device), licensing issues between software in the desktop environment and software on the wireless device, etc.

Figure 33:
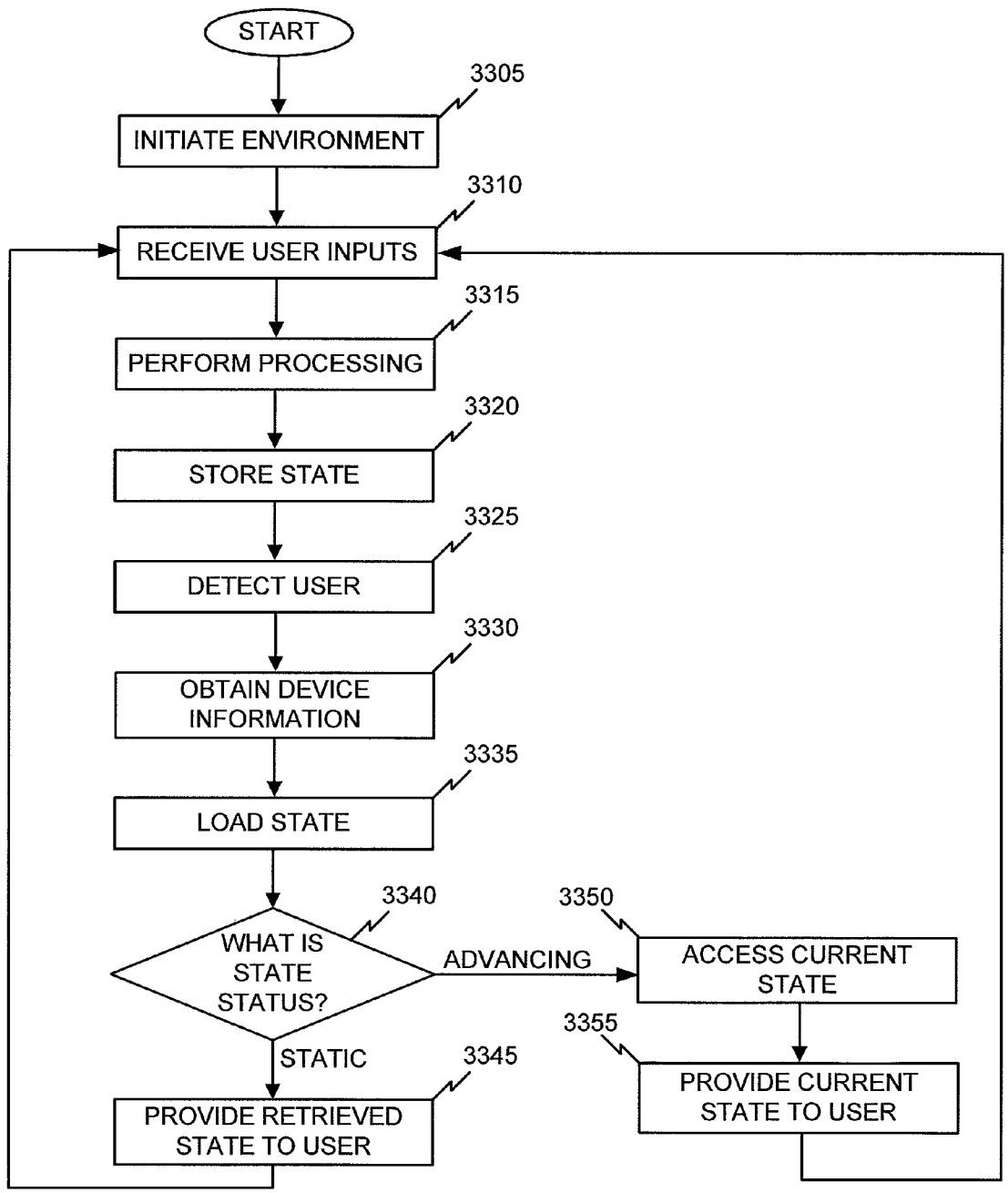
FIG. 33 illustrates exemplary processing for maintaining state for an environment when the environment is accessed via a remote device.

FIG. 33 illustrates exemplary processing for maintaining device independent state for a computing environment, such as a technical computing environment. The computing environment may be initiated (act 3305). For example, a user may double click an icon on a desktop of a computing display and may launch a technical computing environment that allows the user to perform technical computing tasks.

The technical computing environment may receive user inputs (act 3310) and may perform processing activities based on the received inputs (act 3315). For example, the user may enter a command to process data and the technical computing environment may retrieve the data from storage and may process the data using commands specified by the user. The technical computing environment may store states for the environment periodically (act 3320). For example, the state may include a most recent instruction entered by the user, stored variables and/or data, plots generated by the user, display window configurations, keyboard shortcuts, etc. State may further include, among other things, information about an operation performed using the technical computing environment, an output, a sample time (e.g., a sample time used by a model executing in the environment), an event (e.g., a user initiated event or a device initiated event), a configuration (e.g., a configuration of the environment or a device), a flag, an error message, a device identifier (e.g., a network address, host ID, etc.), an operating system identifier, etc.

In one implementation, the user may log off of a device, such as client 110, on which the processing was performed once the state is stored in act 3320. In another embodiment, the device (e.g., client 110) may remain running once the state is stored in act 3320. For example, the client may continue processing data using the technical computing environment.

A user may be detected (act 3325). For example, the user may have walked away from client 110 to attend a meeting and may be logging into the technical computing environment from a wireless device, such as an iPhone, or the user may log on from a publicly available computer. The technical computing environment may obtain device information for the device that the user is currently associated with (act 3430).

The technical computing environment may load state information from memory (act 3335). For example, the technical computing environment may load a most recent state that represents a current state of the environment. The processing may determine whether the loaded state is a static state or an advancing state (act 3340). For example, a static state may be a state that is not changing, such as when a user logged out of the technical computing environment and left nothing running. In this situation, the retrieved state is the most recent state and may be provided to the user via the wireless device (act 3345). The processing may convert the state into a format compatible with the wireless device before sending the state information to the user.

When the status of the state is advancing, a current state may be accessed (act 3350). For an advancing state, the current state may be retrieved from volatile memory (e.g., RAM) or from non-volatile memory (e.g., hard disk) depending on the speed of the memory devices, the rate at which the state is changing, etc. The current state may be provided to the user via the wireless device (act 3355). After act 3345 or 3355, processing flow may return to act 3310 and the technical computing environment may receive additional user inputs. To the user, the state observed via the wireless device may be identical to the state that the user would observe if the user were at the desktop device. When the user logs off of the wireless device and logs back onto the desktop device, the state may appear just as it would if the user remained logged in via the wireless device.

Many alternative embodiments are possible based on the foregoing description. Examples of some alternative embodiments are, but are not limited to those described below.

Exemplary Alternative Embodiments

For example, a first alternative embodiment may host a collaborative coding environment that encourages a group of programmers to develop quality code that can be used in remote processing applications, such as remote processing applications that use one or more TCEs. For example, a web site may allow programmers to submit remote processing code that can be tested, edited, enhanced, etc., by other programmers that in turn post the tested, edited, enhanced, etc., code to the web site. Still other programmers may use or may make enhancements to the code to further improve the code. Collaborating programmers and/or end users may rate pieces of code in terms of parameters, such as speed, accuracy, compactness, etc., to allow still other users to make informed decisions about a piece of collaboratively developed code.

A second alternative embodiment may provide integration logic in conjunction with remote processing code to allow integration of remote processing code with other applications on a device, e.g., client 110. For example, a piece of integration logic may include software that allows a data acquisition application running on client 110 to exchange acquired data with remote processing code operating locally on client 110. The remote processing code may send the acquired data to two or more processing devices, such as UEs that process the data using a dynamically typed language, and may receive a result from the UEs. The remote processing code may send the result to a display application running on client 110 so that the result can be displayed to a user of client 110.

A third alternative embodiment may include a statistics module that operates with server 130, where the statistics module acquires information about users that participate in remote processing activities. For example, server 130 may acquire information about problems (e.g., size, complexity, etc.), data, user locations, user demographics, etc., when the users are engaged in remote processing using server 130. Server 130 may use the statistics to direct development efforts, debugging efforts, marketing efforts, purchasing efforts (e.g., to determine what types of processing hardware to buy), etc.

A fourth alternative embodiment may provide remote processing services on a tiered basis, where different tiers have different cost structures. For example, server 130 may provide a first tier to a user where the first tier allows the user to use a fixed number of UEs 270 for remote processing. The first tier may have a first cost associated with it (e.g., a cost per month, a cost per job, etc.). Server 130 may provide a second tier to another user where the second tier allows the user to use a number of UEs 270 that is determined based on the complexity of a problem. The second tier may have a variable cost associated with it, where the cost is determined by the number of UEs 270 used for a particular processing task.

A fifth alternative embodiment may include a server 130 that performs pre-computing tasks based on a user's past behavior, based on a type of problem operated on by server 130, or based on other parameters. For example, server 130 may know that the user typically performs remote processing tasks that generate certain constants and/or other information. When the user initiates a session, or performs activities prior to remote processing activities, server 130 may pre-compute the constants so that they are ready when the user begins remote processing. Pre-computing constants and/or other information on behalf of the user may reduce the amount of time taken to operate on the user's problem and/or may reduce the amount of remote processing resources required to solve the user's problem.

A sixth alternative embodiment may run a first TCE and a second TCE with a timing interval between them, where the timing interval allows one TCE to compute a result before the other TCE computes the result. For example, a user may run a problem on a first TCE and a second TCE where the first TCE runs ten seconds ahead of the second TCE. If the first TCE encounters an error or crashes, the second TCE may have debugging logic turned on so that the second TCE is running in debug mode when the second TCE executes the code portion that caused the error or crash. The second TCE may provide detailed debugging information that could not be obtained from the first TCE to allow the user to quickly and accurately debug incorrect code.

A seventh alternative embodiment may include a real-time testing environment that includes a client and a number of UEs. The UEs may further be configured with various types of hardware, such as specialized test hardware. A client may select a particular UE based on the type of real-time testing that is being performed. For example, a first UE may have a first test device attached thereto. The client may send an instruction and/or data to the first UE when the client desires to have real-time testing performed on the first test device. Real-time test environments may include other types of hardware, such as target devices and/or code generators for creating code that can be run on the target devices. The client and the selected UE may exchange bi-directional messages while the UE performs real-time testing on behalf of the client.

An eighth alternative embodiment may provide games, puzzles, etc., using server 130 and/or remote processing devices, such as UEs 270, clusters 330 and 530, etc. For example, server 130 may host a game where the winner is the participant that can solve a problem using the fewest lines of code. This contest may operate like a golf game where the fewest strokes (here lines of code) identifies the winner. Alternatively, server 130 can post puzzles that participants try to solve using remote processors. Other embodiments may allow users to post contests, puzzles, etc., from one or more clients 110.

A ninth alternative embodiment may implement TCE 290 using one or more text-based products. For example, a text-based TCE 290, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support remote processing using one or more UE's 270.

A tenth alternative embodiment may implement TCE 290 in a graphically-based TCE 290 using products such as, but not limited to, Simulink®, Stateflow®, SimEvents™, etc., by The MathWorks, Inc.; VisSim by Visual Solutions; Lab-View® by National Instruments; Dymola by Dynasim; Soft-WIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support remote processing using one or more UE's 130.

An eleventh alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the product may use the MATLAB commands to perform parallel processing using one or more UEs 270.

A twelfth alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor UE 270, etc.).

A thirteenth alternative embodiment may employ a copy of TCE 290 on both client 110 and UE 270, where the TCEs allow workspace sharing. For example, client 110 may maintain a first workspace with a copy of TCE 290 running on client 110 and UE 270 may maintain a second workspace with a copy of TCE 290 running thereon. Client 110 may create variables in the first workspace and UE 270 may request the variables from the first workspace and may store the variables in the second workspace when performing parallel processing. UE 270 may further make variables in the second workspace available to another UE (e.g., UE 270-1), client 110, farm manager 320, etc., to further facilitate parallel processing on behalf of client 110 and/or another device. Alternatively, only client 110 may have a workspace, and client 110 may communicatively couple the workspace to UE 270 so that UE 270 can access information therein.

A fourteenth alternative embodiment may allow client 110 to perform parsing operations to facilitate remote processing for, by way of example, a model on client 110. For example, client 110 may run a Simulink model that includes a number of subsystems. Client 110 may parse the model based on the subsystems and may send a first subsystem to a first UE and may send the second subsystem to a second UE, where the first and second UE's are each configured as MATLAB-UE's (e.g., by running a version of MATLAB on each UE). The first and second UE's may process their respective subsystems and may request variables from client 110 or from other devices (e.g., from server 130). For example, client 110 may have a sharable workspace that is communicatively coupled to the first and second UE to allow the UE's access to variables needed to perform processing. The first and second UE's may each produce a result file that is sent back to client 110, where client 110 combines the files and performs a compilation operation to compile the model. Alternatively, the first and second UE's may send the result files to a third UE, where the third UE combines the result files and compiles the model on behalf of client 110.

A fifteenth alternative embodiment may perform remote (e.g., parallel) processing using stream processing techniques. For example, a first UE may perform code generation for a model received from client 110. The first UE may send a result to a second UE and the second UE may perform a portion of a build operation on the generated code. The second UE may send its result to a third UE that performs a compile operation on the result received from the second UE. The third UE may generate a result that includes the compiled code and may send the result to client 110.

A sixteenth alternative embodiment may perform parallel processing on behalf of a client using one or more commercial computing grids. For example, client 110 may send a request for remote processing to a server that operates with a commercial computing grid, where the commercial computing grid provides remote processing resources to clients for a fee (e.g., a fee based on an amount of processing resources used by client 110). The commercial computing grid may contain one or more clusters that can be associated with one or more providers (e.g., computing service providers). Client 110 may rent time (e.g., during a rental period) on the grid and may perform remote processing during the rental period. For example, client 110 may exchange bi-directional messages with one or more clusters within the grid, one or more devices within a cluster, etc., during the rental period. Rented resources may request state information from client 110 (e.g., information about available memory, information about variables, information about programming code, information about functions, etc.). Rented resources may also task client 110 to perform operations (e.g., processing activities, sending information, etc.) on behalf of the rented resources. For example, a device in a cluster may request that client 110 perform processing to convert a data value from a first format to a second format before client 110 sends the data value to the requesting device. Client 110 and the cluster(s) used to perform remote processing on behalf of client 110 may operate in a homogeneous or heterogeneous configuration depending on particular implementations used to perform remote processing.

In a seventeenth alternative embodiment, a first UE can act as a client with respect to a second UE, a third UE, etc. For example, client 110 may request that the first UE perform parallel processing. Client 110 and the first UE may exchange bi-directional messages while the first UE performs remote processing. The first UE may determine that it can use additional remote processing resources from a second UE and a third UE. The first UE may perform bi-directional communication with the second UE and the third UE to allow the second UE and third UE to assist the first UE with performing remote processing on behalf of client 110. Configurations can include substantially any number of clients and UE's arranged in any type of hierarchical relationship without departing from the spirit of the invention.

In an eighteenth alternative embodiment, clients 110 may be able to selectively become network hosts for versions of TCE 290 residing thereon. For example, client 110 may download a version of TCE 290 and code to perform remote processing using server 130. Client 110 may perform a remote processing task using, for example UE 270 and may obtain a result. Client 110 may wish to make its TCE version available for another client to use. Client 110 may host its TCE 290 and client 110-N may make use of TCE 290 to perform standalone processing or to perform remote processing using another device.

Still other alternative implementations are possible consistent with the spirit of the invention.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include, but are not limited to, storage operations, transmission operations (e.g., sending information or receiving information), display operations, displacement operations, etc. Tangible and/or useful results may include still other activities, operations, etc., without departing from the spirit of the invention.

Conclusion

Implementations may provide devices and techniques that perform remote processing on behalf of a device over a network.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 10-12, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 2, 3A-3C, 5-7, 13A-E, 14, 19, 22 and 28 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory computer-readable media storing instructions, the instructions comprising:
   one or more instructions, executable by one or more processors to cause the one or more processors to:
      determine a size of a processing buffer associated with a plurality of distributed computing resources available to a distributed computing environment,
         the distributed computing environment including a technical computing environment,
         the size of the processing buffer representing a determined percentage amount of excess processing resources, of the plurality of distributed computing resources,
         the size of the processing buffer being determined using processing capability information that is provided, at a first time, by a predictive model based on first historical information,
         the size of the processing buffer being set for a particular amount of time, and
         the excess processing resources providing additional distributed processing capabilities to the distributed computing environment when the excess processing resources are being used;
      measure a processing load for the distributed computing environment;
      receive additional information associated with the processing load,
         the additional information being based on the predictive model using, at a second time, second historical information to generate estimate information associated with processing one or more future processing loads by the processing buffer,
         the second time occurring after the first time;
      input the measured processing load and the additional information to produce a result;
      evaluate the result to determine whether the determined percentage amount of excess processing resources represented by the size of the processing buffer is adequate, the size of the processing buffer being inadequate when one of:
         the determined percentage amount of excess processing resources represented by the size of the processing buffer is less than a threshold amount of excess processing resources, or
         the determined percentage amount of excess processing resources represented by the size of the processing buffer is greater than the threshold amount of excess processing resources; and
      modify the size of the processing buffer when the determined percentage amount of excess processing resources represented by the processing buffer is inadequate, the one or more instructions to modify the size of the processing buffer including one of:
         one or more instructions to cause additional distributed processing resources to be available to the distributed computing environment, or
         one or more instructions to cause one or more of the plurality of distributed computing resources to be unavailable to the distributing computing environment.

2. The non-transitory computer-readable media of claim 1, where the additional information includes one or more of:
   historical data for the distributed computing environment,
   rate-of-change information for a load on the distributed computing environment,
   event information for one or more events associated with the distributed computing environment, or
   status information for devices in the distributed computing environment.

3. The non-transitory computer-readable media of claim 1, where the instructions further include:
   one or more instructions to use the processing buffer to support dynamically moving a processing job among distributed computing resources, of the plurality of distributed computing resources, while the job is being performed.

4. The non-transitory computer-readable media of claim 1, where the instructions further include:
   one or more instructions to use the processing buffer to support synchronized execution between two or more programs using one or more of the plurality of distributed computing resources.

5. The non-transitory computer-readable media of claim 1, where the one or more instructions to determine the size of the processing buffer include:
   one or more instructions to:
      determine a rate of change of the processing load over a particular period of time, and
      determine the size of the processing buffer based on the determined rate of change of the processing load.

6. The non-transitory computer-readable media of claim 1, where the instructions further include:
   one or more instructions to:
      establish a first processing buffer based on an image processing load of the distributed computing environment,
      establish a second processing buffer based on a cell processing load of the distributed computing environment, and
      aggregate the first processing buffer and the second processing buffer to establish the processing buffer.

7. The non-transitory computer-readable media of claim 1, where the instructions further include:
   one or more instructions to:
      establish a first processing buffer based on a first system parameter of the distributed computing environment,
      establish a second processing buffer based on a second system parameter of the distributed computing environment, the second system parameter being different from the first system parameter, and
      aggregate the first processing buffer and the second processing buffer to establish the processing buffer.

8. A computer-implemented method comprising:
   determining a size of a processing buffer associated with a distributed computing environment,
      the distributed computing environment including a technical computing environment,
      the size of the processing buffer representing a percentage amount of excess processing resources,
      the size of the processing buffer being determined using processing capability information that is provided, at a first time, by a predictive model based on first historical information, the size of the processing buffer being set for a particular amount of time, the excess processing resources providing additional distributed processing capabilities to the distributed computing environment when the excess processing resources are being used, and the determining being performed by a computing device;

measuring a processing load for the distributed computing environment, the measuring being performed by the computing device;

receiving additional information associated with the processing load, the additional information being based on the predictive model using, at a second time, second historical information to generate estimate information associated with processing one or more future processing loads by the processing buffer, the second time occurring after the first time, and the receiving being performed by the computing device;

updating a model with the measured processing load and the additional information to produce a result, the model including one or more algorithms that use the measured processing load and additional information received by the model to produce the result, and the updating being performed by the computing device;

evaluating the result to determine whether the determined percentage amount of excess processing resources represented by the size of the processing buffer is adequate, the size of the processing buffer being inadequate when one of:

the determined percentage amount of excess processing resources represented by the size of the processing buffer is less than a first threshold, or the determined percentage amount of excess processing resources represented by the size of the processing buffer is greater than a second threshold, and the evaluating being performed by the computing device; and modifying the size of the processing buffer when the size of the processing buffer is inadequate, modifying the size of the processing buffer including one of:

causing additional distributed processing resources to be available to the distributed computing environment, or causing one or more of the excess processing resources to be unavailable to the distributing computing environment, and the modifying being performed by the computing device.

9. The computer-implemented method of claim 8, further comprising:

monitoring processing loads of the plurality of distributed computing resources over a particular time period; and determining the size of the processing buffer based on monitoring the processing loads over the particular time period.

10. The computer-implemented method of claim 9, further comprising:

determining a rate of change of the processing load over the particular time period based on monitoring the processing loads; and determining the size of the processing buffer based on the determined rate of change.

11. The computer-implemented method of claim 8, where the additional information includes one or more of:

historical data for the distributed computing environment, rate-of-change information for a load on the distributed computing environment, event information for one or more events associated with the distributed computing environment, or status information for devices in the distributed computing environment.

12. The computer-implemented method of claim 8, further comprising:

establishing a first processing buffer based on an image processing load of the distributed computing environment;

establishing a second processing buffer based on a cell processing load of the distributed computing environment; and aggregating the first processing buffer and the second processing buffer to establish the processing buffer.

13. The computer-implemented method of claim 8, further comprising:

establishing a first processing buffer based on a first system parameter of the distributed computing environment;

establishing a second processing buffer based on a second system parameter of the distributed computing environment, the second system parameter being different from the first system parameter; and aggregating the first processing buffer and the second processing buffer to establish the processing buffer.

14. The computer-implemented method of claim 13, where the first system parameter is associated with an availability of a particular operating system comprising a particular configuration within the distributed computing environment and the second system parameter is associated with an availability of a particular virtual machine configuration within the distributed computing environment.

15. A system comprising:

one or more devices, including a memory and a processor, to:

determine a first processing load associated with a distributed computing environment, a size of the first processing load being associated with a size of a processing buffer representing a determined percentage amount of excess processing resources, of a plurality of computing resources available to the distributed computing environment, the size of the processing buffer being determined using processing capability information that is provided, at a first time, by a predictive model based on first historical information, the size of the processing buffer being set for a particular amount of time;

measure the first processing load;

receive additional information associated with the first processing load, the additional information being based on the predictive model using, at a second time, second historical information to generate estimate information associated with processing one or more future processing loads by the processing buffer, the second time occurring after the first time;

determine, based on the measured first processing load and the additional information, a quantity of a plurality of remote resources, of the distributed computing environment, to be available to the distributed computing environment during a first period of time, determine a second processing load associated with the distributed computing environment for a second period of time,
the second period of time occurring after the first period of time,
measure the second processing load;
receive additional information associated with the second processing load,
the additional information associated with the second processing load being based on the predictive model;
determine, based on the measured first processing load, the additional information associated with the first processing load, the measured second processing load, and the additional information associated with the second processing load, a third processing load associated with the distributed computing environment for a third period of time,
the third processing load being determined prior to the third period of time, and
determine to modify the quantity of remote devices available to the distributed computing environment during the third period of time based on the third processing load.

16. The system of claim 15, where the one or more devices are further to:
establish the processing buffer based on the determined first processing load, and
determine the quantity of the plurality of remote resources available to the distributed computing environment based on the size of the processing buffer.

17. The system of claim 16, where, when determining to modify the quantity of the plurality of resources, the one or more devices are to:
determine whether the amount of excess processing resources represented by the size of the processing buffer is adequate, the size of the processing buffer being inadequate when one of:
the amount of excess processing resources represented by the size of the processing buffer is less than a first threshold, or
the amount of excess processing resources represented by the size of the processing buffer is greater than a second threshold,
increase the quantity of the plurality of resources by causing additional distributed processing resources to be available to the distributed computing environment during the third period of time, when the amount of excess processing resources represented by the size of the processing buffer is inadequate, and
decrease the quantity of the plurality of resources by causing one or more of the excess processing resources to be unavailable to the distributing computing environment during the third period of time, when the amount of excess processing resources represented by the size of the processing buffer is inadequate.

18. The system of claim 15, where the one or more devices are further to:
determine a rate of change of the processing load over the first period of time, and
determine the quantity of the plurality of remote resources based on the determined rate of change.

19. The system of claim 15, where the one or more devices are further to:
monitor processing loads of each of the plurality of remote resources during the first period of time, and
determine the quantity of the plurality of remote resources based on monitoring the processing loads.

20. The system of claim 19, where the one or more devices are further to:
determine, based on monitoring the processing loads, one or more of:
historical data for the distributed computing environment,
rate-of-change information for a load on the distributed computing environment,
event information for one or more events associated with the distributed computing environment, or
status information for devices in the distributed computing environment, and
determine the quantity of the plurality of remote resources based on the one or more of the historical data, the rate-of-change information, the event information, or the status information.

* * * * *